Sept. 28, 1965   E. ESTREMS   3,209,329
DATA PROCESSING APPARATUS
Filed March 30, 1960   33 Sheets-Sheet 16

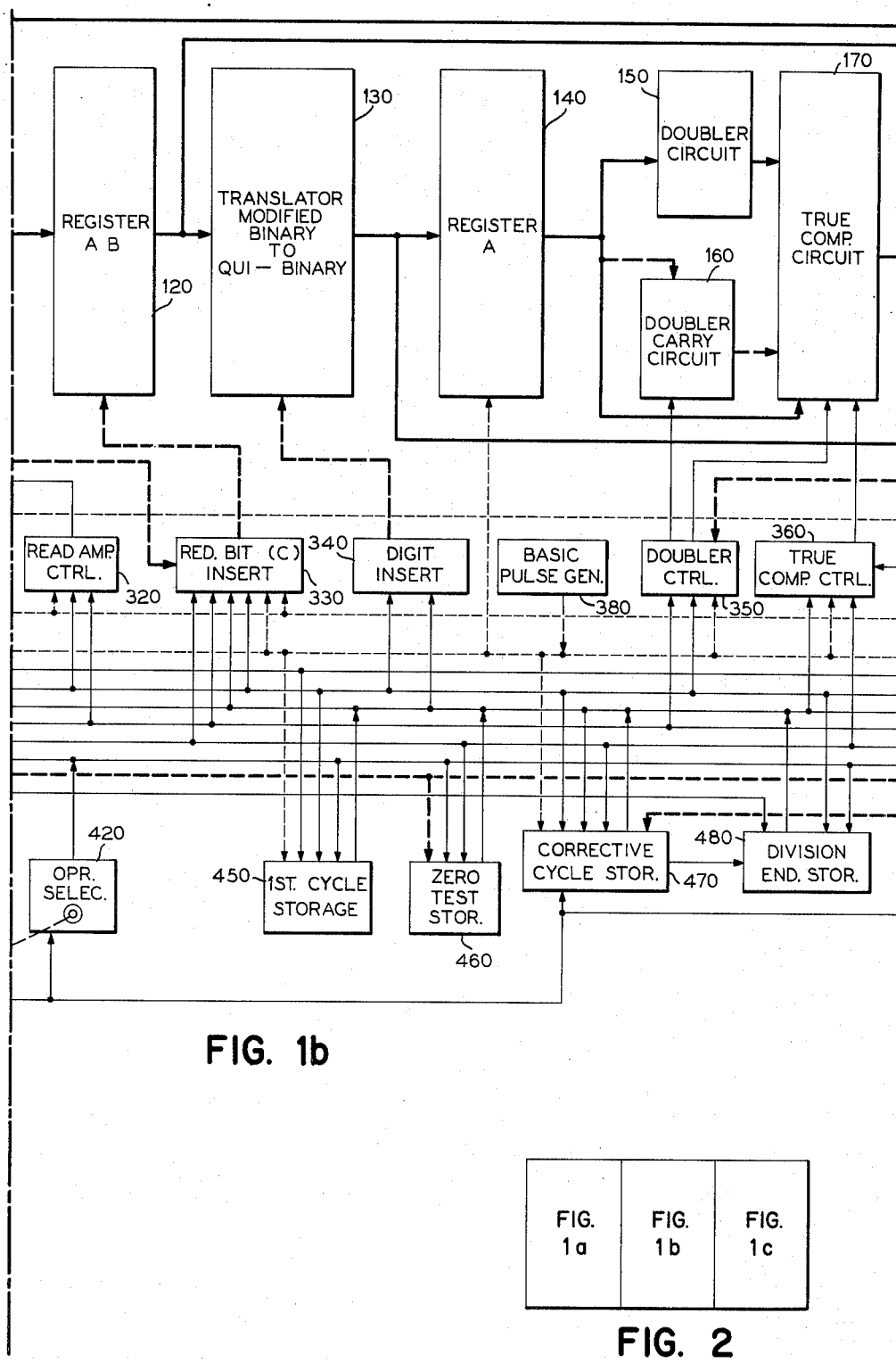

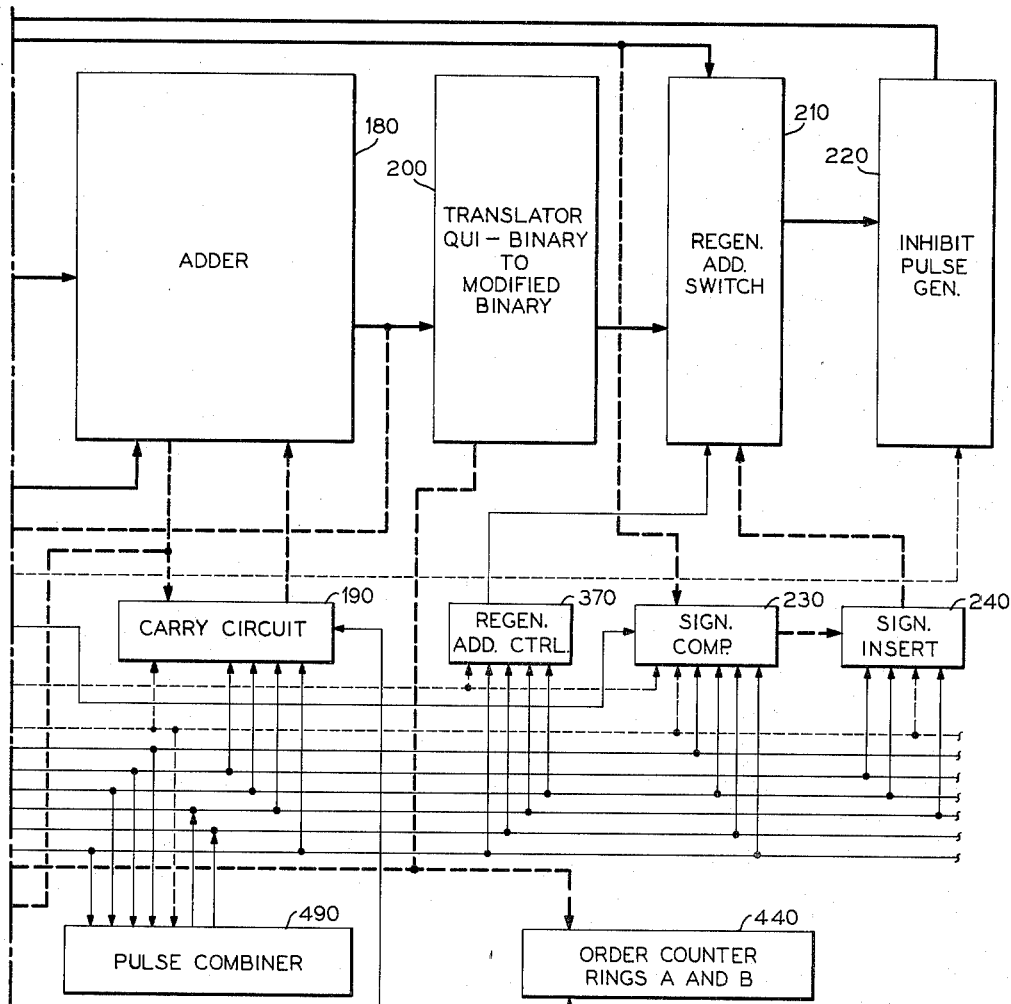

FIG. 6d

Sept. 28, 1965 E. ESTREMS 3,209,329
DATA PROCESSING APPARATUS
Filed March 30, 1960 33 Sheets-Sheet 21

FIG. 8d

Sept. 28, 1965  E. ESTREMS  3,209,329
DATA PROCESSING APPARATUS
Filed March 30, 1960  33 Sheets-Sheet 32

United States Patent Office 3,209,329
Patented Sept. 28, 1965

3,209,329
DATA PROCESSING APPARATUS
Eugeni Estrems, Saint-Mande, France, assignor to International Business Machines Corporation, New York, N.Y., a corporation of New York
Filed Mar. 30, 1960, Ser. No. 18,609
29 Claims. (Cl. 340—172.5)

This invention relates to data processing machines and, more particularly, to data processing apparatus for performing multiplication and division of data in coded form.

The invention concerns the performance of complex operations made up of a series of elementary operations in which data bits forming digits or characters recorded in discrete storage positions are successively processed through the facility of a scanning device. The field scanned during an elementary operation can be shifted with respect to the field scanned during the preceding elementary operation, and the existence and the amount of shift depends upon the results previously obtained. The invention is particularly suited to perform multiplications or divisions, but it also enables other operations to be performed, such as, for example, the extraction of a square root through successive subtractions.

Generally, the passage from one elementary operation to another involves "dead times," during which no operation is performed on the data. This invention is adapted to reduce these dead times.

Heretofore, such as in copending application Serial No. 611,272, now Patent No. 2,979,260, E. Estrems, filed September 21, 1956, the accumulation of the transfer results during a multiplication or division may be performed only in a series of storage positions making up a so-called "accumulator" special storage. When the operation is over, it is generally necessary to transfer the results to a main storage, in order to make the accumulator available for a new operation. Moreover, by such an arrangement, the number of digits of the factor located in the accumulator (multiplier in the case of multiplication, divisor in the case of division) is limited by the capacity of the accumulator.

This invention does not contain these limitations. It provides for direct accumulation of the transfer results in any field of the main storage, which field may be defined at will through appropriate connections. For this purpose, said connections cooperate with scanning chains which may be directly set in the position defining the beginning of a field to be scanned, and which progresses then, position per position, by advance pulses. The scanning chains or rings may be caused to go backward as well as forward. Since the scanning chains may be operated to go backward, the chains may be reset in any position at the beginning of each elementary operation. This backward movement of the chains may occur very rapidly if the chains are made up of the association of two or several elementary chains and if the number of positions of the scanned field is equal to the number of positions of one of the elementary chains. In this invention, it is sufficient to make the chains go backward one order position to come back to the starting position.

Thus, for instance, if the chains are made up of the association of a unit chain with a tens chain and if the scanned field includes ten positions, it is sufficient, in order to perform the scanning of a field again, to make the tens chain go backward one order position without changing the state of the unit chain. If it is desired to scan a field which is shifted forward one rank or order position with respect to the preceding field, it is sufficient to wait, in order to perform this backward move, until the unit chain scans one more position. Hence, the chain will have scanned eleven positions instead of ten during the elementary operation preceding the backward move. If it is desired to scan a field which is shifted backward one order position relative to the preceding field, the backward move may be performed as soon as the chain has scanned nine positions. Consequently, it is possible to go from an elementary position to the next one in a very simple and fast manner.

A prime object of this invention is to provide improved data processing apparatus for performing arithmetic operations.

Another main object of this invention is to provide apparatus for controlling the transfer, position by position, of the data contained in an arbitrarily chosen first storage field, the combination of the data read out from each one of these positions with the data contained in the correpsonding position of a second arbitrarily chosen storage field; the direct writing of each combinational result in the second field position which contained the data used for this combination; and the automatic repetition of the operation according to the obtained results with a possible shift in the limits of the fields and in the relation between both field positions.

A more particular object of this invention is to provide apparatus for performing arithmetic operations such as multiplication or division at a relatively rapid rate.

Another object of the invention is to provide apparatus for determining the sign of the result of a multiplication or division operation where the sign of a number transferred to storage is recorded in a predetermined digit position of the number. By this arrangement, the scanning of the storage positions performed for the computation is used to read the factor signs or to write the sign of the result.

A still further object of the invention is to provide apparatus for rounding off a multiplication result. The previous scanning, performed to erase information to provide the necessary storage positions in which the result of this operation is to be recorded, is used to record in the position in which the first one of the digits is to be written, a suitable quantity (five in case of a decimal numeration) in order to eventually obtain, through a carry, the addition of a one to the last digit to be kept.

Another object of the invention is to provide apparatus for speeding the performance of arithmetic operations through a very simple device. It is well known that multiplication of a digit of the multiplier with a digit of the multiplicand may take place through successive additions, the number of these additions being equal to the multiplier digit, or perform the multiplication in one time through a logical circuit matrix. The second system is quicker than the first one, but it requires more intricate circuit, this complication being partly caused by the necessity to provide carry circuits. Combination systems have been proposed, in which the multiplier digit is divided into a sum of digits of lower value, such as 1, 2, 4 or 5; these systems allow to use circuits more simple than the twice 10-input matrix, but do not solve the carry problem. According to the present invention, this problem is solved by the use of an appropriate coding system. The numeration basis is divided into a product of two factors $m$ and $n$, and a digit is represented with two elements; the first one may take $m$ states which respectively correspond to numbers 0, $n$, $2n$ ($m-1$)$n$ and the second one may take $n$ states which respectively correspond to numbers 0, 1, 2 ... $n-1$. The digit represented is the combination of those factors which correspond to the states of both elements. The product of a digit by $n$ is a one or 2-digit number; the "unit" digit of this product has always its second element in state 0; and the higher order digit, if there is one, always has its first element in state 0. Consequently, if a multidigit number is multiplied with $n$, the carry on one order of the product by $n$ of the lower order digit results into a mere change of the second element, which switches from state 0 to another state, this carry having no influence on the first element, nor on the higher orders. Thus, for instance, in the case of a decimal numeration system, the qui-binary coding may be used, in which a digit is represented by a quinary element Q which may be in one of the five states Q0, Q2, Q4, Q6, Q8 and a binary element B which may be in one of the states $B_0$ or $B_1$; the double of a digit will always have at the unit digit its binary element zero, and the tens digit, if there is one, will be equal to one, so that in the doubling of multidigit number a carry will merely result in replacing $B_0$ with $B_1$.

When performing operations of division, as in multiplication, the additions of multiples of the multiplicand being replaced with subtractions of multiples of the divider, the subtractions may be performed by adding the complements of these multiples.

Consequently, another object of this invention is to provide apparatus for reducing the time necessary for a subtractions by subtracting multiples of the divisor, the adding multiples of the multiplicand and reducing the time necessary for a division performed through successive subtractions by subtracting multiples of the divisor, the multiples being chosen so that it be not necessary to use circuits combining the digit resulting from the formation of the multiple of the digit of one order with the carry proceeding from the formation of the lower order multiple.

The foregoing and other objects, features and advantages of the invention will be apparent from the following more particular description of a preferred embodiment of the invention, as illustrated in the accompanying drawings.

In the drawings:

FIGS. 1a, 1b and 1c, arranged as in FIG. 2, constitute a schematic block diagram of a data processing machine embodying the present invention;

FIG. 2 is a diagram showing how FIGS. 1a, 1b and 1c should be arranged;

FIGS. 3a to 3l, arranged as indicated in FIG. 4, are a more detailed schematic diagram of the machine;

FIG. 4 is a diagram showing how FIGS. 3a to 3l should be arranged;

Figure 6D:
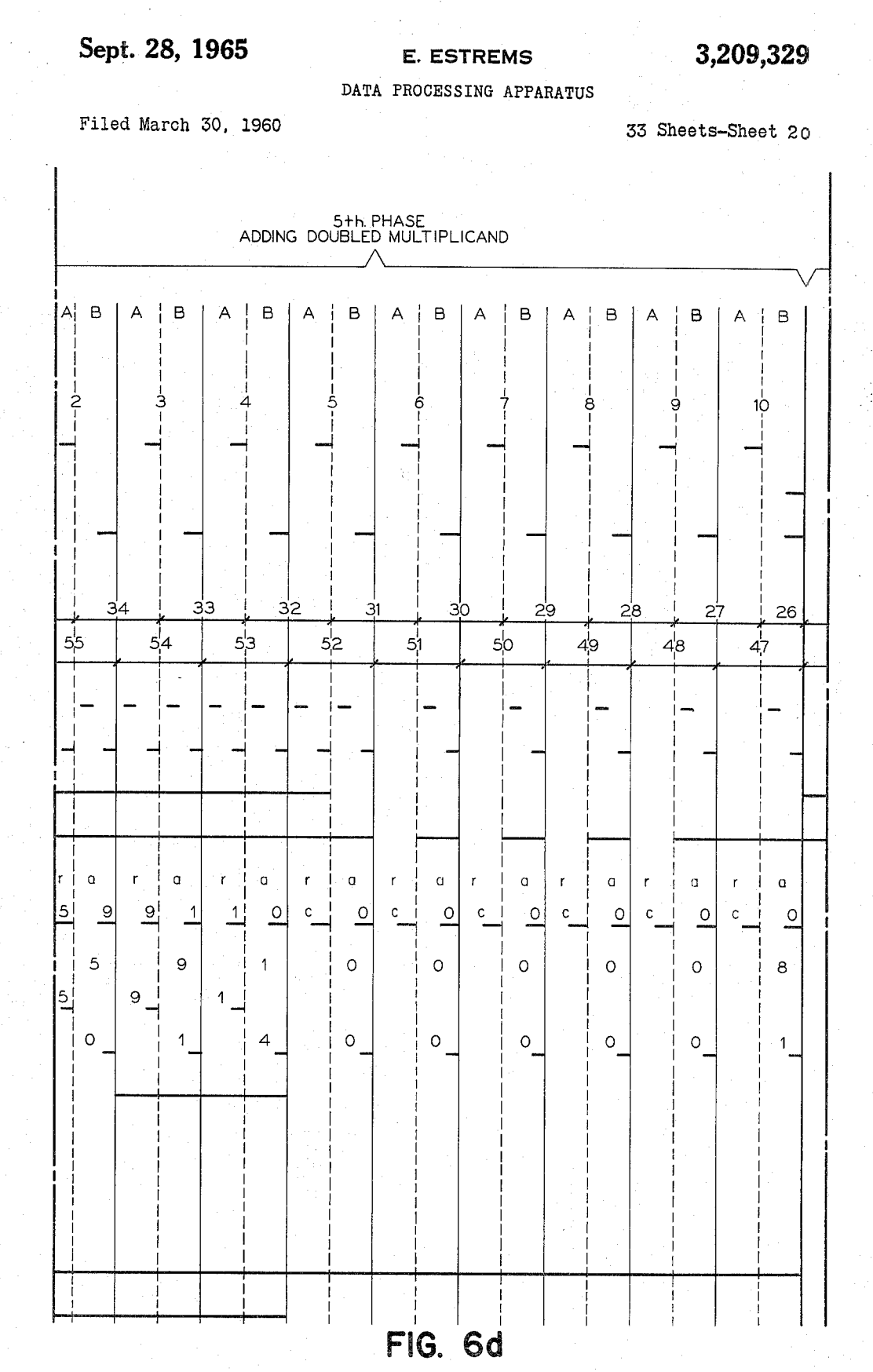

FIGS. 6a to 6g is a diagram representing the occurrence of impulses during a multiplication operation;

FIGS. 6a to 6g are arranged;

Figure 8D:
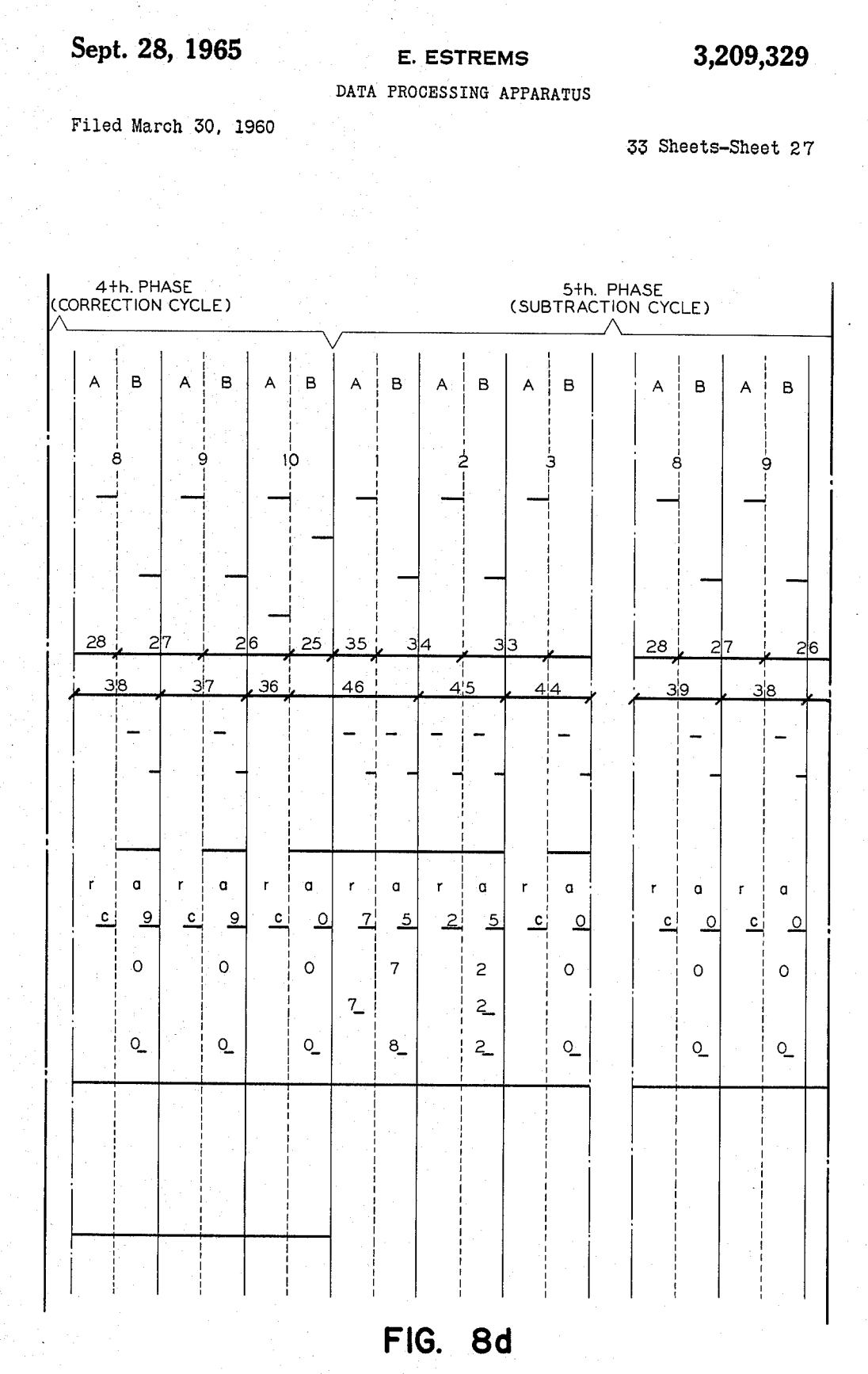

FIGS. 8a to 8f is a diagram representing the occurrence of impulses during a division operation;

FIGS. 8a to 8f are arranged;

Figure 17A:
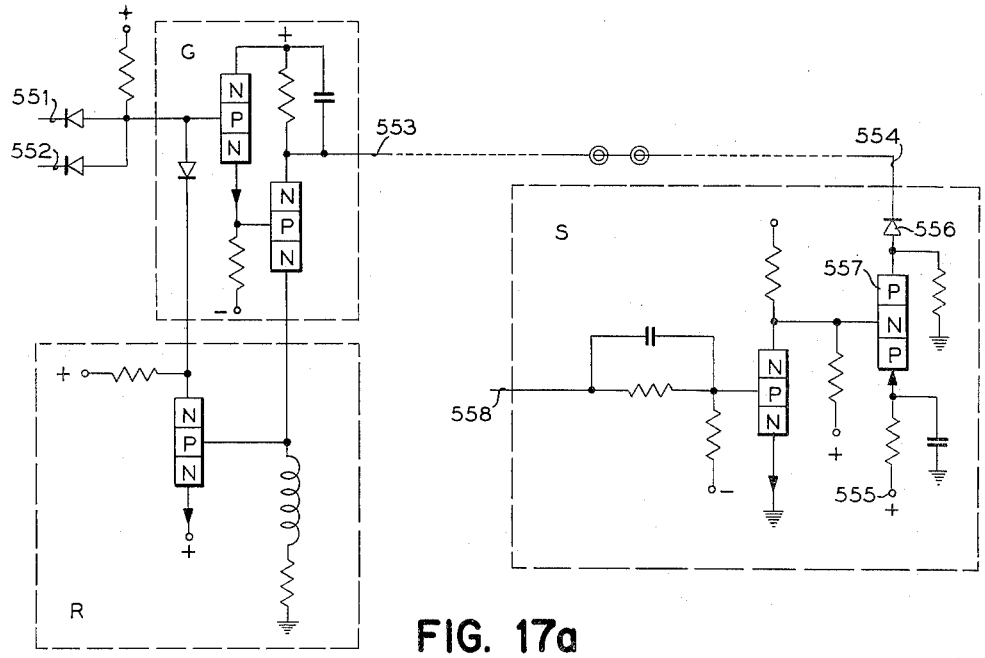
Figure 17B:
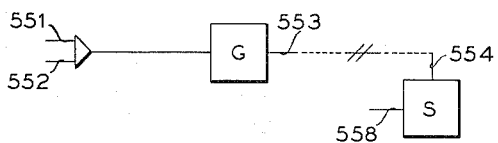
Figure 17C:
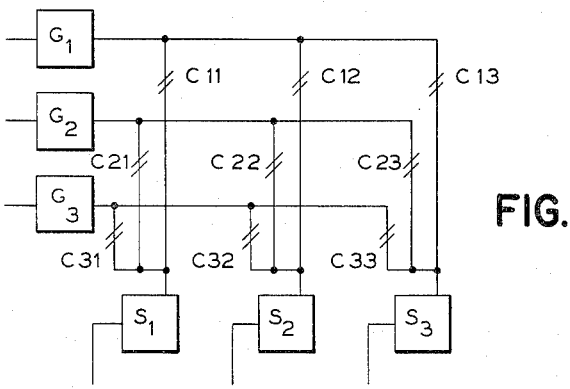
Figure 18:
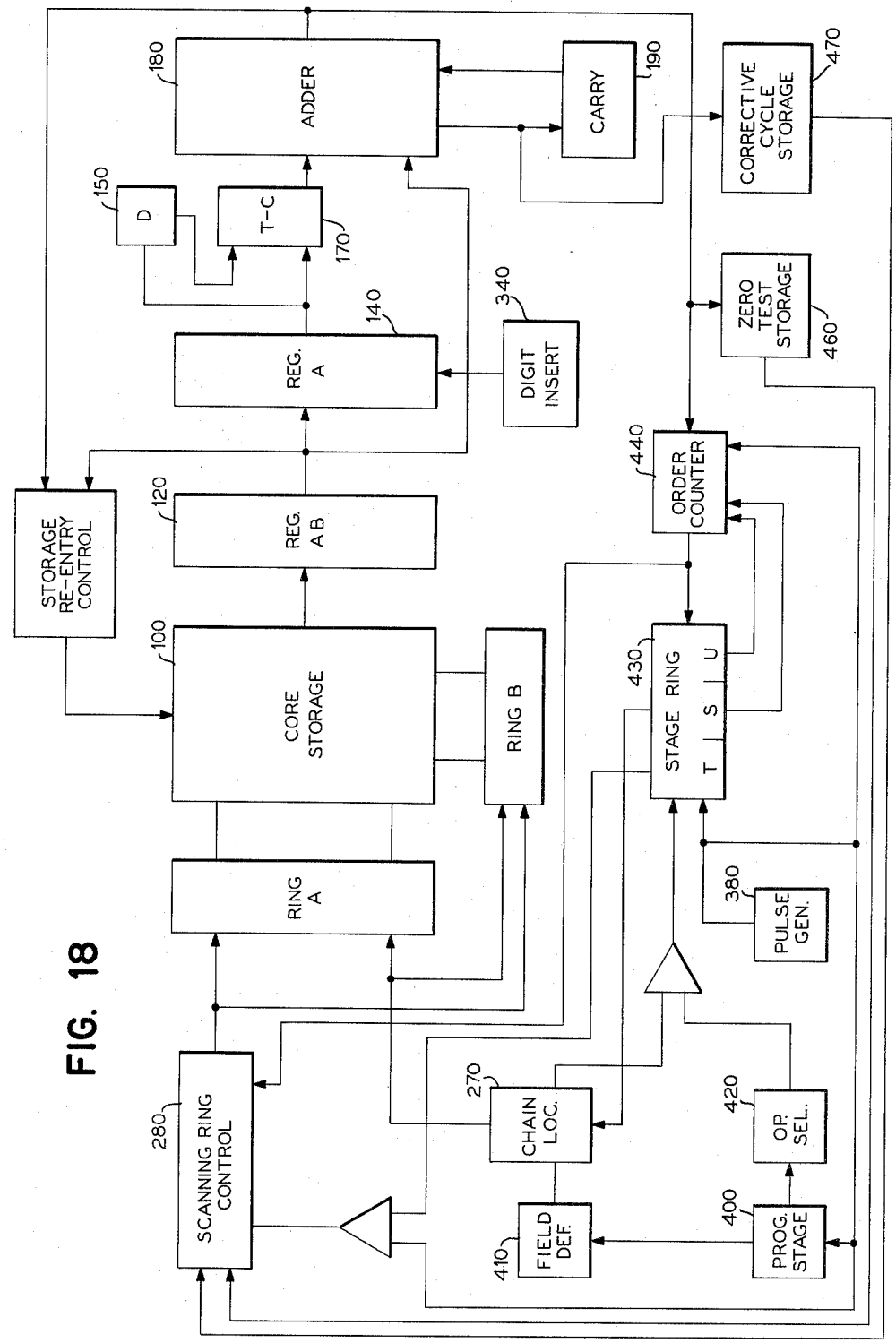

FIGS. 10a, 10b, 11a, 11b, 12a, 12b, 13a, 13b, 14a 14b, 15a, 15b, 16a–16d, 17a–17c show different basic circuits and the symbolical form in which these circuits appear in FIGS. 3a through 3l; and, FIG. 18 is a very general schematic diagram of a data processing machine embodying the present invention.

GENERAL DESCRIPTION

Figure 1A:
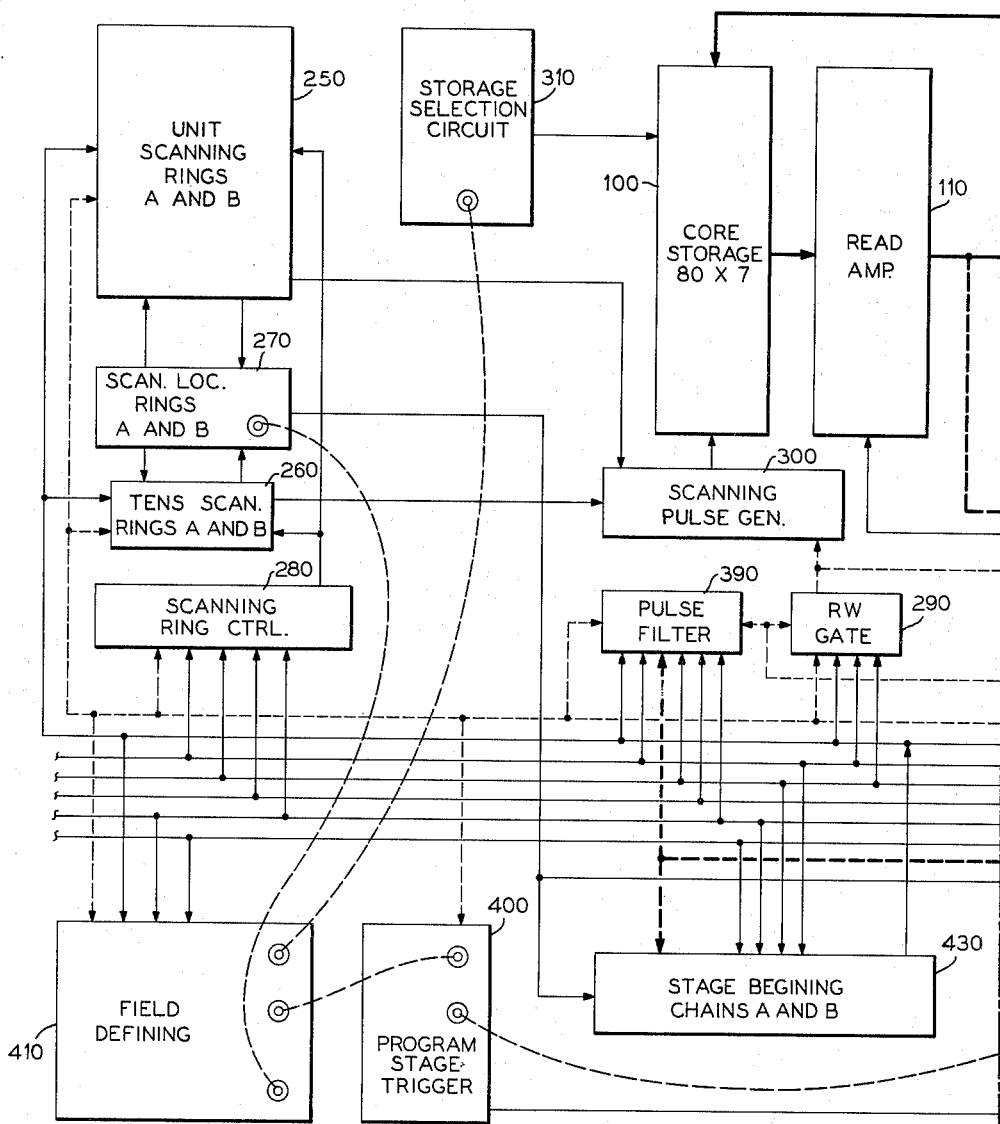

Referring to the drawings and particularly to FIGS. 1a, 1b and 1c, a general schematic block diagram of a data processing machine according to the present invention is shown. Fundamentally, only that portion of the machine concerned with the instant invention is shown. The data processing machine is one of the serial type.

A core storage array 100 in this example comprises 80 storage positions; each storage position includes seven magnetic cores for representing data in coded form. The invention could incorporate several storage arrays to increase its capacity for performing arithmetic operations, and provision is made to select particular storage arrays at any one time by means of a storage selection circuit 310.

The core storage array 100 is addressed by rings 250A and 250B. While the core array 100 is addressed by rings 250A and 250B in a manner similar to that described in copending application Serial No. 704,780, Estrems et al., filed December 23, 1957, now Patent No. 2,939,120, dated May 31, 1960, the control of the rings; i.e., the positioning of the rings, is quite different. As will be pointed out in detail for both multiplication and division operations, the rings are shifted after each partial addition.

In order to simplify the flow of data and control signals in FIGS. 1a, 1b and 1c, a heavy line has been used for the storages; i.e., for the components capable of keeping an information (which may relate either to a quantity, or to the state of progression of an operation).

A thin line is used to outline blocks representing the control devices. Moreover, if the blocks include hubs to realize variable connections, one or more of these hubs have been represented therein.

The connections between the various blocks are represented according to the following conventions:

A continuous thick line represents a coductor for the transfer of the computation data or the results.

A dotted thick line represents a conductor for enabling the transfer of auxiliary data; such as sign impulse, carry impulse, or digit impulse, for lowering the multiplier or increasing the quotient after a partial operation.

A thin continuous line represents a conductor for carrying control impulses.

A thin dotted line represents the circuit conductors which carry the basic pulses (timing pulses) or pulses proceeding from the filtering of said basic pulses (read and write gates, read amplifier gate, etc.).

A curved dotted line represents removable connections of all type between hubs.

Further, to facilitate an understanding of the invention, the blocks, shown in FIGS. 1a, 1b and 1c, may be grouped into four classes:

*Blocks representing devices used for storing, receiving or processing the data and the results*

Figure 3A:
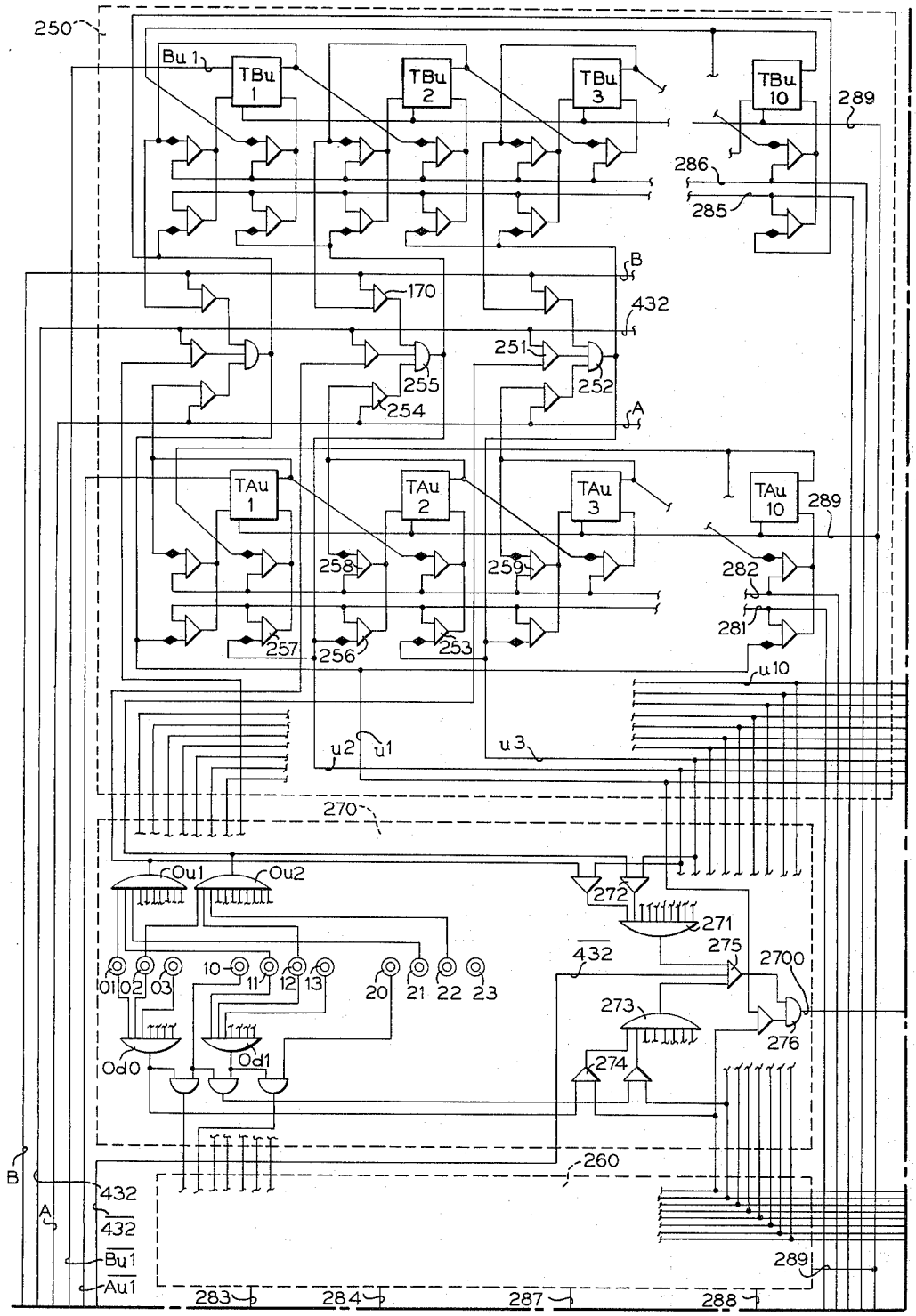
Figure 3B:
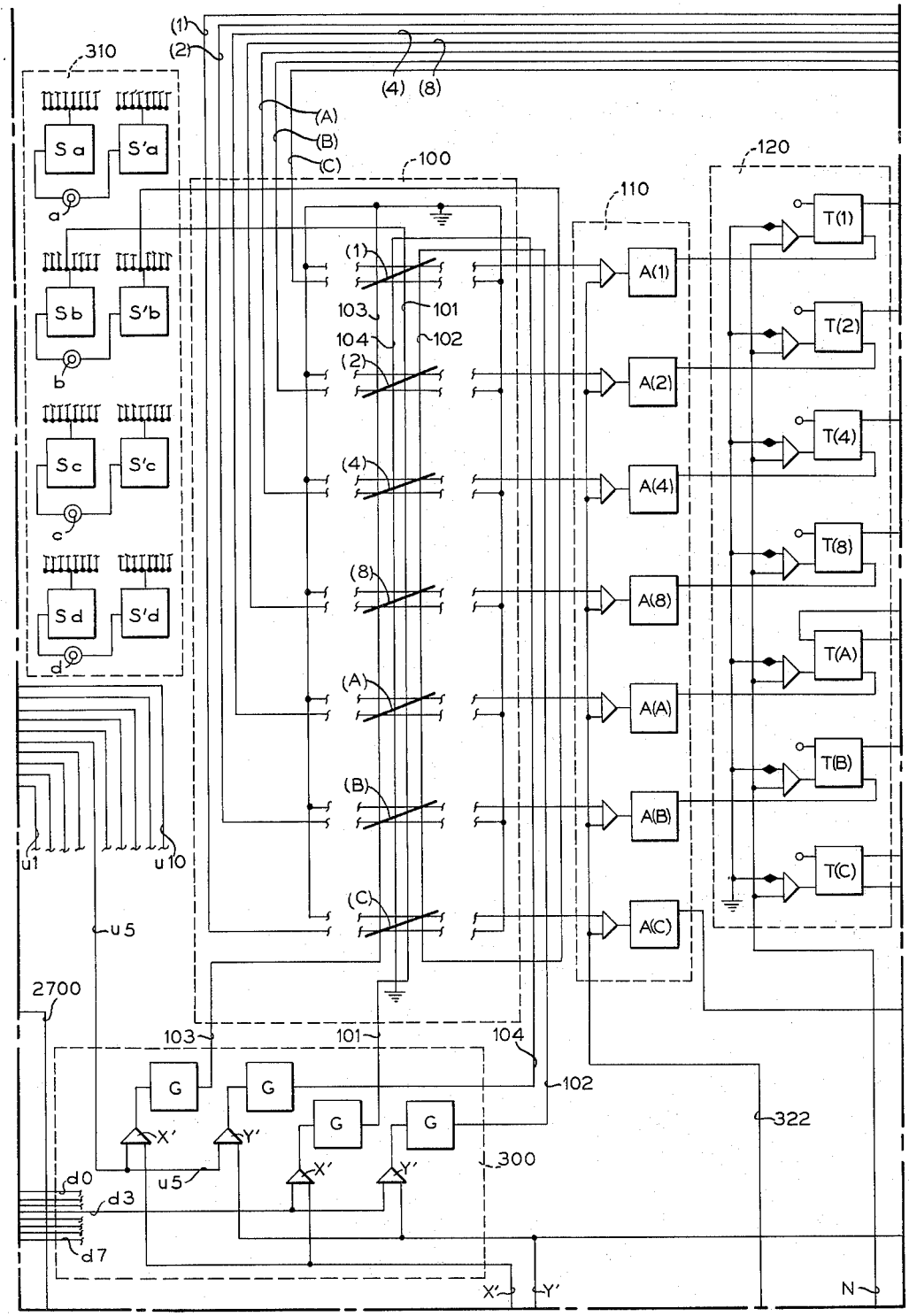
Figure 3C:
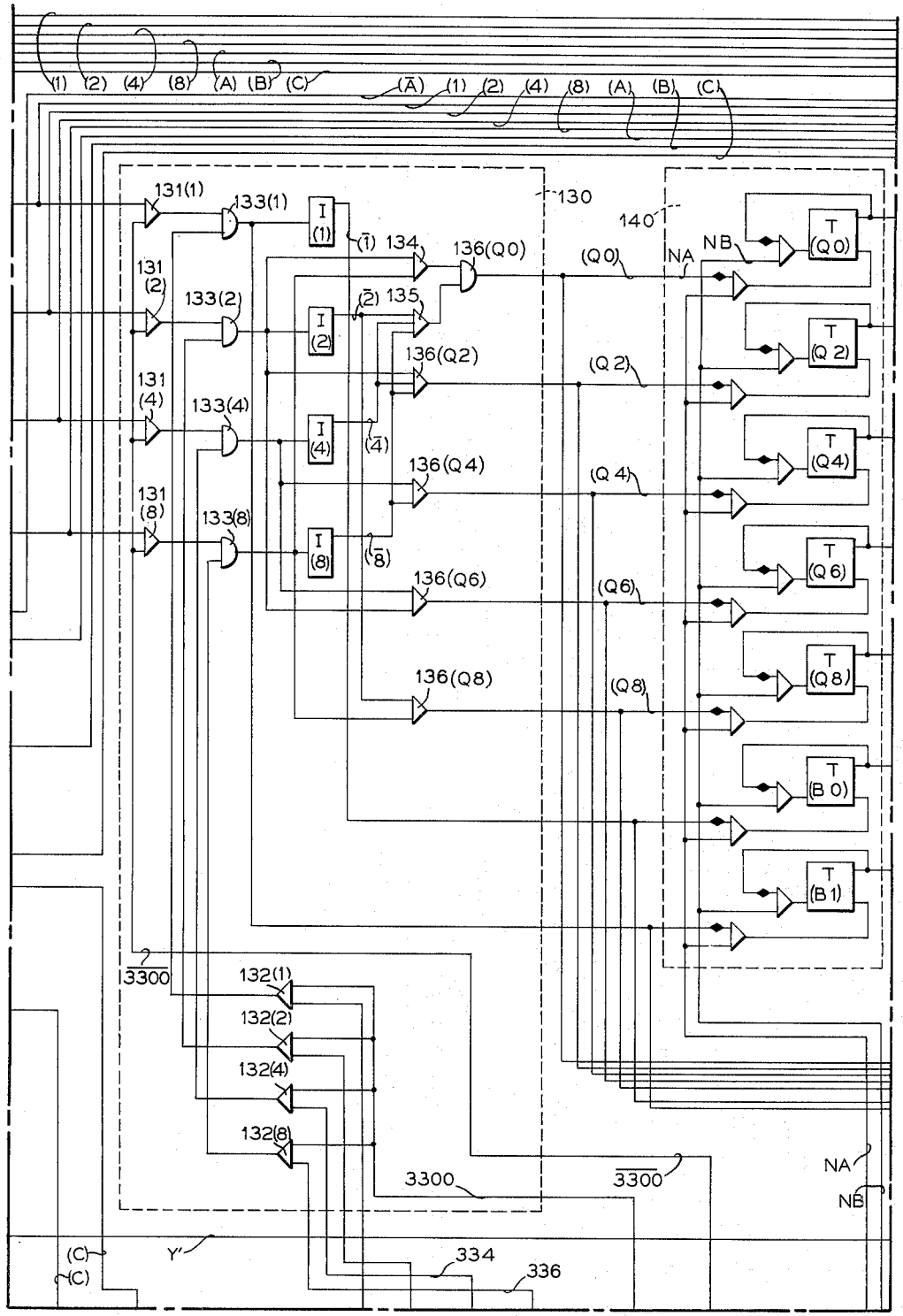
Figure 3D:
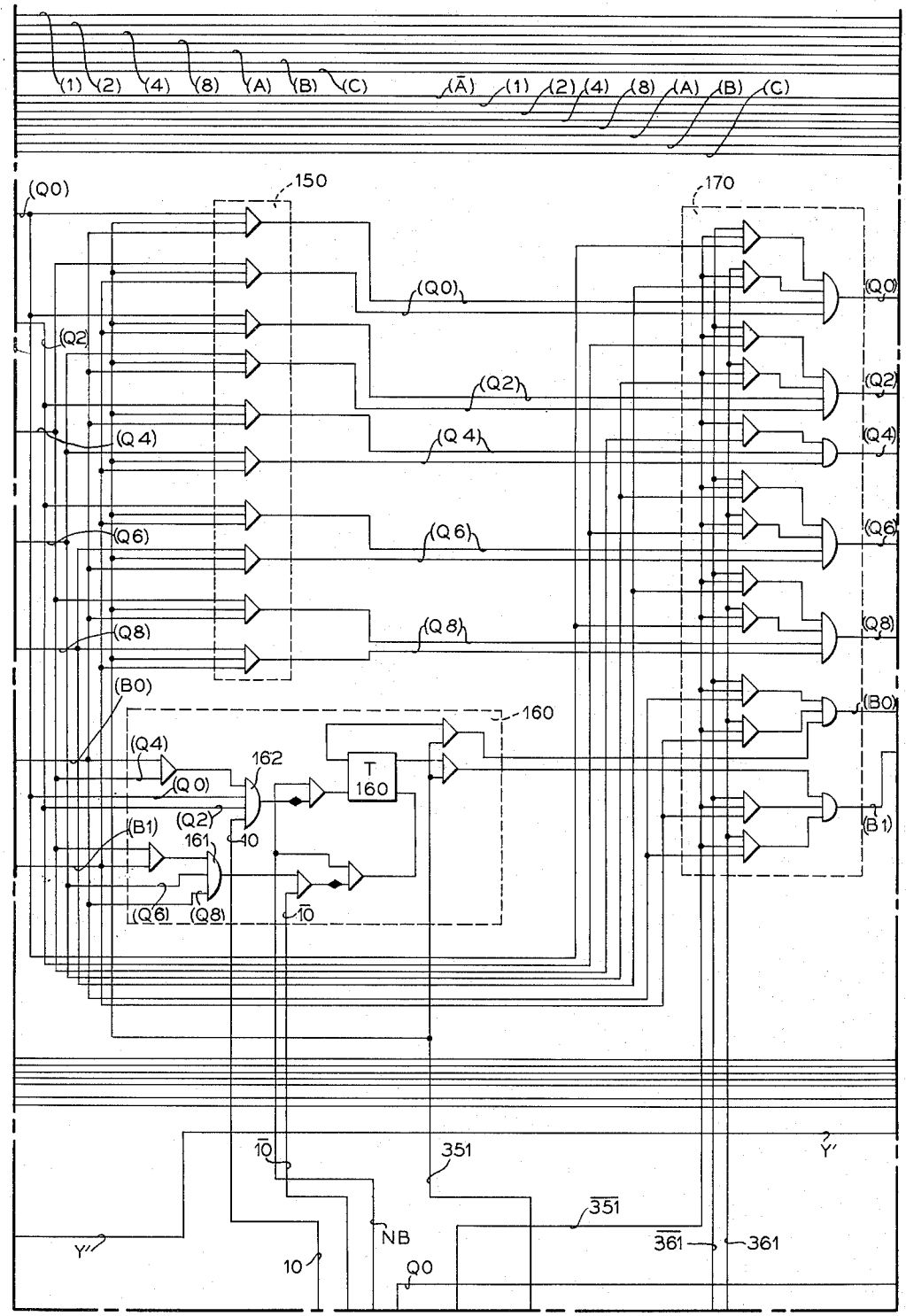
Figure 3E:
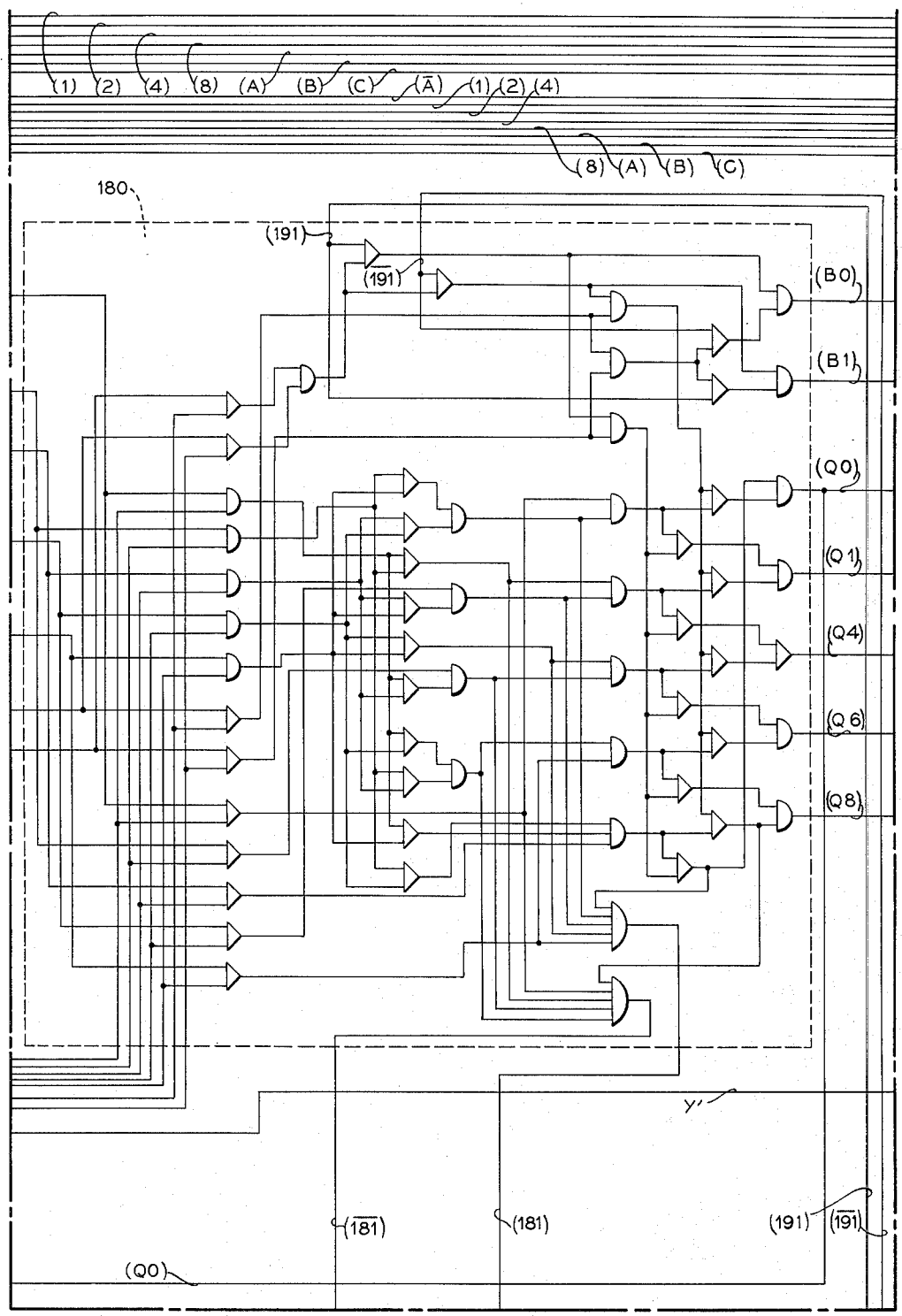
Figure 3F:
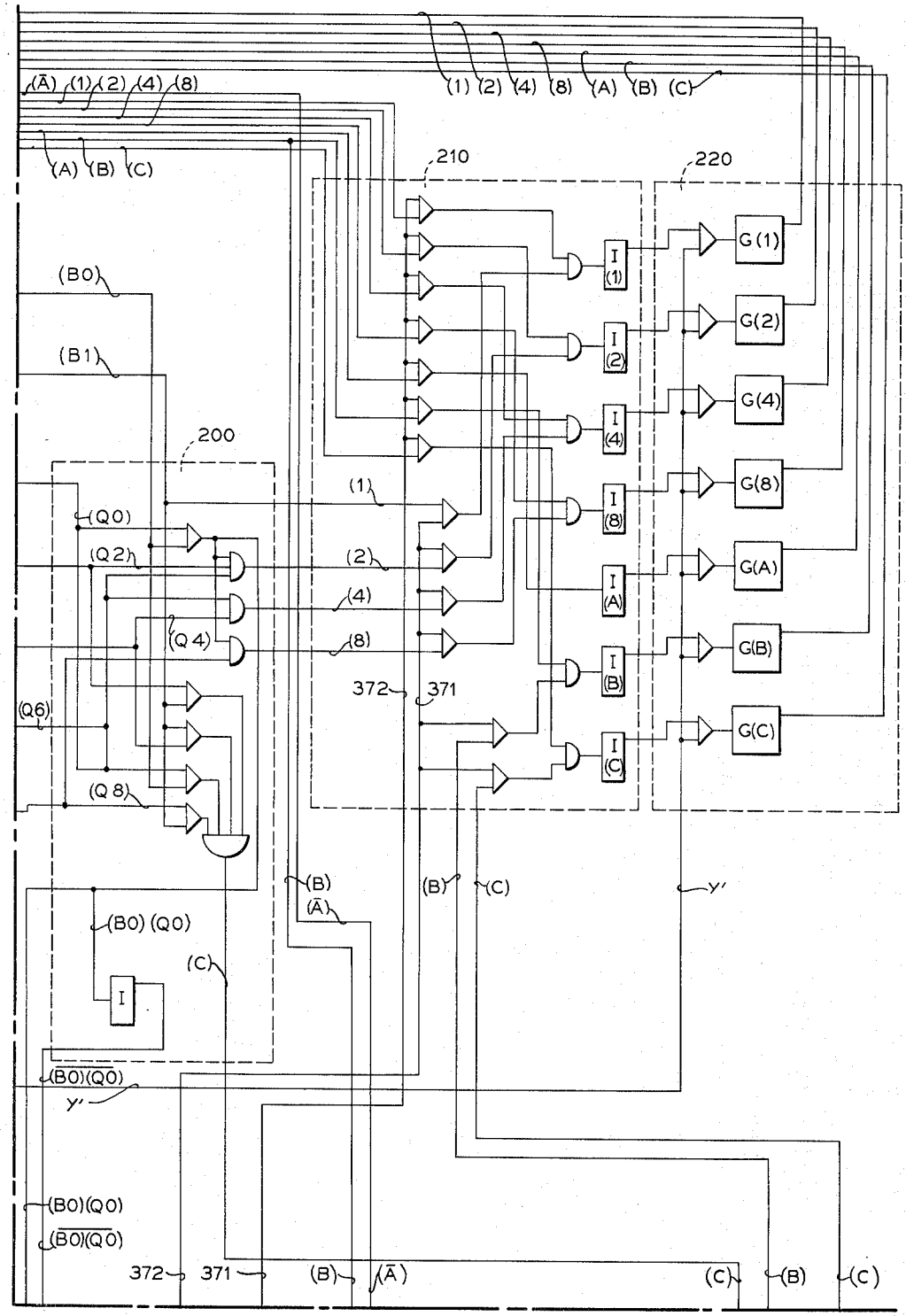
Figure 3G:
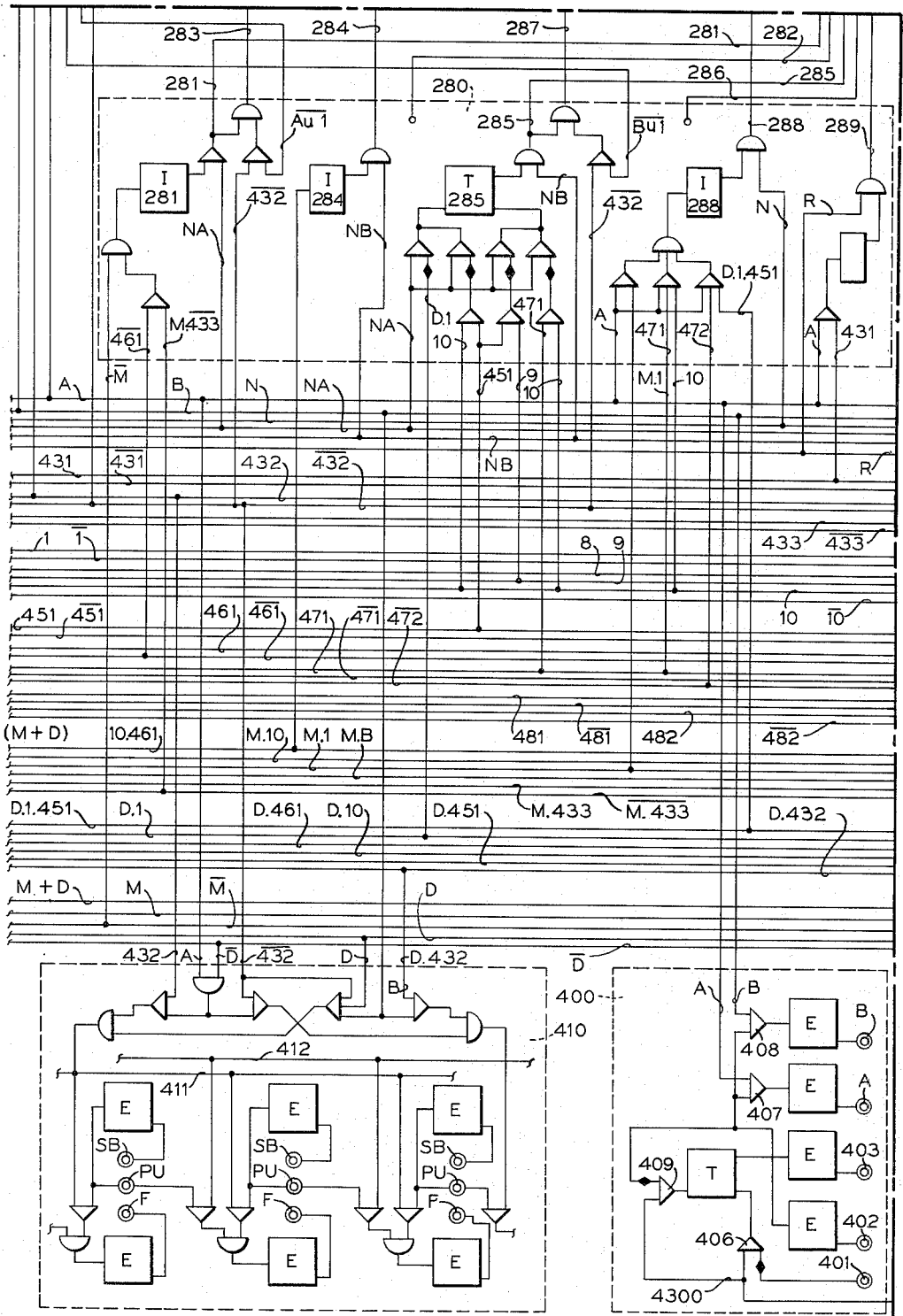
Figure 3H:
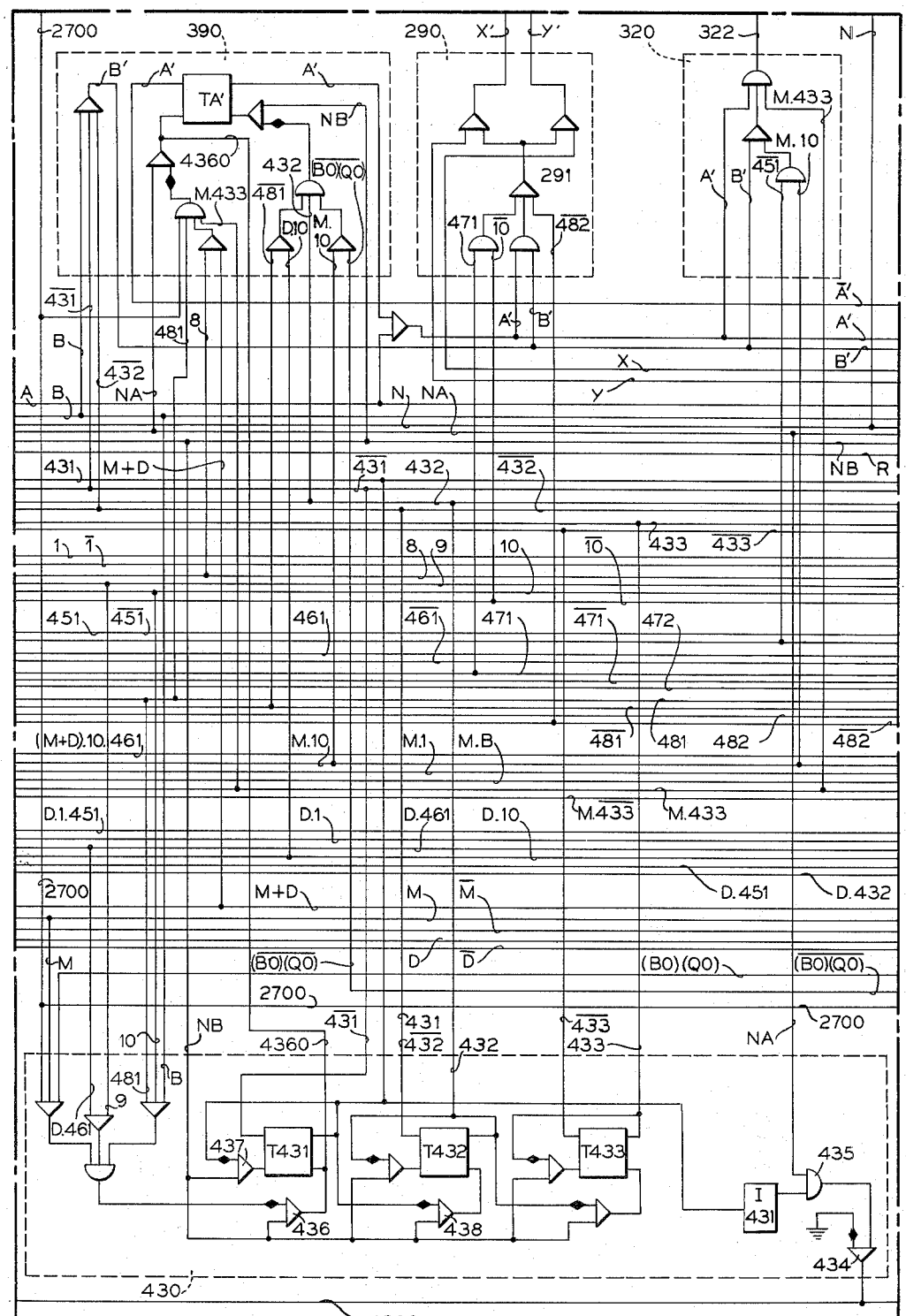
Figure 3I:
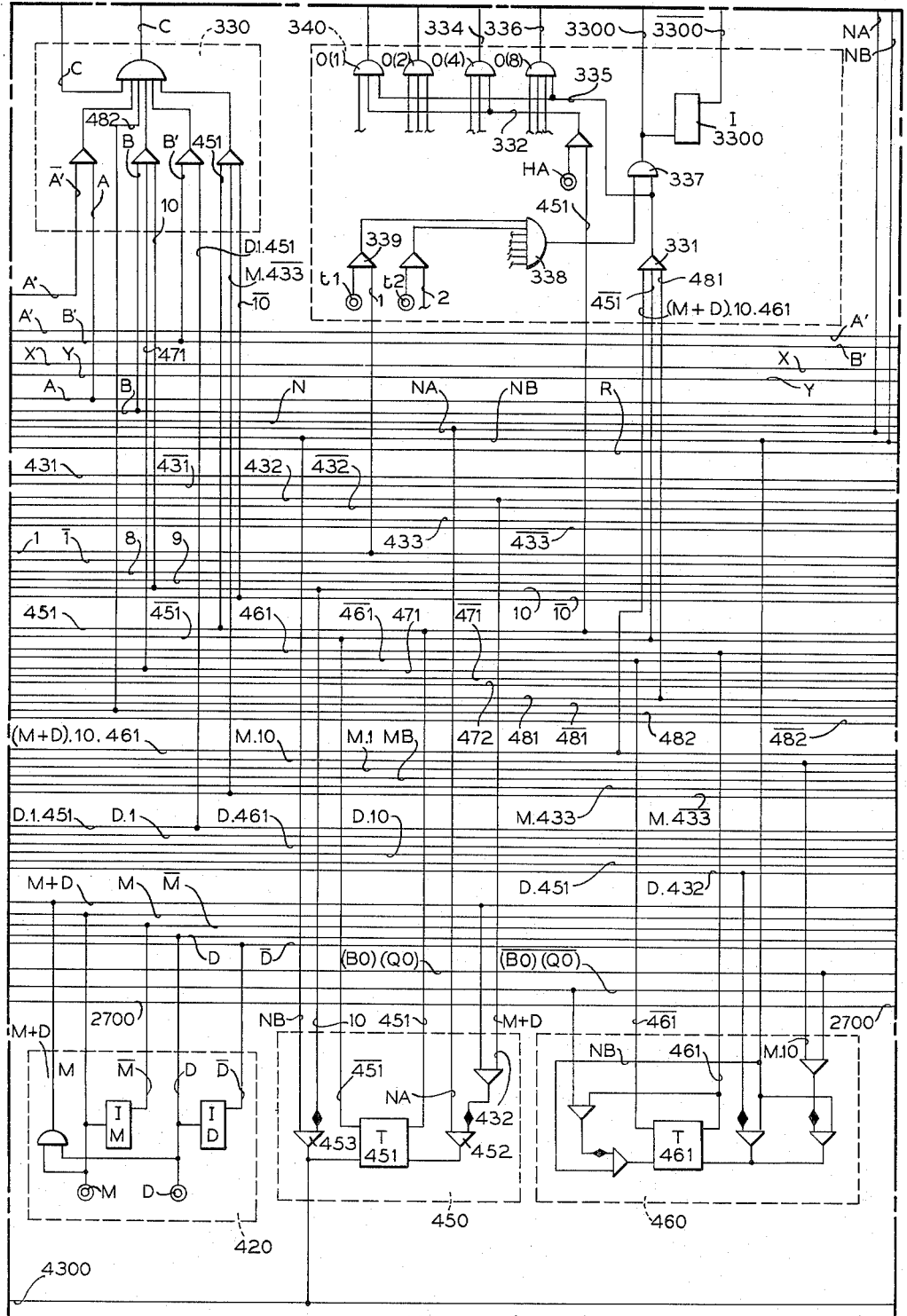
Figure 3J:
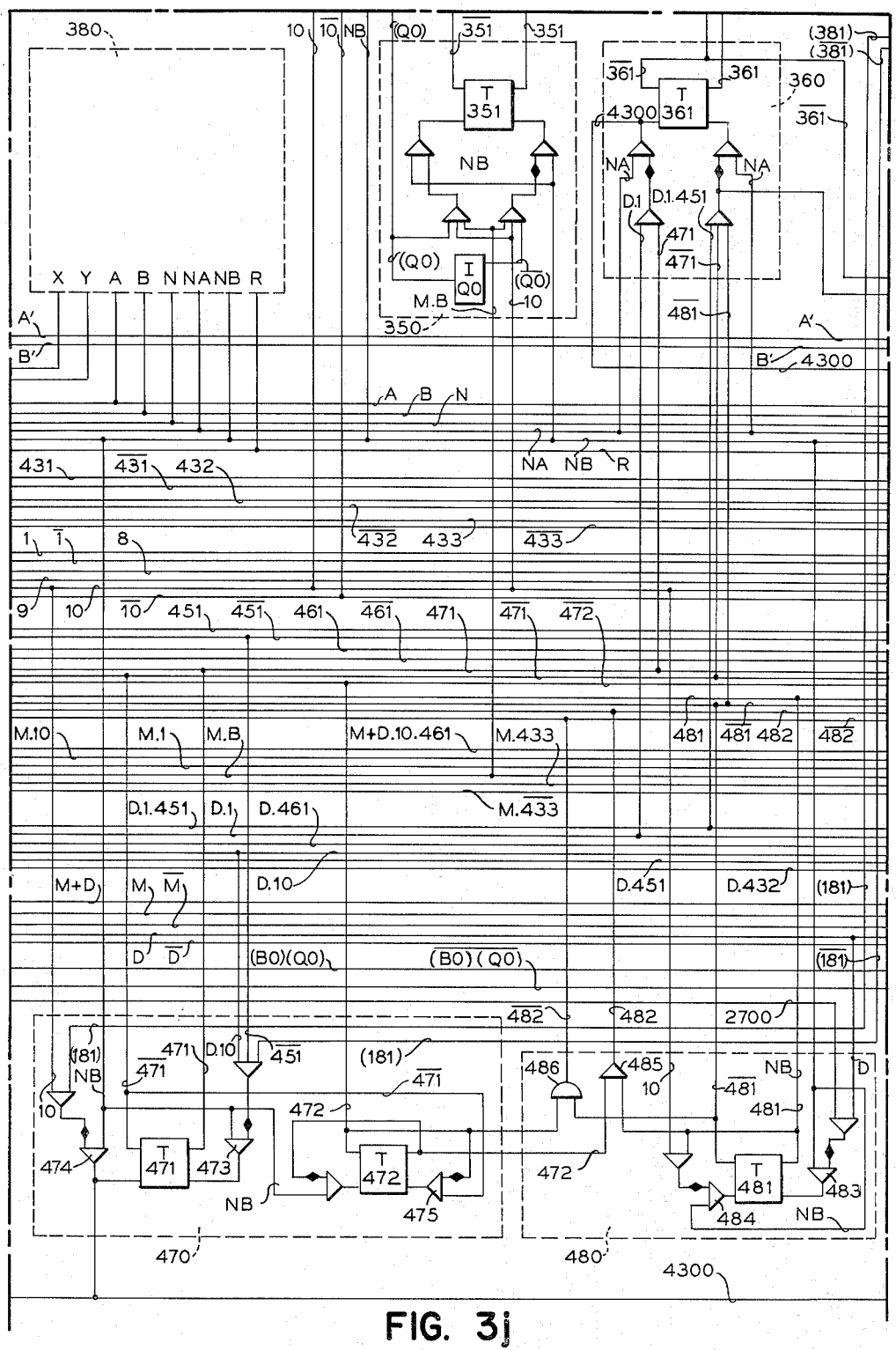
Figure 3K:
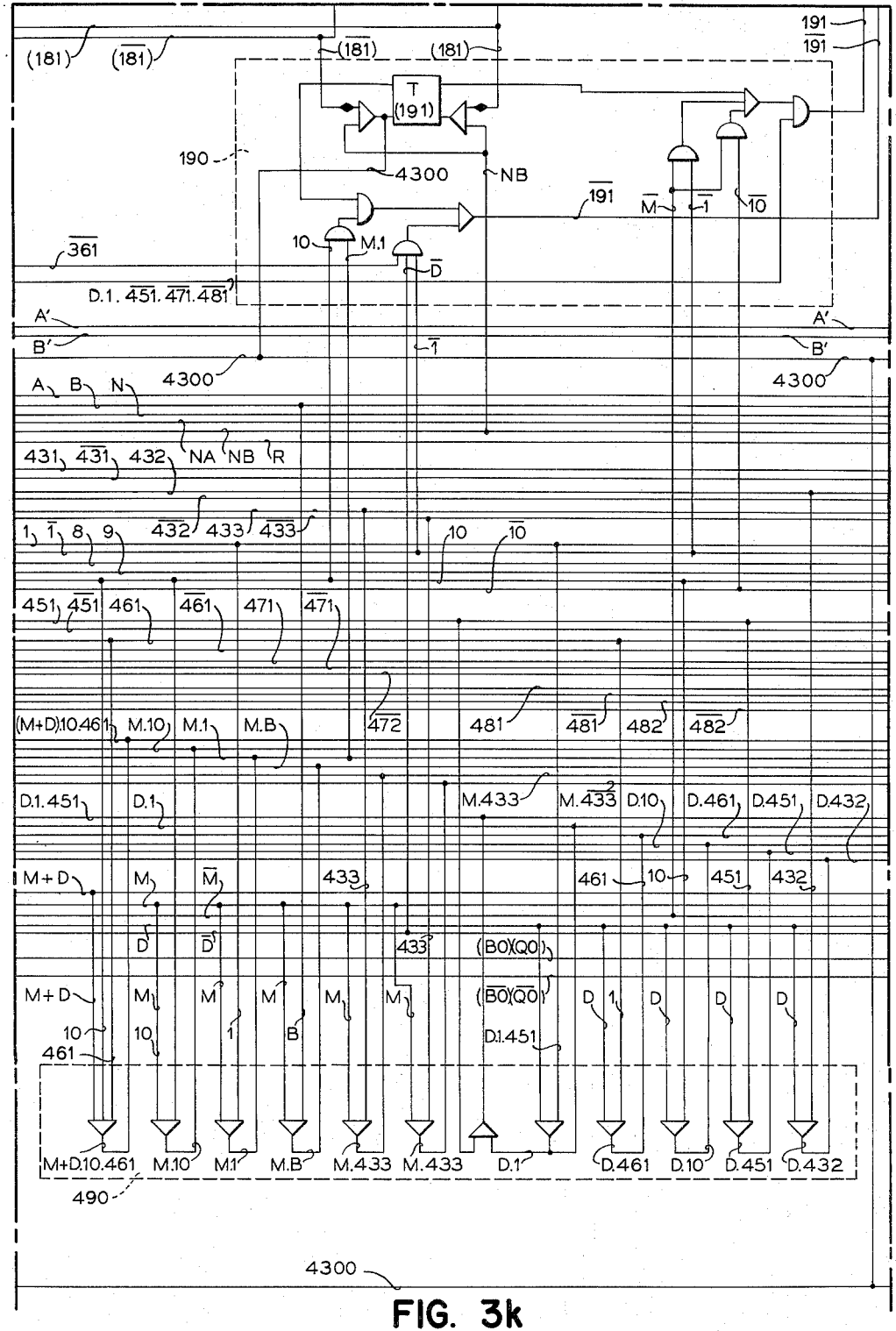

This group of blocks are represented in greater detail in FIGS. 3b to 3f, except for carry storage 190 which is represented in the top part of FIG. 3k and the sign circuits which are shown in the top part of FIG. 3l.

Core storage 100, FIG. 3b, as it will be explained later, comprises 80 positions, each position including seven magnetic cores. These 80 positions are grouped in eight series of ten.

Read amplifiers 110, FIG. 3b, amplify the pulses coming over the read lines of the core storage 100.

Register AB120, FIG. 3b, functions to temporarily store information read out of the main storage.

Translator 130, FIG. 3c, changes the modified binary representation of data into a qui-binary representation. The data in core storage 100 is in modified binary form and remains in this form as it is transferred to register 120. The data is processed in qui-binary form. Hence, the translator 130 is provided.

Register A140, FIG. 3c, temporarily stores data in qui-binary form which had been read out of one of the fields in storage 100.

Doubler 150 and carry storage 160 for the doubler is shown in detail in FIG. 3d.

Switch value true-value complementary 170, FIG. 3d, receives data directly from register A140 or from doubler 150.

Adder 180, FIG. 3e, adds the digit recorded in register AB120 (transmitted via translator 130) to the digit recorded in register A140, or to the double of said digit, or to its complement, according to the type of the control pulses received by doubler 150 and by switch 170.

The carry circuit 190 for the adder 180 is shown in detail in FIG. 3k.

The second translator 200, FIG. 3f, changes the quibinary representation of the quantities coming from the output of the adder 180 into the modified binary representation.

The regeneration-addition switch 210, FIG. 3f, transmits either the digits recorded in register AB120, in order to rewrite, without modification, these digits in core storage 100 and, consequently, the register 120, or the digit coming from the adder 180 and transmitted by translater 200.

Inhibition pulse generator 220, FIG. 3f, in cooperation with the chains A and B, writes in core storage 100 the digit transmitted by switch 210.

Sign computation block 230, FIG. 3l, determines the sign of the product or of the quotient.

Sign insertion block 240, FIG. 3l, transmits, when desired, the information resulting from the operation of the sign computation block to the generation-addition switch 210.

*Data transfer and insertion control blocks*

(BLOCKS REPRESENTING APPARATUS FOR CONTROLLING THE READOUT OF THE INFORMATION FROM CORE STORAGE 100 OR THE RECORDING INTO THIS STORAGE)

The scanning chains A and B each include a unit chain 250 and a tens chain 260, FIG. 3a.

The scanning chain locating block 270, which functions to position the chains A and B on the first position, is shown in detail in FIG. 3a.

Scanning chain control block 280, FIG. 3g, supplies pulses which cause the "progression" of the chains A and B.

Read and write gate 290, FIG. 3h, controls the passage of read or write pulses produced by the basic pulse generator 380.

Scanning pulse generator 300, FIG. 3b, is operated in response to the pulses coming from the chains A and B and those which come from the read and write gate and supplies the pulses which cause the switching of the cores in the core storage 100.

Storage block selection element 310, FIG. 3b, comprises a group of switches located on the path of the scanning pulses so that only one storage block be scanned by these pulses. (Blocks representing apparatus for controlling the other data transfers or insertions.)

Read amplifier control block 320, FIG. 3h, controls read amplifier 110.

Bit (C) insertion block 330, FIG. 3i, allows the insertion in register AB120 the check bit (C).

Digit insertion block 340, FIG. 3i, functions to decrease the multiplier one or two units, or to increase the quotient one unit, as it will be explained further.

Doubler control block 350, FIG. 3j, controls the use of the doubling circuits 150.

Value true-value complementary switch control block 360, FIG. 3j, supplies the pulses controlling the switch 170 to transmit either the true value of the digits that it receives or their 9 complement.

Switch regeneration-addition control block 370, FIG. 3l, controls the switch 210.

*Program blocks*

These blocks represent apparatus supplying the pulses which control continuation of the program. They may be classified into three groups:

Blocks representing apparatus supplying the timing pulses:
 (a) Basic pulse generator 380, FIG. 3i.
 (b) Basic pulse filter 390, FIG. 3h, which eliminates, in certain cases, some of the pulses supplied by generator 380.

Program definition blocks:
These blocks, shown at the bottom of FIG. 3g and FIG. 3i, are:
 (a) Stage trigger block 400, FIG. 3g, comprises, for each program stage, a trigger and a group of five hubs, the function of which will be explained further.
 (b) Field defining block 410, FIG. 3g, functions to define the selected storage blocks for the storage selection circuit 310 and the selected fields in the blocks.
 (c) Operation selection block 420, FIG. 3i, defines the operations to take place.

Program performance blocks:
These blocks, located at the bottom of FIGS. 3h to 3l, are:
 (a) Stage beginning chain 430, FIG. 3h, supplies, at the beginning of each program stage, three pulses T, S and U, the function of which will be explained further.
 (b) Order counter 440, FIG. 3l.
 (c) Special situation storages:
  First cycle storage 450, FIG. 3i.
  Zero test storage 460, FIG. 3i.
  Corrective cycle storage 470, FIG. 3j.
  Division end storage 480, FIG. 3j.
 (d) Pulse combiner 490, FIG. 3k.

OPERATION

*General*

Before giving a detailed description of the above-listed circuits, the performance of a multiplication and of a division operation will be explained, in order to specify the function of said circuits and the pulses they are to supply.

The core storage 100 may be a static storage, such as a magnetic core storage. Readout of data from this storage is destructive. Hence, if data is to be retained after readout, the data must be rewritten into storage.

This core storage 100 is made up of 80-position units, each position being used for recording a decimal number; the 80 positions are numbered from 1 to 80 from "left" to "right" (a position in on the left of another if its rank or order is lower), and the numbers are written in the usual way, the highest weight rank on the left and the unit rank on the right.

Each storage position comprises seven bits respectively called bits (1), (2), (4), (8), (A), (B), (C). The first four define the digit recorded in the position according to the regular binary code. Bit (B) defines the sign (if the number is negative, bit (B) of the unit position is in state 1, otherwise it is in state 0). Bit (A) is mentioned here only for recalling; it is used for the recording of alphabetical data and has no part in the machine's calculating components. Bit (C) is a check bit, its state must be such that the total number of bits of a storage position being in state 1 be odd; i.e., zero, for instance, bit (C) will be in state 1 and the other bits in state 0.

The factors of the operation to be performed are recorded, in two fields of the storage (belonging or not to the same unit). Field A will designate the field in which the multiplicand or the divisor is recorded and field B the one in which the multiplier or the dividend is recorded. The result of the operation (product or quotient) begins to take shape in an area near field B and may as well occupy a portion of this field, where it progressively replaces the factor which was written in it.

The duration of the operation is divided into "unitary times," each comprising two equal parts which will be designated as time A and time B. During time A, the digits may be read and written only in field A; and, during time B, they may be read and written only in field B.

Each field is defined through removable connections which define the beginning and the end of the field, according to the invention of copending application Serial No. 704,780, Estrems et al., filed December 23, 1957.

The reading of the various positions of the storage's fields A and B depends on two scanning chains, chain A and chain B. Each chain is a double chain made up of two single chains, a unit chain made up of ten triggers numbered from 1 to 10, and a tens chain made up of eight triggers numbered from 0 to 7. Each trigger comprises two stable states which will be designated as OFF state and ON state. In each single chain, only one trigger is ON, the others are OFF. The rank or order of the storage position in which the readings and the recordings are possible during a given time is supplied by the rank or order of the tens chain trigger and by the rank of the unit chain trigger which are ON during the given time. Further on in this description, the word "chain" will designate either a double chain "A" or "B", or a single chain "units A," "tens A," "units B," "tens B." It will be assumed, for instance, that chain A is on position 47 if trigger $n4$ of the "tens A" chain and trigger $n7$ of "units A" chain are in state ON.

As a result of pulses proceeding from chain control block 280, FIG. 3g, the chains may "progress"; i.e., switch from a position to the immediate left position; hence, the position rank decreases one unit, or "go back"; i.e., switch from a position to the immediate "right" position; hence, the position rank increases one unit.

The information in register AB120 is coded the same way as in core storage 100. In register A140, information is coded according to the qui-binary system. In this system, a storage position representing a decimal number includes two parts; the first, referred to as "quinary part," may occupy five states respectively corresponding to digits 0, 2, 4, 6 and 8. The other is referred to as the "binary part" and may occupy two states respectively corresponding to digits 0 and 1. The digit, which is represents by the storage position as a whole, is the sum of the digit corresponding to the quinary part and the one corresponding to the binary part.

The five elements of the quinary part are designated with symbols Q0, Q2, Q4, Q6, Q8, and the two elements of the binary part with B0 and B1. Only one element of the quinary part can be in state 1 and the other four are in state 0. An element of the binary part is in state 1 and the other is in state 0. The digit represented is obtained by adding the index of the two elements being in state 1.

UTILIZED PULSES

In order to facilitate the explanation of operation, Table 1 shows a list of the main signals occurring in this operation In the direction column, P indicates a positive signal and N a negative signal. In the duration column, $t$ represents the duration of a unitary time.

Table 1

In the table, no indication is given of the signals resulting from the combination of several signals; these are represented with the same symbols as the signals included in the combination, separated according to the rules of logical algebra, with a dot if this combination is an intersection (i.e., if the resulting signal exists only when all the combination signals exist), or with a sign + if this signal is a logical addition; i.e., if the resulting signal exists as soon as a combination signal exists. Thus, for instance, signal (B0), (Q0) requires the simultaneous existence of signal (B0) and O0), which, is a whole, represent digit 0; on the other hand, signal M+D exists if one of signal M or D exists.

It will be noted that the symbols of the signals representing information are between brackets. Thus, signals (A) and (B) represent bits in the modified binary system and cannot be mistaken for signals A and B, which are timing signals characterizing times A and B; also, signals (1), (2), (4) and (8) are not to be mistaken for signals 1 to 10 (rank counting signals).

In addition to the indicated signals, complementary signals may be used. A signal is complementary of another if it exists when the other does not exist, and vice versa. A complementary signal will be represented with the symbol of its complement with a dash on it. Thus, for instance, symbol $\overline{181}$ represents a signal which exists only during the absence of signal 181 (carry control).

The relative position in time of basic pulses is shown in FIG. 3.

Table 1.—List of signals

| | Symbol | Original Block | | Sign | Duration | Meaning or main duties |
| --- | --- | --- | --- | --- | --- | --- |
| | | Block | Figure | | | |
| 1. Information Signals: | (1) | Several | | P | Var | Determination of the digit value. |
| | (2) | | | P | | |
| | (4) | | | P | | |
| (A) "Semi-binary" shape | (8) | | | P | | |
| | (A) | | | P | | "Minus" sign. |
| | (B) | | | P | | Checking. |
| | (C) | | | P | | |
| | (Q0) | Several | | P | Var | |
| | (Q2) | | | P | | |
| | (Q4) | | | P | | |
| | (Q6) | | | P | | Determination of the digit value. |
| (B) "Qui-binary" shape | (Q8) | | | P | | |
| | (B0) | | | P | | |
| | (B1) | | | P | | |
| | (181) | 180 | 3e | P | $t$ | Carries (transmitted to carry storage 190 for recording). |
| | (191) | 190 | 3k | P | $t$ | Carry (transmitted to adder 180 for addition). |
| | (231) | 230 | 3l | P | Var | "Minus" sign (temporarily recorded). |

*Table 1.—List of signals.—Continued*

| | Symbol | Original Block | | Sign | Duration | Meaning or main duties |
|---|---|---|---|---|---|---|
| | | Block | Figure | | | |
| 2. Information carry control signals: | 281 | 280 | 3g | N | t/5 | "Units A" chain progression. |
| | 282 | 280 | 3g | N | t/5 | "Units A" chain regression. |
| | 283 | 280 | 3g | N | t/5 | "Tens A" chain progression. |
| | 284 | 280 | 3g | N | t/5 | "Tens A" chain regression. |
| (A) Carries into or from the main storage. | 285 | 280 | 3g | N | t/5 | "Units B" chain progression. |
| | 286 | 280 | 3g | N | t/5 | "Units B" chain regression. |
| | 287 | 280 | 3g | N | t/5 | "Tens B" chain progression. |
| | 288 | 280 | 3g | N | t/5 | "Tens B" chain regression. |
| | 289 | 280 | 3g | N | t/5 | Chain reset. |
| | u1–u9 | 260 | }3a | P | Var | Selection of the storage position in which the read and write operations are performed. |
| | d0–d7 | 270 | | | | |
| | X' | 290 | 3h | P | t/10 | Reading of information contained in the main storage. |
| | Y' | 290 | 3h | P | t/10 | Writing of information in the main storage. |
| | 321 | 320 | 3h | P | Var | Amplification and input in "Register AB" 120. |
| | 3300 | 330 | 3i | P | Var | Carry of digits from "Digit insertion block" 330 to "1st translator" 130. |
| | $\overline{3300}$ | 330 | 3i | P | Var | Carry of digits from "Register AB" 120 to "1st translator" 130. |
| | 341 | 340 | 3i | P | Var | Carry of digits from digit insertion block 340 to 1st translator 130. |
| | $\overline{341}$ | 340 | 3i | P | Var | Carry of digits from "Register AB" 120 to 1st translator 130. |
| | 351 | 350 | 3j | P | Var | Carry of digits from "Register A" 140 to doubler 150. |
| (B) Other carries | $\overline{351}$ | 350 | 3j | P | Var | Direct carry from "Register A" 140 to switch 170. |
| | 361 | 360 | 3j | P | Var | Carry of digits to adder 180 in "complementary value" through switch 170. |
| | $\overline{361}$ | 360 | 3j | P | Var | Carry of digits to adder 180 in "true value" through switch 170. |
| | 371 | 370 | 3l | P | Var | Carry of digits from "Register AB" 120 to inhibition pulse generator 220 through switch 210. |
| | 372 | 370 | 3l | P | Var | Carry of digits from 2nd translator 200 to inhibition pulse generator 220 through switch 210. |
| 3. Other Control Signals: | | | | | | |
| (A) Basic pulses | A | 380 | 3j | P | t/2 | Alternance A. |
| | B | 380 | 3j | P | t/2 | Alternance B. |
| | N | 380 | 3j | N | t/5 | Various releases at the end of any alternance. |
| Not filtered | NA | 380 | 3j | N | t/5 | Various releases at the end of alternance A. |
| | NB | 380 | 3j | N | t/5 | Various releases at the end of alternance B. |
| | R | 380 | 3j | N | t/5 | Various releases at the middle of a alternance. |
| | X | 380 | 3j | P | t/10 | Production of read pulse X'. |
| | Y | 380 | 3j | P | t/10 | Production of write—Y'. |
| Filtered | A' | 390 | 3h | P | t/2 | Various grants and especially reading during alternances A. |
| | B' | 390 | 3h | P | t/2 | Various grants during alternances B. |
| (B) Program defining signals | M | 420 | 3i | P | Whole Stage | Characterizes a multiplication. |
| | D | 420 | 3i | P | | Characterizes a division. |
| | 4300 | 430 | 3h | N | t/5 | Causes a stage change. |
| | 431 | 430 | 3h | P | t | Allows creation of signal 4300. |
| | 432 | 430 | 3h | P | t | Allows positioning of chains. |
| | 433 | 430 | 3h | P | t | Characterizes the time preceding the 1st cycle of a multiplication or the 1st time of the 1st cycle of a division. |
| (C) Program performing signals | 1–10 | 440 | 3l | P | t | Indicates the rank of the unitary time in the cycle. |
| | 451 | 450 | 3i | P | 10t+x | Characterizes the "first cycle" of a multiplication or a division starts a time X before this 1st cycle (in multiplication x=3t/2; in division x=t/2). |
| | 461 | 460 | 3i | P | Var | Indicates that a digit 0 has been read in the position at the extreme right of the multiplier or divider. |
| | 471 | 470 | 3j | P | 10t | Allows, in a division, to start and hold a corrective cycle. |
| | 472 | 470 | 3j | P | t | Characterizes the 1st unitary time which follows a corrective cycle. |
| | 481 | 480 | 3j | P | 11t | Characterizes the last cycle of a division. |
| | 482 | 480 | 3j | P | t | Characterizes the 1st unitary time of the last cycle of a division. |
| | 2700 | 270 | 3a | P | Var | Indicates that a chain has reached the extreme left position of a field (chain A case in division, chain A or B case in division), or the position located immediately to the right of field B (case of chain B in division). |

PERFORMING AN ADDITION

Since the multiplications and the divisions are made up of a series of additions (in true value or in complementary value), the description of an addition will be first given in order to avoid, further on, unnecessary repetitions.

Let us add number 37, written in field A to number 65, written in field B. It will be assumed that these numbers are positive. It is necessary to reserve in field B an empty position or a position containing digits 0 for the eventual carries. The operation lasts during three unitary times and data flows serially by digit, parallelly by bit.

On the first time, digit 7 is added to digit 5 giving a total of 2 which is written in field B in place of 5 and a carry which is recorded in the carry storage of the second time. Digit 3 is added to digit 6 and to the carry, giving a total of 0 which is written in field B on left of the 2 and a carry which is recorded in the carry storage of the third time. The carry is written to left of the 0.

The chronological sequence of operations within each unitary time is as follows (it will be assumed that the times A and B of this unitary time are each divided into five equal parts).

First unitary time

During the second part of time A, a read pulse causes the bits (1), (2) and (4); i.e., decimal 7, to go from the core storage 100 to register AB120. These bits remain recorded in register AB120 until the end of time A. As long as these bits are in register AB120, the output of first translator 130, FIG. 3c, has pulses representing digit 7 translated in qui-binary code; i.e., pulses ($Q_6$) and ($B_1$).

During the fifth part of time A, a read pulse causes the rewriting in the core storage 100, through switch re-generation-addition 210, FIG. 3f, then in regenerating position, of bits (1), (2) and (4) which had been erased by the reading.

At the end of time A, a pulse NA causes the recording, in register A140, signals ($Q_6$) and ($B_1$) existing on the output of first translator 130, and the reset of register AB120. As long as signals ($Q_6$) and ($B_1$) are recorded in register A140, these same signals exist on the output of switch "true complementary 170" because the doubler is not ON and switch "true complementary 170" is in position "true." If the doubler were ON, signals ($Q_4$) and ($B_0$) representing digit 4 would appear on the output of switch "true complementary 170." Further, if switch 170 were in position "complementary," signals ($Q_2$) and ($B_0$) representing digit 2 would appear.

The pulse NA also causes the formation of a pulse 281 which, in turn, causes chain A to progress so that, on the following unitary time, the information be read from the tens position.

During the second part of time B, a read pulse causes signals (1), (4) and (C) representing decimal digit 5 to go from the core storage 100 to register AB120. These bits remain recorded in storage AB120 until the end of time B. As long as signals (1) and (4) are recorded in register AB120, the output of first translator 130 has pulses representing decimal digit 5 in the qui-binary code; i.e., pulses ($Q_4$) and ($B_1$).

The adder 180, FIG. 3e, constantly supplies on its output signals representing the sum of the digits which it receives on its two inputs, which are connected, one to the output of switch "true complementary" 170, the other to the output of first translator 130. Hence, during the third, fourth and fifth parts of alternance B, there will be on the adder output signals ($Q_2$) and ($B_0$) representing digit 2, which results from the addition of digits 7 and 5. There will be also a signal represented by symbol (181). This signal will allow, at the end of time B, the recording of the carry. As long as signals ($Q_2$) and ($B_0$) exist on the output of the adder 180, a signal (2) representing digit 2 in the modified binary code exists on the output of translator 200.

During the fifth part of time B, a read pulse causes the writing of digit 2 in the core storage through switch re-generation-addition 210, FIG. 3f, then in position "addition."

At the end of time B, a pulse NB:

Causes the reset of registers AB120 and A140.

Switches on trigger $T_{191}$ of adder carry circuit 190, FIG. 3k, so that this trigger sends to the adder 180 a signal (191) which will remain during the entire following unitary time.

Causes chain B to progress so that, during the following unitary time, the information be read from the tens position.

Second unitary time

During the second unitary time, the operations occur in the same manner as during the first time; however, due to the presence of carry signal (191), the adder 180 will supply the sum of digits 3, 6 and 1; i.e. 0, and a signal (181). The carry trigger $T_{180}$ will not switch to OFF position at the end of time B because of the absence of a signal ($\overline{191}$) which is required to switch $T_{180}$ to OFF.

Third unitary time

During the third unitary time, no digit is read in field A and a digit 0 is read in field B. The adder 180 supplies a digit 1 coming from the preceding carry.

MULTIPLICATION

The multiplication is controlled by a pulse M supplied by operation selecting block 420, FIG. 3i. This signal is present during the entire duration of the program stage during which the multiplication operation is being performed. Field A is the storage field containing the multiplicand and field B is the one that contains the multiplier. In order to obtain such conditions, the following connections are to be made:

Input hub 401 of the selected stage program block 400, FIG. 3g, is connected to output hub 402 of the preceding stage, or to the program start hub if the multiplication is the first operation of the program.

Operation hub 403 of the stage block 400 is connected to hub M of the operation selecting block 420, FIG. 3i.

Field A hub 404 of the stage block 400 is connected to any hub PU of field defining block 410, FIG. 3g.

Storage block hub SB corresponding to said any hub PU, FIG. 3g, is connected to the position block hub of the storage block selection element 310, FIG. 3b, selecting the storage block; i.e., core storage 100, which contains in field A the multiplicand.

Field hub F corresponding to the same said any hub PU is connected to the hub of chain locating block 270, FIG. 3a, which corresponds to the position of the unit digit of the multiplicand in the selected storage block; i.e., core storage 100.

Hub F, FIG. 3g, located immediately to the right of the previous one, is connected to the hub of block 270, FIG. 3a, corresponding to the digit position located immediately to the left of the multiplicand's highest rank digit; it is recalled that the numbers are written in the storages with the highest rank digit on the left, as usual.

Field B hub of stage block 400, FIG. 3g, is connected to any other hub PU of field determining block 410.

Hub SB of stage block 410, FIG. 3g, is connected to the hub of block 310, FIG. 3b, selecting the storage block; i.e., core storage 100, which contains in field B the multiplier.

Hub F of field defining block 410 corresponding to this other hub PU, FIG. 3g, is connected to the hub of block 270, FIG. 3a, corresponding to the digit position located immediately to the left of the one which contains the multiplier's highest rank digit.

The product begins to take shape in the storage positions on the right of the multiplier and it is possible, during the operation, to cover totally or partially the field in which the multiplier was recorded. The unit digit of the product is offset nine ranks or positions from the unit digit of the multiplier. It results that a 9-position empty space is to be provided on the right of the multiplier. The information that might be recorded before the operation in the nine positions located on the right of the unit digit of the multiplier are erased at the beginning of the multiplication operation.

In this example, the multiplicand may have eight digits at most, and the multiplier may have up to 71 digits. Of course, these are limitations because of the chosen number of positions for the scanning chains and the storage capacity and are not resulting from the principle of the invention and may be changed through appropriate modes of realization.

The multiplication operation is performed through successive additions of the multiplicand or its double. The time during which a multiplication is performed makes up a "cycle." Each cycle comprises ten unitary times. If $n$ is the number of the digits of the multiplicand and $n \leq 8$, the first $n$ unitary times of the cycle are reserved for the addition, which is performed digit after digit starting from the unit digit, according to the rules of the "series" calculation. The $(n+1)$th unitary time being for the writing of an eventual carry, the following unitary times, if the multiplicand has less than eight digits, are dead times. During the tenth unitary time, the last multiplying digit is lowered two or one units, depending upon whether or not the doubler 150 has been used, and the digit thus lowered is tested. If the test shows that the digit is not zero, a new cycle similar to the first one is performed. If it shows a zero digit, chain A is stopped while chain B progresses until the reading of a digit not zero is encountered. A shift is thus performed through which the unit digit of the multiplicand, in the following cycles, is added in the position located nine ranks to the right of the new non-zero "unit" digit of the multiplier. The operation continues until the coincidence of a signal indicating that chain B has reached the position of the multiplier's highest rank digit and a signal indicating that this digit has become zero.

Besides the multiplication of the absolute values, the circuits perform the calculation and the writing of the sign of the product.

In order to facilitate understanding of the operation, a numerical example is to be chosen; it is quite obvious that the selected numbers might be replaced with any numbers.

Let us assume that the product of number 1956 by number (−1031) is to be performed. For instance, 1 9 5 6 will be chosen as multiplicand and 1 0 3 1 as multiplier. It will be assumed that multiplicand 1 9 5 6 is recorded in field A storage positions "33 to 36" of core storage 100 and multiplier − 1 0 3 1 in field B storage positions "45 to 48" of said core storage 100 or another block of core storage if there were more than one block. The unit digit of the product will hence locate itself in position 57. The negative sign of the multiplier is recorded, as stated above, in the unit position thereof. In order to simplify the explanation, a dash will be written on top of a digit when the storage position in which this digit is recorded contains a minus sign (i.e., a (B) element in state 1).

The multiplication operation includes the following phases:

A preliminary phase during which the chains go into position and the signs of the multiplicand and the multiplier are read.

A first cycle during which the following operations are performed:

Erasing of the information that may be in the nine positions located on the right of the multiplier which are positions 57 to 49.

Examination of the unit digit of the multiplier located in position 48, the further performance of the operation depends upon whether it is zero or not.

An adding cycle of the multiplicand follows, the unit digit of the sum being written in position 57. This cycle ends with decreasing the multiplier one unit, which then switches from 1 to 0; this switching to 0 causes:

(a) The zero test trigger to switch ON and consequently to prevent chain A from progressing,
(b) The stopping of the progression of the digit counter 440 which thus remains in position 10.

A unitary time interval follows during which chain A is stopped while chain B keeps on progressing, thus causing a shift. Chain B switches to position 47 which contains the tens digit; since this digit is not zero, the digit counter 440 is able to switch from position 10 to position 1 and chain A is able to resume its progression.

A new adding cycle follows in which, in accordance with the invention, the multiplicand itself is not added but its double. At the end of this cycle, the multiplier's tens digit is reduced by two units. Consequently, it switches from 3 to 1.

A new adding cycle follows in which the non-doubled multiplicand is added, because the multiplier digit has been reduced to 1. At the end of this cycle, the multiplier is reduced one unit and consequently switches from 1 to 0. This switching to 0 causes, as previously, to switch the zero test trigger ON; hence, stopping the progression of chain A, and to stop the progression of the digit counter 440.

An interval of two unitary times follows during which chain A is stopped while chain B keeps on progressing. During the first unitary time, chain B switches from position 47 to position 46 which contains the multiplier's hundreds digit. Since this digit is equal to zero, the zero test trigger remains ON and chain B switches from position 46 to position 45 which contains the multiplier's thousands digit (equal to 1). Since this digit is not zero, the zero test trigger switches OFF and the digit counter is able to advance.

An adding cycle follows during which the multiplicand is added to the number, the unit digit of which is in position 54. At the end of the cycle, the multiplier's thousand digit is reduced one unit, hence it switches from 1 to 0.

At this moment, chain B is in position 45 which is the extremity of field B; and, as it will appear in the detailed description of program block 400, FIG. 3g, the coincidence of a signal indicating that chain B is in this position with the signal indicating that the digit read in field B s zero causes an end-of-calculation signal which is used to start off the next step of the machine program.

Table 2 shows the digits recorded in the positions of field B at the end of the various phases mentioned above. In this table, the X's represent any digits.

Each one of the above phases will be described in detail. FIGS. 6a to 6g represent the state of the main circuits during the operation. As it appears in these figures, the time is divided into unitary times, each including times A and B which follow each other.

Figure 31:
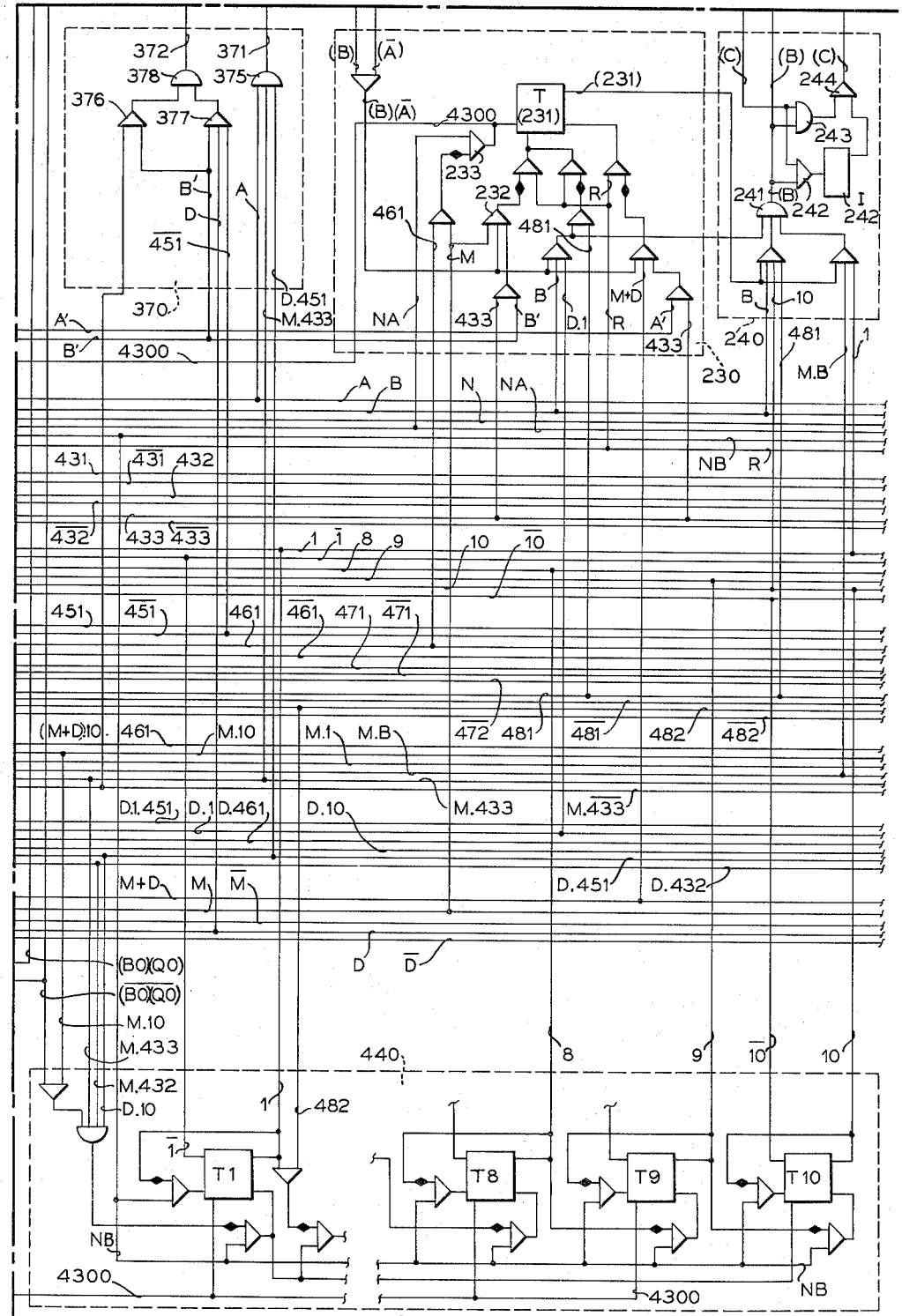
Figure 5:
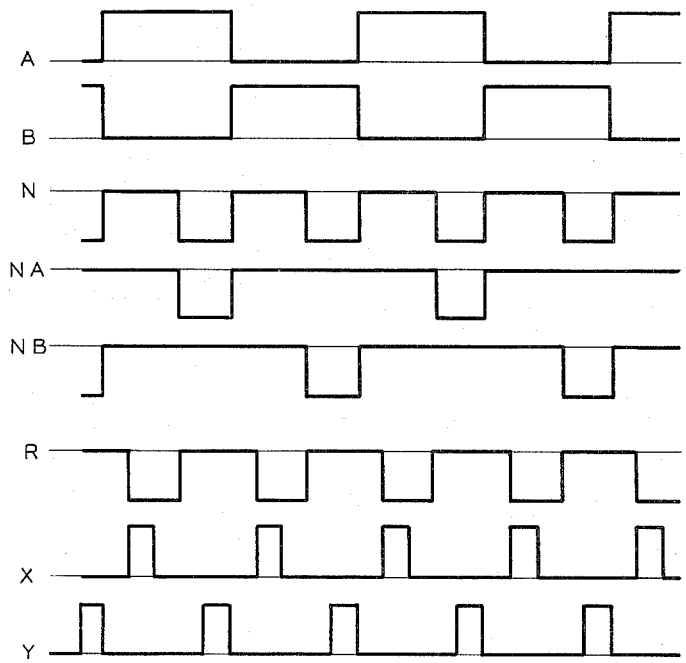
FIG. 5 is a timing diagram of basic impulses.
Figure 7:
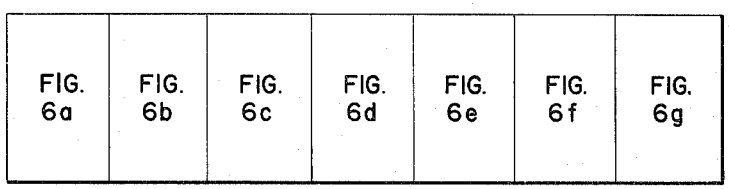
FIG. 7 is a diagram showing how

The various lines of FIGS. 6a to 6g give the following indications:

Time periods
State of the stage beginning chain
State of the rank counter
Advance pulses for chain A
Backward or retard pulses for tens chain A
Advance pulses of chain B
Backward pulses of tens chain B
States of chain A (rank of the position defined by this chain)
State of chain B (rank of the position defined by this chain)
Pulses transmitted by the read gate
Pulses transmitted by the write gate
Pulses A' (pulses A filtered through the basic pulse filter)
Output of the reading amplification control block 320 (controlling the input of information in register AB120)
State of the regenerating—adding counter ($r$ indicates state "regeneration," $a$ indicates state "addition")
Digit or bit recorded in register AB120
Digit recorded in register A140
Writing in field A (the dot indicates the moment of writing)
Writing in field B
Carry pulse (191)
Store sign in sign calculation storage 230 (FIG. 31)
Writing of the sign
State of the zero test storage 460
Operation of the doubler
Carry result from doubling The following explanation will describe the function and origin of the utilized pulses but, generally, without going into detail with respect to the operation of the blocks representing the apparatus that produces them. A detailed description of the apparatus for producing the pulses will subsequently be described.

*Table 2.—Performance of a multiplication*

| | Positions scanned during the phase | Digits Written at the End of the Phase |||||||||||||
|---|---|---|---|---|---|---|---|---|---|---|---|---|---|
| | | 45 | 46 | 47 | 48 | 49 | 50 | 51 | 52 | 53 | 54 | 55 | 56 | 57 |
| Digits written before the multiplication | 48 | 1 | 0 | 3 | $\bar{1}$ | X | X | X | X | X | X | X | X | X |
| 1st phase (preliminary phase) | 48 | 1 | 0 | 3 | 1 | X | X | X | X | X | X | X | X | X |
| 2nd phase (1st cycle) | 57–48 | 1 | 0 | 3 | 1 | 0 | 0 | 0 | 0 | 0 | 0 | 0 | 0 | $\bar{0}$ |
| 3rd phase (addition cycle) | 57–48 | 1 | 0 | 3 | 0 | 0 | 0 | 0 | 0 | 0 | 1 | 9 | 5 | $\bar{6}$ |
| 4th phase (interval) | 57 | 1 | 0 | 3 | 0 | 0 | 0 | 0 | 0 | 0 | 1 | 9 | 5 | $\bar{6}$ |
| 5th phase (addition of the double) | 56–57 | 1 | 0 | 1 | 0 | 0 | 0 | 0 | 0 | 4 | 1 | 0 | 7 | $\bar{6}$ |
| 6th phase (addition cycle) | 56–47 | 1 | 0 | 0 | 0 | 0 | 0 | 0 | 0 | 6 | 0 | 6 | 3 | $\bar{6}$ |
| 7th phase (interval) | 46–45 | 1 | 0 | 0 | 0 | 0 | 0 | 0 | 0 | 6 | 0 | 6 | 3 | $\bar{6}$ |
| 8th phase (addition cycle) | 54–45 | 0 | 0 | 0 | 0 | 0 | 0 | 2 | 0 | 1 | 6 | 6 | 3 | $\bar{6}$ |

*First phase (preliminary phase): three unitary times*

A stage end pulse produced at the end of the preceding operation, or a program beginning pulse if the multiplication is the first operation of a program, causes stage beginning chain 430, FIG. 3h, to start and, consequently, the presence of a pulse 431 which lasts a unitary time.

At the middle of time A of this unitary time, a pulse 289 produced by the chain control block 280, FIG. 3g, switches all the triggers and all the chains OFF.

At the end of this time A, a pulse 4300 produced by the stage beginning chain 430 causes, in stage trigger block 400, FIG. 3g, the switching ON of the trigger corresponding to the new stage (this switching ON is possible because hub 401 of this stage receives a positive voltage from hub 402 of the preceding stage or from the program beginning hub).

Pulse 431 is followed by a pulse 432 which also lasts one unitary time. At the end of time A of this unitary time, pulses 281 and 283 proceeding from chain control block 280, FIG. 3g, switch chain A to position 36; i.e., switch ON trigger 3 of tens chain A and trigger 6 of unit chain A. At the end of time B, pulses 285 and 287 switch chain B to position 48.

During pulses 431 and 432, no transfer occurs, since read and write gate 290, FIG. 3h, produces no pulses.

Pulse 432 is followed by a pulse 433 which lasts also one unitary time. During this time, there is no advance pulse A, hence chain A remains in position 36; at the end of time B, an advance pulse B285 switches chain B from position 48 to position 47.

During this unitary time 433, the following transfers and operations take place:

Time A: Due to a read pulse proceeding from read and write gate 290, FIG. 3g, the digit existing in position 36 of the storage; i.e., the unit digit of the multiplicand equal to 6, is transmitted to register AB120. At the end of time A, due to a write pulse, the digit 6 is written again in position 36 of the storage. This is possible because the regenerating-adding switch 210, FIG. 3f, is in the "regeneration" position and a pulse NA is coming from the basic pulse generator 380, FIG. 3i. It is transmitted to register A140 through the first translator 130. The sign trigger of the sign calculation block 230, FIG. 3l, does not switch from one state to another during this time, because the digit read into the storage is positive and therefore contains no bit (B). Register AB120 is emptied owing to a pulse N at the end of the time A.

Time B: Due to a read pulse, the digit existing in position 48 of the storage; i.e., the unit digit of the multiplier equal to $\bar{1}$, is transmitted to register AB120. At the end of the time B, due to a read pulse, the digit $\bar{1}$ is rewritten in position 48 because the regenerating-adding switch 210 is still in the "regeneration" position. During the multiplication, unitary time U is the only one for which switch regeneration-addition 210 remains in the regenerating position during time B. In the middle of time B, due to a pulse R, the sign trigger T(231), FIG. 3l, switches ON because the digit read nito storage is being negative and contains a bit (B).

At the end of time B, registers AB120 and A140 are both emptied. Moreover, owing to a pulse NB, rank counter 440, FIG. 3l, is switched to position 1; i.e., trigger T₁ of this counter is switched ON.

In conclusion, during this preliminary phase, the following operations have been performed:

The program stage has been changed.
The scanning chains have been set into position.
The product sign has been determined and stored to enable subsequently the writing of the sign in the unit position of said product.

*Second phase (first cycle): ten unitary times*

Before performing the operation, it is necessary to:
Erase the information that might be recorded in the positions in which the product is to take shape.
Determine whether the unit digit of the multiplier is zero or not, in order to determine the position in which the first addition of the multiplicand is to be performed.

To accomplish this, a so-called "first cycle" is performed. The actions or inhibitions taking place during this first cycle are controlled by a pulse 451 supplied by trigger T₄₅₁ which has been switched ON in the middle of "set" time characterized by the pulse 432.

It has been stated that pulse NB produced at the end of time 433 of the preliminary phase resulted in switching the rank counter to position 1. Subsequently, this counter is going to switch successively to positions 2, 3, etc., the change of posiitons taking place at the end of time B of each unitary time.

During the first nine unitary times of this first cycle:
No reading or writing occurs in core storage 100 during time A.

Readings are performed during time B. Read amplifier 110, FIG. 3b, does not receive any pulses from read amplifier control block 320, FIG. 3h; hence, the information read in field B is not transmitted to register AB120 and, consequently, may not be regenerated. Hence, the information is erased from the core storage 100.

Chain A progresses evenly to the left in the middle of each unitary time; however, this scanning has no result since there is no transfer during time A.

Chain B is caused to move backward from position 47 to position 57 in the middle of the first unitary time, due to a pulse 288 supplied by the chain control block 280, FIG. 3g. It switches from the position located on the left of the multiplier's unit digit to the position in which the unit digit of the product is to be written. Then, it progresses evenly one position at the end of each unitary time.

At the end of the ninth unitary time, the nine storage positions located on the right of the multiplier's unit digit (positions 57 to 49) have been erased. Chain B, keeping on progressing evenly, switches then to position 48, which contains the multiplier's unit digit; it will remain there during the tenth unitary time.

At the tenth unitary time, the reading amplifier control is resumed. The digit read in position 48 at the beginning of time B is consequently transmitted to register AB120, and, through first translator 130, to the input of the adder 180. Register A140 contains digit 0 since no reading took place in field A. Hence, the digit supplied by the adder 180 will be the one read in position 48; i.e., the multiplier's unit digit. The regeneration-addition switch 210, being in the adding position (it is recalled that it is in this position for every time B except for time 433 of the preliminary phase), the multiplier's unit digit is rewritten in position 48. It may be noted that it is rewritten without its sign, the latter being not transmitted by the translator.

At the end of the tenth unitary time:

First cycle trigger $T_{451}$, FIG. 3j, reset OFF.

The rank counter 440 switches from position 10 to position 1; i.e., the first adding cycle starts immediately. This switching would not have been possible if the digit supplied by the adder's output had been zero; i.e., if the adder had simultaneously supplied pulses $(B_0)$ and $(Q_0)$.

Zero test trigger $T_{461}$, FIG. 3i, is OFF; it would have been ON if the adder had supplied pulses $(B_0)$ and $(Q_0)$.

Chain A backs ten units; i.e., it switches from position 26 to position 36, which contains the multiplicand's unit digit; hence, the chain is positioned for a regular adding cycle.

The control trigger $T_{351}$ of doubler block 350, FIG. 3j, is reset, if it was not already OFF. This reset is due to the presence of a pulse $(Q_0)$ proceeding from the adder 180 and indicating that the multiplier's digit is lower than 2. The next adding cycle will thus take place without use of the doubler.

*Third phase (adding cycle): ten unitary times*

During this cycle:

Chain A progresses evenly one rank to the left, during the middle of each unitary time, and thus switches progressively from position 36 to position 26 (in order to switch back to position 36 at the end of the cycle).

Chain B backs up ten ranks during the middle of the first cycle and this locates it on the unit position of the product (position 57); then, it progresses evenly one rank at the end of each unitary time, and, consequently, is at the tenth unitary time in position 48 (unit position of the multiplier).

The reading and the writing are possible during times A and B during the first four unitary times (i.e., as long as the positions scanned by chain A remain in field A which contains the multiplicand's four digits); after the fourth unitary time, they are possible only in field B.

During each of the first four unitary times, the digit contained in field A (multiplicand) is added to the corresponding rank digit in the field scanned by chain B; i.e., the partial product. In this first adding cycle, the partial product is zero and, consequently, the multiplicand is transferred without any change.

At the end of the first unitary time, the regeneration-addition switch receives, besides elements (2), (4) from the second translator 200 to represent digit 6 (unit digit of the multiplicand), a bit (B) from the sign calculation block 230, FIG. 3l, transmitted by the sign insertion block 240, FIG. 3l. If the number of bits representing the unit digit had been odd, the sign insertion block would have supplied a bit (C). Thus, the product's sign is written in the unit position.

From the fifth to the ninth unitary time included, the readings are performed only during time B and digits "0" contained in the positions scanned by chain B are retransmitted without modification by the adder and rewritten in these positions.

At the tenth unitary time, a digit 9 is written in register A140 by block 340, FIG. 3i. This digit is added to the digit read in the storage and recorded in register AB120; i.e., to digit 1 (unit digit of the multiplier), and it is the sum of these two digits; i.e., digit 0, which is written in the unit position of the multiplier at the end of time B. It is to be noted that, at the tenth unitary time of a cycle, the carry trigger of the adder cannot be switched ON.

The existence of a digit 0; i.e., pulses $(B_0)$ and $(Q_0)$ on the output of the adder 180 causes:

The rank counter to remain in position 10 rather than switch to position 1.

Trigger $T_{461}$ of the zero test storage, FIG. 3i, to switch ON so that this storage will supply a pulse 461 until the reset of the trigger.

At the end of the tenth unitary time of the present cycle, as at the end of the tenth unitary time of the first cycle, chain A backs up ten ranks, switching from position 26 to position 36, and chain B progresses normally one rank, switching from position 48 to position 47.

*Fourth phase (shift interval): one unitary time*

During the unitary time which follows the preceding adding cycle:

Chain A remains in position 36, pulse 461 preventing it from progressing.

Chain B does not go backward (backing up occurring only when the rank counter is in position 1); but, at the end of time B, it receives the usual advance pulse which switches it from position 47 to position 46.

Reading is not possible during time A.

Reading occurs during time B, so that digit 3 read in position 47 (tens position of the multiplier) is added to digit 0 contained in register A and the addition result; i.e., digit 3, is rewritten in position 47. Moreover, since the adder no longer supplies pulses $(B_0)$ and $(Q_0)$ simultaneously, pulse NB produced at the end of time B resets trigger $T_{461}$ of the zero test storage 460, FIG. 3i, and suppresses pulse 461. This same pulse NB switches the rank counter 440 from position 10 to position 1. The adder no longer supplying pulses $(Q_0)$ switches trigger T351 ON in doubler control block 350, FIG. 3j.

At the end of time A, the trigger of the sign calculation block is reset so that the sign insertion block does not supply the bit element (B).

*Fifth phase (adding cycle with use of the doubler)*

This cycle is similar to the preceding adding cycle (third phase) with the difference that the multiplicand itself is not added, but its double, and that the correspondence between the ranks of the two factors of the addition is shifted one unit. Hence, the operation performed during this cycle is the following:

| | | | | |
|---|---|---|---|---|
| Former partial product | | 1 9 5 | (6) |
| Double of the multiplicand | 3 9 1 2 | | |
| New partial product | 4 1 0 7 | (6) |

It is to be noted that digit 6 of the unit rank is not transferred during the cycle, the position which it occupies, position 57, being not scanned.

On the tenth unitary time, a 9 is written in rgeister A by the insertion block 340, FIG. 3i. This 9 is transmitted to the adder through the doubler; the doubler changes it into an 8 which is added to the digit read during time B, i.e., to digit 3, and the result of the addition of these two digits; i.e., digit 1, is written in position 47 in place of digit 3.

One of the pulses supplied by the adder to represent digit 1 being pulse ($Q_0$), trigger $T_{351}$ of the doubler's control block, FIG. 3j, is reset by pulse NB which ends the tenth unitary time so that the doubler is switched OFF for the next cycle.

At the end of the tenth unitary time, since the adder does not simultaneously supply a pulse ($B_0$) and a pulse ($Q_0$), the rank counters switch from position 10 to position 1 and trigger $T_{461}$ of the zero test storage 460 is not switched ON.

*Sixth phase (adding cycle without use of the doubler): ten unitary times*

This phase is similar to the previous one, with the difference that the multiplicand itself is added and not its double. Hence, the following operation is performed:

| | | |
|---|---|---|
| Former partial product | 4 1 0 7 | (6) |
| Multiplicand | 1 9 5 6 | |
| New partial product | 6 0 6 3 | (6) |

On the tenth unitary time, a 9 is written in register A by block 340; its addition to digit 1, read during time B, gives 0; i.e., the adder supplies simultaneously a pulse ($B_0$) and a pulse ($Q_0$).

Hence, the rank counter 440 cannot switch from position 10 to position 1.

Further, trigger $T_{461}$ of the zero test storage is switched ON at the end of the tenth unitary time.

*Seventh phase (shift interval): two unitary times*

During the unitary time which follows the previous adding cycle:

Chain A remains on position 36, pulse 461 preventing it from going forward.

Chain B does not back up since the rank counter is still in position 10; at the end of time B, it receives the regular advance pulse which switches it from position 46 to position 45; i.e., from the multiplier's hundreds position to the thousands position.

There is no reading during time A.

During time B, the digit being in position 46; i.e., digit 0 (multiplier's hundreds digit), is read, transferred in register AB120, sent to the adder 180 which transmits it without modification since there has been no reading in field A and rewrites it in position 46.

The adder's output including a pulse ($B_0$) together with a pulse ($Q_0$) causes the rank counter 440 to remain in position 10, trigger $T_{461}$ of the zero test storage to stay ON, and trigger $T_A'$ of basic pulse filter 390 to stay OFF. This prevents the rewriting and reading during time A of the next unitary time.

At the next unitary time:

Chain A remains in position 36.

Chain B does not back up; and, at the end of time B, it switches from position 45 to position 44.

There is no reading during time A.

During time B, the digit being in position 45; i.e., digit 1 (thousands digit of the multiplier), is read, transferred to register AB120, sent to the adder which transmits it without modification and rewrites it in position 45.

Since the output of the adder does not include simultaneously a pulse ($B_0$) and a pulse ($Q_0$), pulse NB produced at the end of the unitary time switches the rank counter from position 10 to position 1, resets trigger $T_{461}$ of the zero test storage and switches back ON trigger $T_A'$ of the basic pulse filter (which allows to resume reading during time A).

*Eighth phase (adding cycle): ten unitary times*

This cycle is similar to the other adding cycles. The performed operation is the following:

| | | | | |
|---|---|---|---|---|
| Former partial product | 6 0 | (6) | (3) | (6) |
| Multiplicand | 1 9 5 6 | | | |
| Product | 2 0 1 6 | (6) | (3) | (6) |

At the tenth unitary time, a 9 is sent into register A140 and its addition to digit 1 read during time B gives 0. The coincidence of pulses ($B_0$) and ($Q_0$) supplied by the adder with pulse "Stop" supplied by chain locating block 270, FIG. 3a, because chain B is on the extreme left position of field B, and pulse M, which exists during the whole multiplying operation, causes in stage beginning chain 430, FIG. 3h, a stage end signal which allows pulse NB to switch trigger $T_{431}$ ON and to start a new program stage or, according to the wiring of program stage block 400 of FIG. 3g, to cause a program end signal.

MULTIPLICATION WITH "HALF-ADJUST"

"Half-adjust" will designate the operation which relates to suppressing one or several digits at the end of the result (or to replace these digits with zeros) and to increase one unit the last digit kept if the first suppressed digit was equal to or greater than 5.

This one unit increase may be reached very easily by adding 5 to the first digit to be suppressed before erasing it.

In many cases, it is not necessary to perform the erasing; if, for instance, the result of the multiplication must be printed, it is sufficient to define correctly the storage field which is to be used for the printing (field which stops at the last digit kept) and to insert automatically the number with zeros if necessary. A method for adding zeros is described, for instance, in copending patent application Serial No. 704,782, for Editing Machine, filed December 23, 1957, Estrems et al. Hence, the half-adjust may amount to nothing more than the addition of 5 to the first digit to be suppressed.

This addition of 5 may take place during the "first cycle" (cycle for erasing the positions in which the product is to be written). If the half-adjust is wanted, hub 403 in program block 400, FIG. 3g, is wired not only to hub M of operation selection block 420 as for an ordinary multiplication, but also to hub HA of digit insertion block 340, FIG. 3d, and to the one of hubs $J_{ins}$ which corresponds to the digit rank to which 5 is to be added. If for example, this digit is the digit of rank 1 (unit digit), hub $t_1$ will be used.

If it is desired to perform the multiplication operation according to the example above; i.e., 1956 by (−1031), with half-adjust to the tenths digit (i.e., by suppressing the unit digit), the hubs will be wired as stated above. The sequence of the operation will be exactly the same as the multiplication described above in detail, with this difference. At the end of time A of the first unitary time of the second phase (phase called "first cycle"), a 5 is entered in register A140. This 5 adds to the digit entered in register AB120 during time B of this unitary time; i.e., 0; at the end of the "first cycle," a digit $\bar{5}$ will thus be written in position 57 instead of a digit $\bar{0}$ (see table 2). At the next cycle, this 5 will be added to the unit digit of the multiplicand; i.e., 6, which causes a carry in position 56 which will hence contain, at the end of the cycle, a 6 instead of a 5 and, at the end of the multiplication, the written product will not be 2, 016 $63\bar{6}$ but 2 016 $64\bar{1}$.

DIVISION

The division is controlled by a pulse D supplied by operation selection block 420, FIG. 3i, and remaining during the whole duration of the program stage controlling the division operation. The divisor is contained in field A and the dividend is contained in field B. In order to reach these conditions, wire:

input hub 401 of the program stage block 400, FIG. 3g, to output hub 402 of the preceding stage or to program beginning hub, not shown, if the division is the first operation or step of the program.

operation hub 403 of the stage block 400, FIG. 3g, to hub D of the operation selection block 420, FIG. 3i.

field A hub of the stage block 400, FIG. 3g, to any hub PU of field defining block 410.

storage block hub SB corresponding to said any hub PU to the hub of storage block selection 310, FIG. 3b, corresponding to the storage block; i.e., core storage 100, which contains the divisor.

hub F corresponding to this same hub PU of the field defining block 410 to the hub of chain locating block 270, FIG. 3a, which corresponds to the position of the divisor's unit digit in the selected storage block.

hub F located immediately to the right of the preceding hub F of field defining block 410 to the hub of chain locating block 270 corresponding to the position located immediately to the left of the highest rank digit of the divisor.

field B hub of the stage block 400 to any other hub PU of field defining block 410.

hub SB corresponding to said any other hub PU to the hub of storage block selection 310 corresponding to the storage block; i.e., core storage 100, which contains the divisor and the dividend.

hub F corresponding to said any other hub PU to the hub of block 270 corresponding to the position of the dividend's unit digit.

hub F located immediately to the right of the latter to the hub of block 270 corresponding to the position located immediately to the left of the one containing the highest rank digit of the dividend.

The quotient begins to take shape on the left of the dividend and may, during the operation, cover totally or partially the field in which the divisor was recorded. Its highest rank digit is offest nine ranks from the one of the dividend. It results that a 9-position empty space is to be provided on the left of the dividend. In any event, the information that might be recorded before the operation in the nine positions located to the left of the dividend are erased at the beginning of the operation.

In this example, the divisor may have eight digits at most; the dividend may have up to 71 digits. Of course, these are limitations which arise because of the scanning and storage capacity and are not due to the principle of the invention and may be changed through adequate mode of realizations.

The division operation is performed through successive subtractions. The time during which a subtraction is performed makes up a cycle. Each cycle includes ten unitary times. If $n$ is the number of digits of the divisor and $n \leq 8$, the first $n$ unitary times of the cycle are reserved for the subtraction which is performed digit after digit, according to the rules of the series calculation, through the addition to the dividend's digit of the 9 complement of the divisor's digit or, for the unit rank, of the 10 complement. For the ranks of higher order than the $n$th, it is assumed that the divisor's digits are replaced with zeros and the complement of 0 is added; i.e., 9. If the number to be subtracted is lower than the number from which it is subtracted, this addition constantly gives carries; the carry obtained on the ninth rank is, normally, added to the quantity existing in the position located immediately to the left; i.e., the unit position of the quotient. On the contrary; i.e., if the number to be subtracted is higher than the one from which it is subtracted, the addition of the complement does not give any carry on the ninth rank. This lack of carry indicates that one excessive subtraction has been performed and it starts a corrective adding cycle during which the true value of the divisor is added and not its complement. On the tenth unitary time of this cycle, a 9 is inserted in register A140 and is added to the carry proceeding from the ninth rank, so that the unit digit of the quotient is not modified. The corrective cycle is followed by a shift after which the rank of the dividend's digit corresponding to the divisor's unit digit is moved one unit to the right. This shift is obtained by stopping chain B during a unitary time while chain A progresses normally. Then, one or several new subtractions are performed until the lack of a carry on the ninth rank causes the performance of a new corrective cycle and a new shift. The operation goes on until the successive shifts cause the right position of the field scanned by chain B to pass over the limit of field B. This stepping over causes the performance of a special cycle named "division end cycle," during which the quotient sign is determined and written and at the end of which an operation end signal controls the continuation of the machine program.

In certain cases, it could be possible to cut down the duration of the operation by subtracting the double of the divisor instead of the divisor itself. But this method would require more intricate circuits and would demand, in certain cases, the repetition of the corrective adding cycle. This is why, in this example of realization, the doubling of the divisor is not provided. Of course, those skilled in the art would easily determine the changes to be made to the presently described apparatus of the invention if said doubling were used.

In order to facilitate the understanding of a division operation, a numerical example will be chosen; it is quite obvious that the selected numbers could be replaced with any numbers.

Let us assume that the division of number (−5512) by number (27) is to be performed. It will be supposed that the dividend (− 5 5 1 2) is recorded in positions 45 to 48 of field B of a storage block; i.e., core storage 100, and that the divisor (27) is recorded in positions 34 and 35 of this same block of core storage 100 or of another block of core storage. The quotient will be written in the field of the nine digits located on the left of the dividend (field which includes positions 36 to 44). The negative sign of the dividend is recorded, as stated above, in the unit position thereof. In order to facilitate the explanation, a dash will be written on top of a digit to indicate that the same is minus.

The division operation comprises the following phases:

(1) A preliminary phase during which the chains are set into position.

(2) A first cycle during which the following operations are performed:
 reading of the sign of the divisor.
 examination of the divisor digits; if all these digits are zero, a warning signal occurs.
 erasing of the information that may be in the nine positions located on the left of the dividend.

(3) A series of subtraction cycles and corrective addition cycles which will be explained in detail further on.

(4) A final cycle which will be termed "division end cycle," during which the dividend sign is read, the quotient sign is calculated and written.

Table 3 shows, for the various phases, the field scanned by field B during the phase and the digits written at the end of the phase. In this chart, the X represents any digits. In the "scanned positions" column, only the positions in which chain B is located during time B appear.

Table 3.—Performance of a division

| | Positions Scanned during the Phase | Digits Written at the End of the Phase in Positions— | | | | | | | | | | | | | |
|---|---|---|---|---|---|---|---|---|---|---|---|---|---|---|
| | | 36 | 37 | 38 | 39 | 40 | 41 | 42 | 43 | 44 | 45 | 46 | 47 | 48 | 49 |
| Before the division | | X | X | X | X | X | X | X | X | X | 5 | 5 | 1 | $\bar{2}$ | X |
| First phase (preliminary phase) | | X | X | X | X | X | X | X | X | X | 5 | 5 | 1 | $\bar{2}$ | X |
| Second phase (first cycle) | 44 to 36 | 0 | 0 | 0 | 0 | 0 | 0 | 0 | 0 | 0 | 5 | 5 | 1 | $\bar{2}$ | X |
| Third phase (subtraction) | 45 to 36 | 0 | 9 | 9 | 9 | 9 | 9 | 9 | 9 | 7 | 8 | 5 | 1 | $\bar{2}$ | X |
| Fourth phase (addition) | 45 to 37+46 | 0 | 0 | 0 | 0 | 0 | 0 | 0 | 0 | 0 | 5 | 5 | 1 | $\bar{2}$ | X |
| Fifth phase (subtraction) | 46 to 37 | 0 | 1 | 0 | 0 | 0 | 0 | 0 | 0 | 0 | 2 | 8 | 1 | $\bar{2}$ | X |
| Sixth phase (subtraction) | 46 to 37 | 0 | 2 | 0 | 0 | 0 | 0 | 0 | 0 | 0 | 0 | 1 | 1 | $\bar{2}$ | X |
| Seventh phase (subtraction) | 46 to 37 | 0 | 2 | 9 | 9 | 9 | 9 | 9 | 9 | 9 | 7 | 4 | 1 | $\bar{2}$ | X |
| Eighth phase (addition) | 46 to 38+47 | 0 | 2 | 0 | 0 | 0 | 0 | 0 | 0 | 0 | 0 | 1 | 1 | $\bar{2}$ | X |
| Ninth phase (subtraction) | 47 to 38 | 0 | 2 | 0 | 9 | 9 | 9 | 9 | 9 | 9 | 9 | 8 | 4 | $\bar{2}$ | X |
| Tenth phase (addition) | 47 to 39+48 | 0 | 2 | 0 | 0 | 0 | 0 | 0 | 0 | 0 | 0 | 1 | 1 | $\bar{2}$ | X |
| Eleventh phase (subtraction) | 48 to 39 | 0 | 2 | 0 | 1 | 0 | 0 | 0 | 0 | 0 | 0 | 0 | 8 | $\bar{5}$ | X |
| Twelfth phase (subtraction) | 48 to 39 | 0 | 2 | 0 | 2 | 0 | 0 | 0 | 0 | 0 | 0 | 0 | 6 | $\bar{8}$ | X |
| Thirteenth phase (subtraction) | 48 to 39 | 0 | 2 | 0 | 3 | 0 | 0 | 0 | 0 | 0 | 0 | 0 | 4 | $\bar{1}$ | X |
| Fourteenth phase (subtraction) | 48 to 39 | 0 | 2 | 0 | 4 | 0 | 0 | 0 | 0 | 0 | 0 | 0 | 1 | $\bar{4}$ | X |
| Fifteenth phase (subtraction) | 48 to 39 | 0 | 2 | 0 | 4 | 9 | 9 | 9 | 9 | 9 | 9 | 9 | 8 | $\bar{7}$ | X |
| Sixteenth phase (addition) | 48 to 40+49 | 0 | 2 | 0 | 4 | 0 | 0 | 0 | 0 | 0 | 0 | 0 | 1 | $\bar{4}$ | X |
| Seventeenth phase (division end cycle) | 49 to 39 | 0 | 2 | 0 | 4 | 0 | 0 | 0 | 0 | 0 | 0 | 0 | 1 | $\bar{4}$ | X |

Referring to Table 3 and to FIGS. 8a to 8f, a detailed explanation of the phases of a division operation will be given. In FIGS. 8a to 8f, line 23 shows the state of the corrective cycle storage (the dash shows that the trigger is ON; i.e., the machine is performing a corrective cycle) and line 24 shows the state of the division end storage.

In the following explanation, the function and origin of utilized pulses will be given but in a general manner without detailing the operation of the apparatus that produces them. Later herein a detailed description of the apparatus for producing the pulse will be given.

*First phase (preliminary phase): two unitary times*

The performance of this phase is similar to that of the preliminary phase of the multiplication operation (explained above), with the following differences:

Chain B is positioned not on the extreme right position of field B (unit digit of the dividend) but on the extreme right position of the neighbouring field; i.e., on the position located immediately to the left of the left limit of field B, which is the first position on the left of the position which contains the dividend's highest rank digit. This difference will be explained in the description of field defining block 410, FIG. 3g.

Trigger $T_1$ of rank 440, FIG. 3l, is switched ON at the end of time 432 (second unitary time of preliminary phase), while in multiplication it is switched ON only at the end of time 433 (third unitary time of preliminary phase); the first phase, consequently, lasts only two unitary times. However, trigger $T_{433}$ is switched ON at the end of time 432, so that, at the first unitary time of the following phase, triggers $T_1$, rank counter 440, FIG. 3l, and $T_{433}$ of stage beginning chain 430, FIG. 3h, will both be ON.

At the end of the second unitary time, trigger $T_{460}$ of the zero test storage, FIG. 3i, is switched ON.

*Second phase (first cycle): ten unitary times*

During this cycle, as stated above, the three following operations are performed:

reading of the divisor's sign in order to record it eventually in the sign triggers.

checking that at least one digit of the divisor is not zero.

erasing of the information that may be written in the nine storage positions located on the left of the dividend.

During time A of the first two unitary times, the digits written in field A are read, recorded in register AB120 and rewritten in core storage 100 in the position out of which they have been read. In the selected example, the divisor is positive; hence, there is no change in the state of the sign calculation block 230, FIG. 3f. If the divisor had been negative, the simultaneous existence of a pulse 433 on the output of trigger $T_{433}$ of the chain beginning stage 430 and of pulses (A) and ($\bar{B}$) in register AB120 during time A of the first unitary time would have caused the switching ON of trigger $T_{231}$ of block 230.

During time A of the second unitary time, chain A is on the extreme left position of field A, since the divisor has only two digits. Hence, the positioning block 270, FIG. 3a, produces a pulse 2700 which causes, at the end of time A, the reset of trigger $T_A'$ of the basic pulse filter, FIG. 3h. Then, the read and write pulses are suppressed during time A of the following unitary times.

During time B, the digits written in the position scanned by chain B are read, but the digits read are not entered in register AB120 because read amplifier control block 320, FIG. 3h, does not supply any pulse. Consequently, they may not be rewritten in the core storage 100 and, since the reading is destructive, they are erased.

In this cycle, as in all cycles, chain A scans evenly from time 1 to time 10 positions 35 to 26, "progressing" one position at the middle of each unitary time. At the middle of the tenth unitary time, it switches to position 25, but stays there only during time B, since at the end of this time B a pulse "tens A backing" 284 switches it back to position 35.

During the first nine unitary times, chain B scans positions 44 to 36 "progressing" one position at the end of each unitary time. But, at the end of the ninth unitary time, the regular advance pulse is suppressed so that, at the tenth unitary time, the chain remains on position 36.

"Zero test" trigger $T_{461}$, which had been switched ON at the end of the preceding phase, switches OFF at the end of the first unitary time, due to a pulse NB, because the adder's output, which represents only the digit read during time A because, during the first cycle, the digits read during time B are not transmitted to the adder, indicates that the unit digit of the divisor is not zero. If this digit had been zero, trigger $T_{461}$ would have stayed ON until the end of the unitary time during which a non-zero digit would have been read. The lack of reset at the eighth unitary time would have actuated a warning signal.

*Third phase (subtraction cycle): ten unitary times*

During this cycle, chain A scans, as in all cycles, positions 35 to 26 and chain B scans positions 45 to 36. During time A of the first unitary time, the normal advance process places chain B in position 35; but, at the end of time A, a pulse 288 switches it back to position 45. Hence, chain B scans the field made up of the highest rank digit of the dividend and the nine zeros written on the left of this digit during the "first" cycle.

The reading and the writing are possible during the times A and B during the first two unitary times; i.e., so long as the positions scanned by chain A remain in field A which contains the two digits of the divisor. After the second unitary time, reading and writing are possible only during time B.

During the entire cycle, control block 170, FIG. 3*j*, supplies a pulse 171 so that the nine complements of the digits read during time A of the divisor are those which are added to the digits read during time B. After the second unitary time, the absence of reading during time A causes zeros to enter into register A140; hence, the addition of 9. At the first unitary time, the adder 180 receives, besides the digit read in field B and the 9 complement of the digit read in field A, a digit 1 supplied by the carry from carry block 190, FIG. 3*k*, so that the digit added amounts to the 10 complement. At the tenth unitary time, a 9 is entered in register A140 from insertion block 340, FIG. 3*i*. The result is that it is a 9 complement; i.e., 0, which is added to the digit read in field B.

As a conclusion, during this cycle, the adder performs the following operation; it is recalled that, in the chosen example, the dividend is equal to 5 5 1 2 and the divisor to (27).

Digits read in time B_____ 0 0 0 0 0 0 0 0 0 5 (5) (1) (2̄)
Complement of the digits entered in
 register A 140_____ 0 9 9 9 9 9 9 9 7 2
Digit supplied by carry block 190____                           1
                                    ─────────────────
 Total_____ 0 9 9 9 9 9 9 9 7 8 (5) (1) (2̄)

The digits between brackets are outside of the field scanned.

Since the addition of the digits at the ninth unitary time did not cause any carry, trigger $T_{471}$ of corrective cycle storage 470, FIG. 3*j*, is switched ON, so that the following cycle will be a corrective addition cycle.

*Fourth phase (corrective addition cycle):
ten unitary times*

During this cycle, chain A scans, as in all cycles, positions 35 to 26. Chain B scans during the first nine unitary times positions 45 to 37; at the end of the ninth unitary time, it switches to position 36, but remains there only during time A of the tenth unitary time because, at the end of time A, a pulse 288 switches it to position 46. Moreover, the usual advance pulse of chain B is suppressed at the end of the tenth unitary time so that chain B will remain in position 46 during the first unitary time of the following cycle.

As in the preceding cycle, the two digits written in field A are read during the first two unitary times; then the readings during time A are not possible any longer and, consequently, register A records zeros. During time B, the readings occur during the first nine unitary times, but are suppressed during the tenth. This elimination causes a zero to be sent to the adder.

Control block 170 supplies, during the corrective cycles, a pulse $\overline{171}$. The digits proceeding from storage A140 are consequently added as true value to the digits read during time B. During the tenth unitary time, a 9 is entered in register A140 by block 340 and this 9 is added as true value. As a conclusion, during this cycle the following operation is performed:

Digits read during time B_____ 0 9 9 9 9 9 9 9 7 8 (5) (1) (2̄)
Digits entered in register A140_____ 9 0 0 0 0 0 0 0 2 7
                                    ─────────────────
 Total_____ 0 0 0 0 0 0 0 0 0 5 (5) (1) (2̄)

As above, the digits between brackets are located in the positions not scanned during the cycle.

Since the addition of the ninth unitary time causes a carry, trigger $T_{471}$, FIG. 3*j*, is reset.

*Fifth phase (subtraction cycle): ten unitary times*

The performance of this phase is similar to the one of the third phase with the difference that chain B starts from position 46 and does not back up at the middle of the first unitary time, the regression having already occurred during the tenth unitary time of the preceding cycle (corrective addition cycle). The operation performed during this phase is as follows:

Digits read during time B_____ (0) 0 0 0 0 0 0 0 0 5 5 (1) (2)
Complement of the digits entered into
 register A140_____ (0) 0 9 9 9 9 9 9 9 7 2
Digit supplied by carry block 190____                      1
                                    ─────────────────
 Total_____ (0) 1 0 0 0 0 0 0 0 2 8 (1) (2)

The addition of the ninth unitary time having resulted in a carry, trigger $T_{471}$ is not switched ON and the following cycle will be once more a subtraction cycle.

The writing, at the tenth unitary time, of the carry obtained at the ninth time makes up the first step of the formation of the quotient.

*Sixth phase (subtraction cycle): ten unitary times*

The performance of this phase is similar to that of the third phase; the regression of chain B occurs at the middle of the first unitary time. The operation performed is the following:

Digits read during time B_____ (0) 1 0 0 0 0 0 0 0 2 8 (1) (2̄)
Digits entered in storage A140_____ (0) 0 9 9 9 9 9 9 9 7(2)
Digit supplied by carry block 190____                      1
                                    ─────────────────
 Total_____ (0) 2 0 0 0 0 0 0 0 0 1 (1) (2̄)

Since the addition at the ninth unitary time caused a carry, the following cycle will be once more a subtraction cycle.

*Seventh to sixteenth phases*

No description will be given of these phases which are similar to the phase already described. In all these phases, chain A scans positions 35 to 26. Chain B scans a field which is offset one rank at the end of each addition cycle. The regression of chain B occurs during the first unitary time of all the cycles, except the subtraction cycles which follow immediately a corrective addition cycle, and at the tenth unitary time corrective addition cycles.

At the middle of the tenth unitary time of the sixteenth phase, corrective addition cycle, the chain B switches from position 39 to position 49; this position being located immediately to the right of the position onto which field defining block 410, FIG. 3*g*, sends a voltage. Chain positioning block 270, FIG. 3*a*, supplies a pulse 2700 which switches trigger $T_{481}$, FIG. 3*j*, ON so that the following phase will be a "division end cycle."

*Seventeenth phase (division end cycle):
eleven unitary times*

This cycle lasts eleven unitary times instead of ten because trigger $T_2$ of rank counter 440, FIG. 3*l*, cannot be switched ON at the end of the first unitary time, this switching ON requiring the existence of a pulse $\overline{482}$ which is suppressed during the unitary time which follows the switching ON of trigger $T_{481}$, as it will be explained in the detailed description of the circuits. Hence, the rank counter remains in position 1 during two unitary times.

During this cycle, chain A scans positions 35 to 25, which does not have any influence on the information transfer, because all the "read gate" pulses are suppressed during time A of a division end cycle. Chain B scans positions 49 to 39. When it is on position 49; i.e., at the first unitary time of the cycle, the read gate is suppressed in the absence of pulse $\overline{482}$ so that the digit located in position 49, located outside of field B, is not read. During time B of the following ten unitary times, the digits located in the positions scanned by the chain B are read and regenerated; being transmitted, in a regular manner, via the register AB120, first translator 130, adder 180, second translator 200, and switch regeneration-addition 210, the latter is in position add during time B; but, as there is no reading during time A, the addition is the equivalent of a mere rewriting.

During the second unitary time, the rank counter being still in position 1, the simultaneous existence of a (B) element with an ($\overline{A}$) element in register AB120, which shows that the dividend is negative, causes the switching of trigger $T_{231}$ in sign calculation block 230, FIG. 3l. In the selected example, this trigger is OFF; it would have been switched ON during the first cycle if the divisor had been negative. Hence, it switches ON and remains ON until a pulse 2700 resets it; i.e., until the end of the program.

At the last unitary time, rank counter in position 10, the positive pulse received on the right output of this trigger is transmitted to sign insertion block 240, FIG. 3l, which sends a bit (B) on switch Reg-Add 210, FIG. 3f, and, consequently, to write this bit in the position presently scanned by chain B; i.e., the unit position of the quotient. At the same time, sign insertion block 240 changes bit ($\overline{C}$) proceeding from the translator 200 into a bit (C). It is recalled that, in the selected example, the unit digit of the quotient is digit 4 and that in the semi-binary code, this digit corresponds to a single bit in state 1, bit (4). If the number of "numerical" bits in state 1 had been even, sign insertion block 240, by transmitting bit (B), would have changed (C) into ($\overline{C}$).

Hence, the sign of the quotient is recorded in the unit position of this quotient at the end of the last unitary time.

Moreover, at the end of this last time, the coincidence of a pulse 481, with a pulse 10 and a pulse B, causes the switching ON of trigger $T_{431}$ of the stage beginning chain 430 and, then, the switching of the following program stage or the emitting of the program end signal.

DETAILED DESCRIPTION OF THE CIRCUITS

General

With the function of the apparatus contained in the various blocks having been explained, a description is going to be given of the apparatus in these blocks and the manner through which they produce the pulses necessary for operating the system.

In order to avoid repetitions, a description will first be given of the elementary circuits which are included in the blocks. However, this description is given only as an example, since the elementary circuits which are shown may be replaced by other circuits having the same purpose.

The blocks will be described with reference to FIGS. 3a to 3l in the following order:

Program Blocks
Transfer and Insertion Control Blocks
Blocks for Storing, Transferring or Processing the Data or the Results This order has been chosen to facilitate understanding the pulses produced by apparatus of the blocks of one group generally acting upon the apparatus of blocks of another group.

Almost all the lines which transmit control pulses include a horizontal portion which extends over FIGS. 3g to 3l and, to make it clear, they have been arranged in groups which, considered from the top, correspond to the following pulse groups:

Basic Pulses
Stage Beginning Pulses
Rank Counting Pulses
Situation Storage Pulses (First Cycle, Zero Test, Corrective Cycle, Division End)
Combined Pulses Used in Multiplication (or in Multiplication and Division)
Combined Pulses Used in Division Only
Operation Pulses Of course, modifications may be made to the diagram without departing from the scope of the invention. More particularly, it is possible, if the device is provided for performing other operations than the multiplication or the division to add coincidence circuits (AND circuits) or mixing circuits (OR circuits) allowing to stop the travel of the pulses or send other pulses to the circuits.

Elementary circuits

AMPLIFIERS AND INVERTERS

Figure 9:
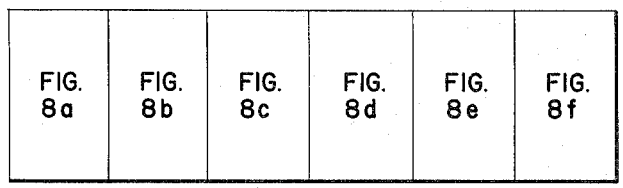
FIG. 9 is a diagram showing how
Figure 6A:
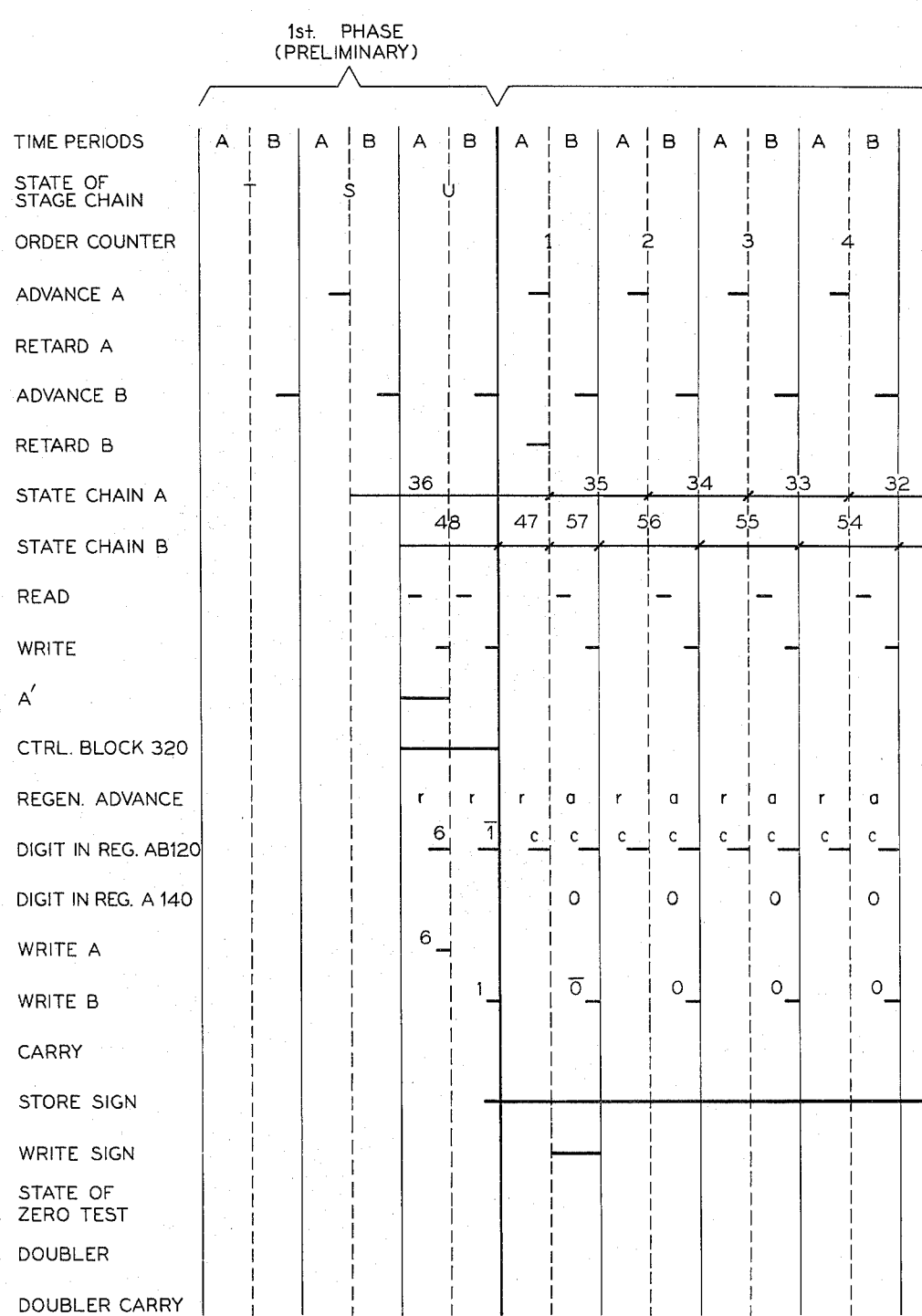
Figure 6B:
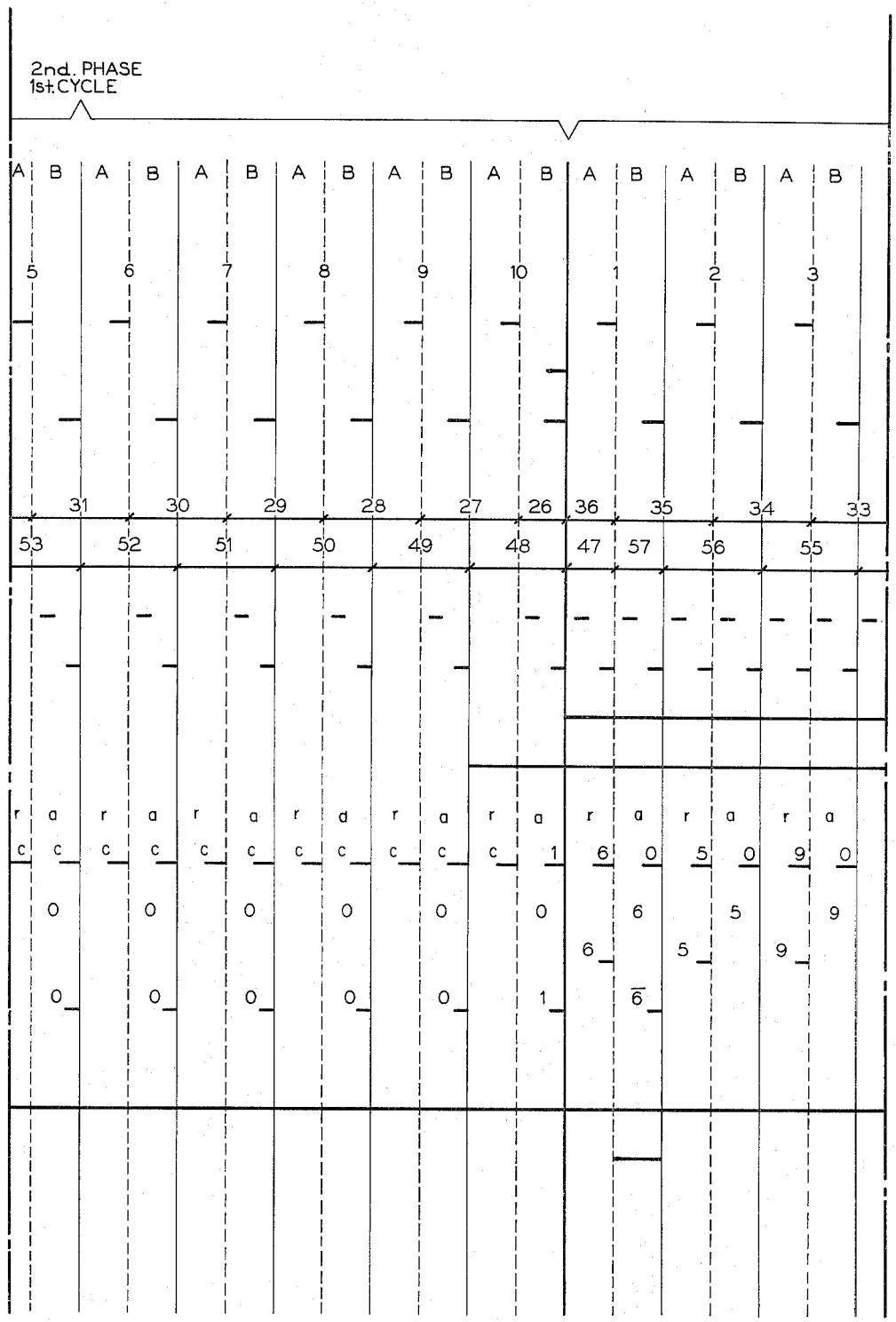
Figure 6C:
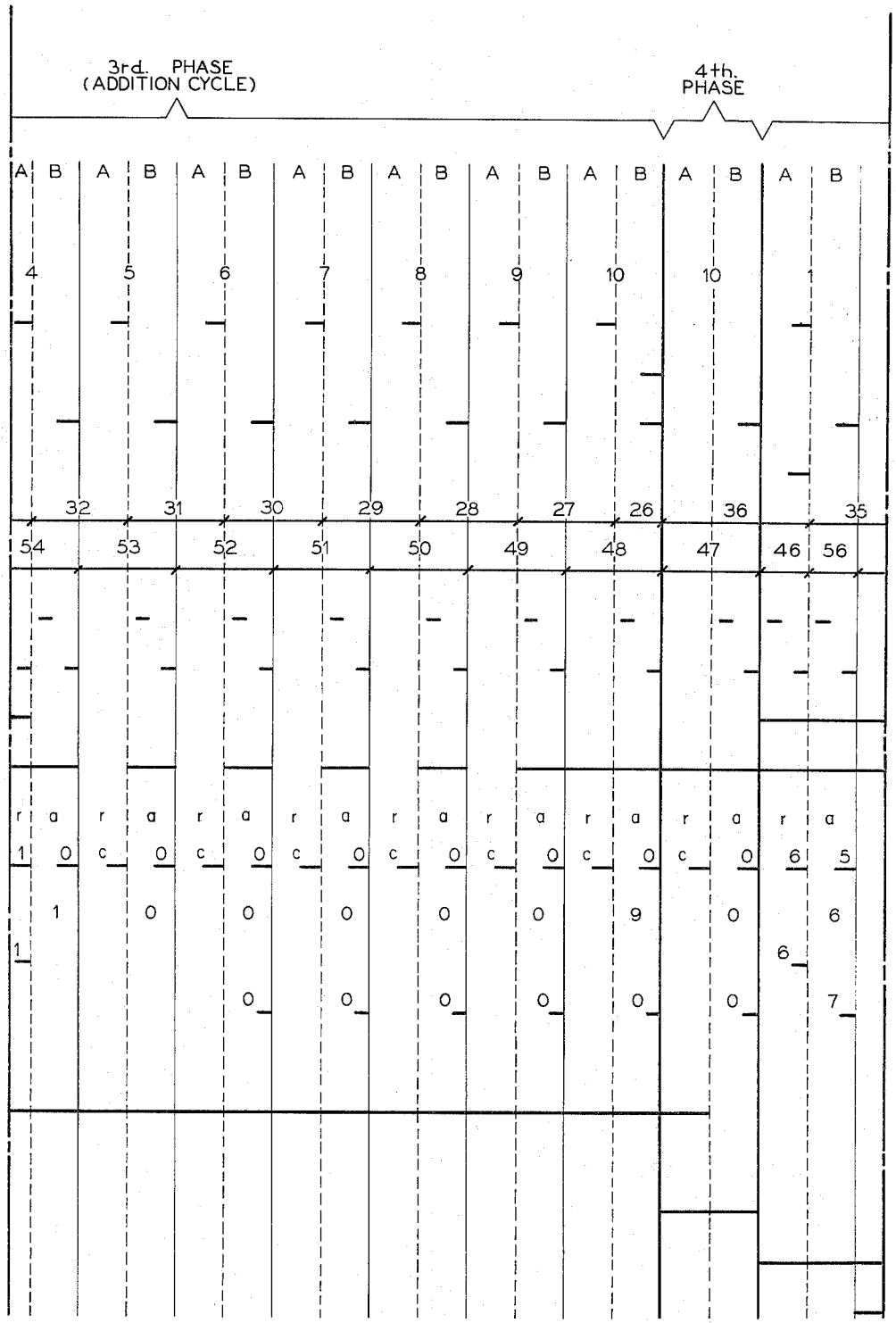
Figure 6E:
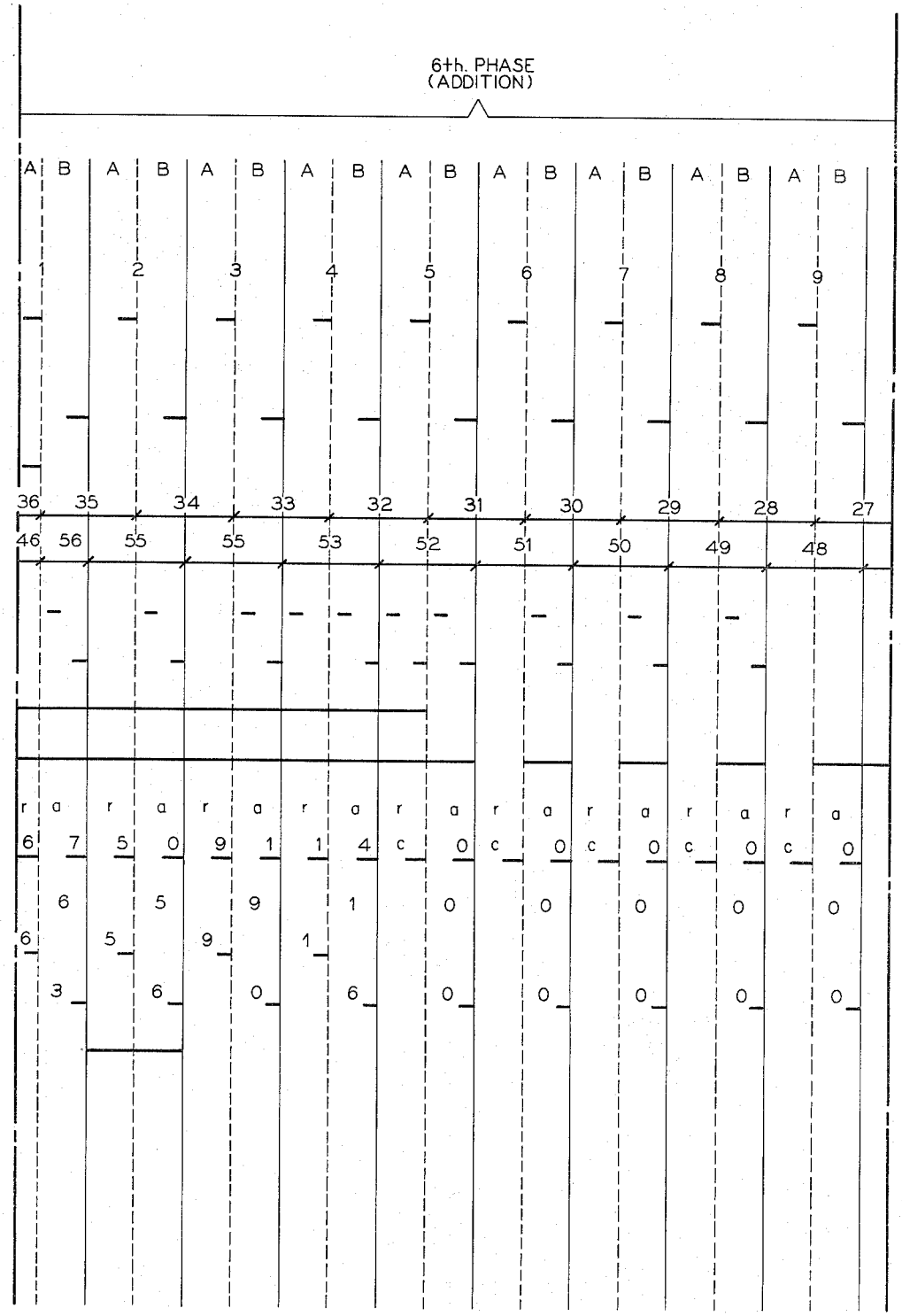
Figure 6F:
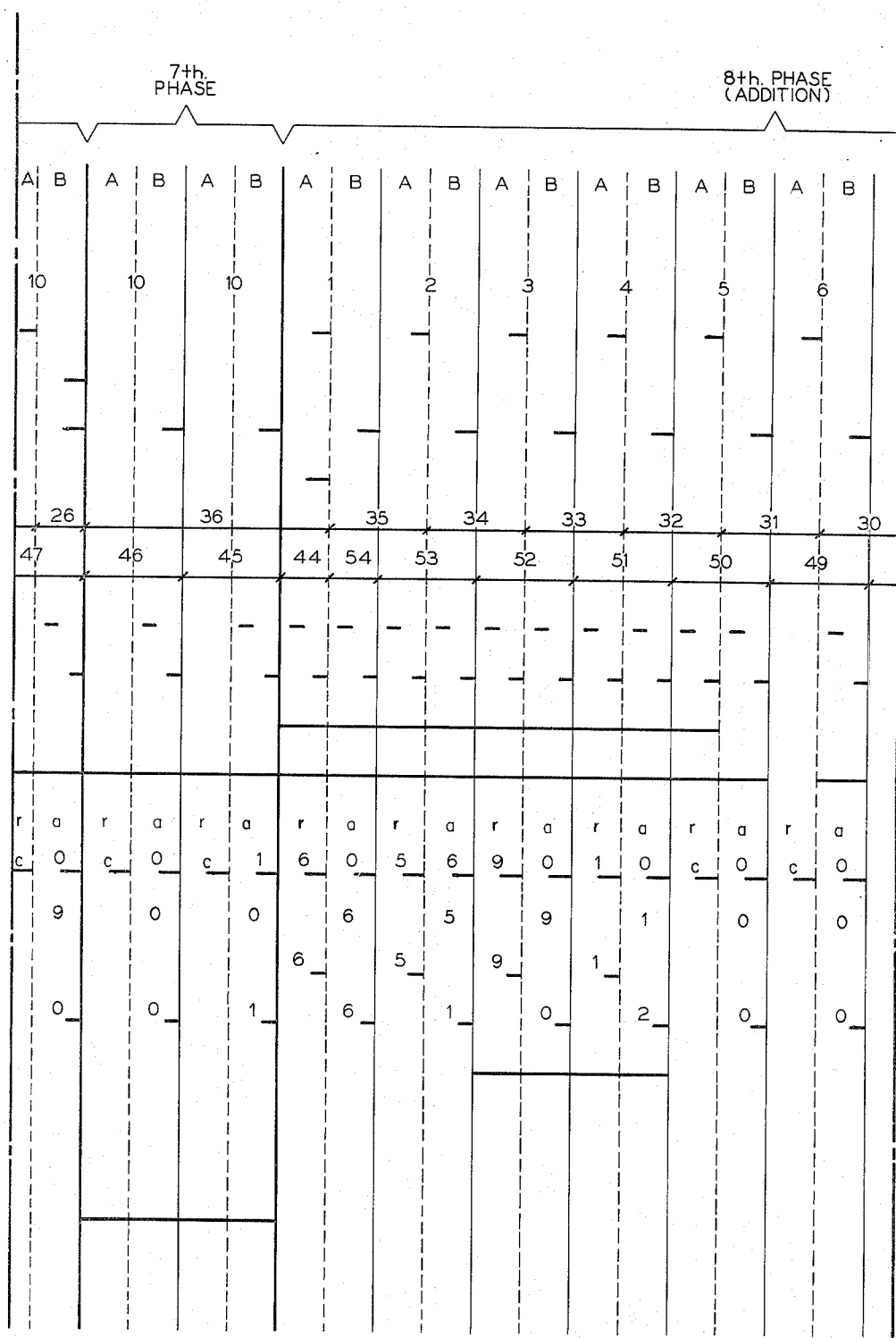
Figure 6G:
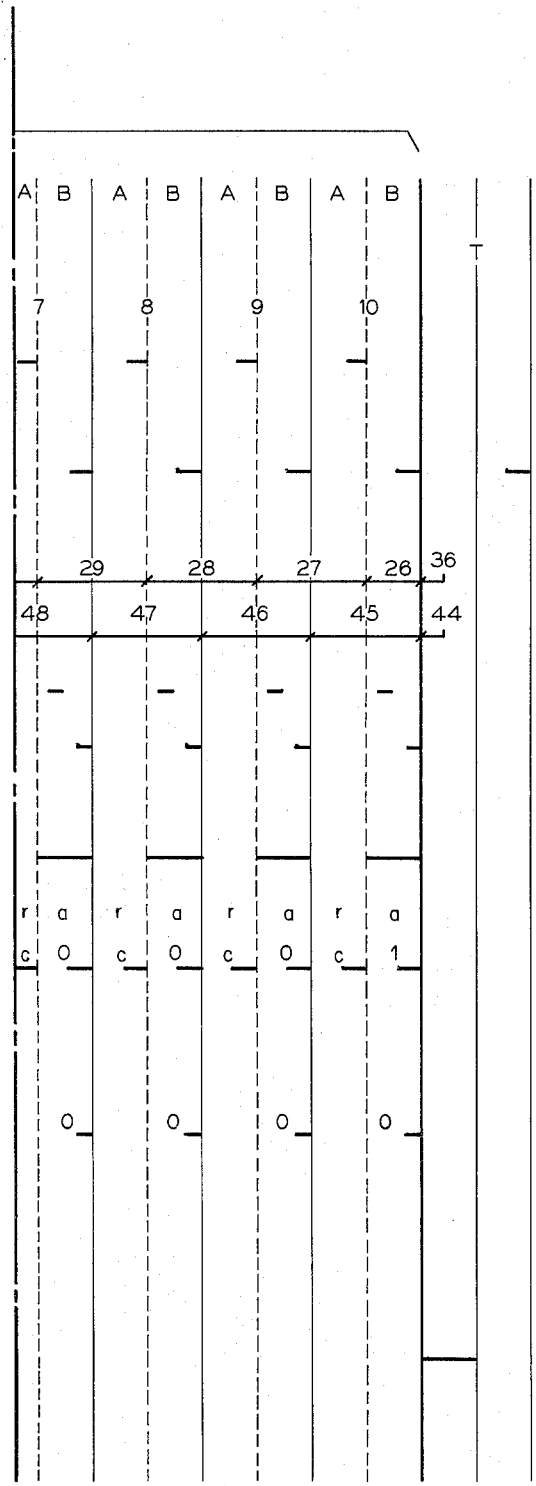
Figure 8A:
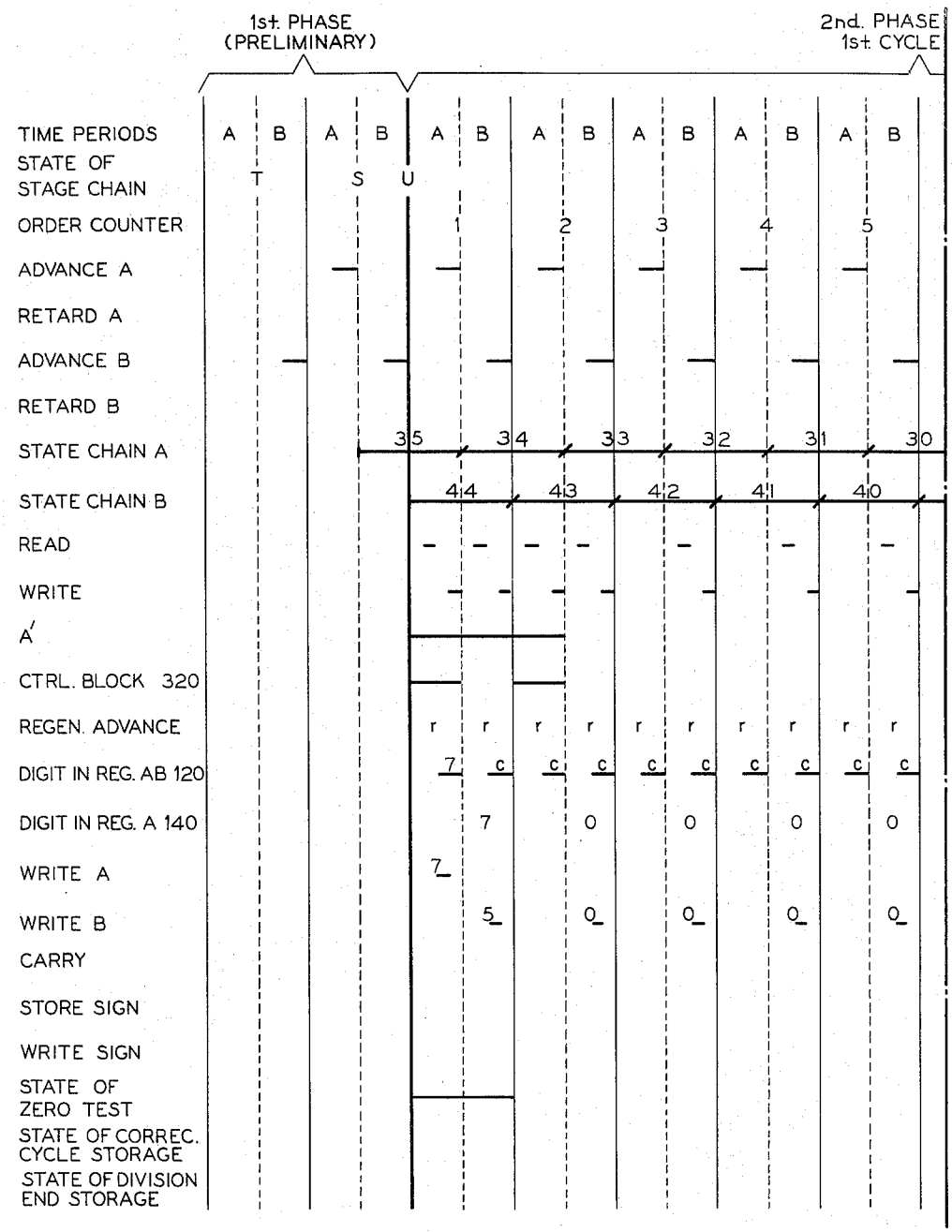
Figure 8B:
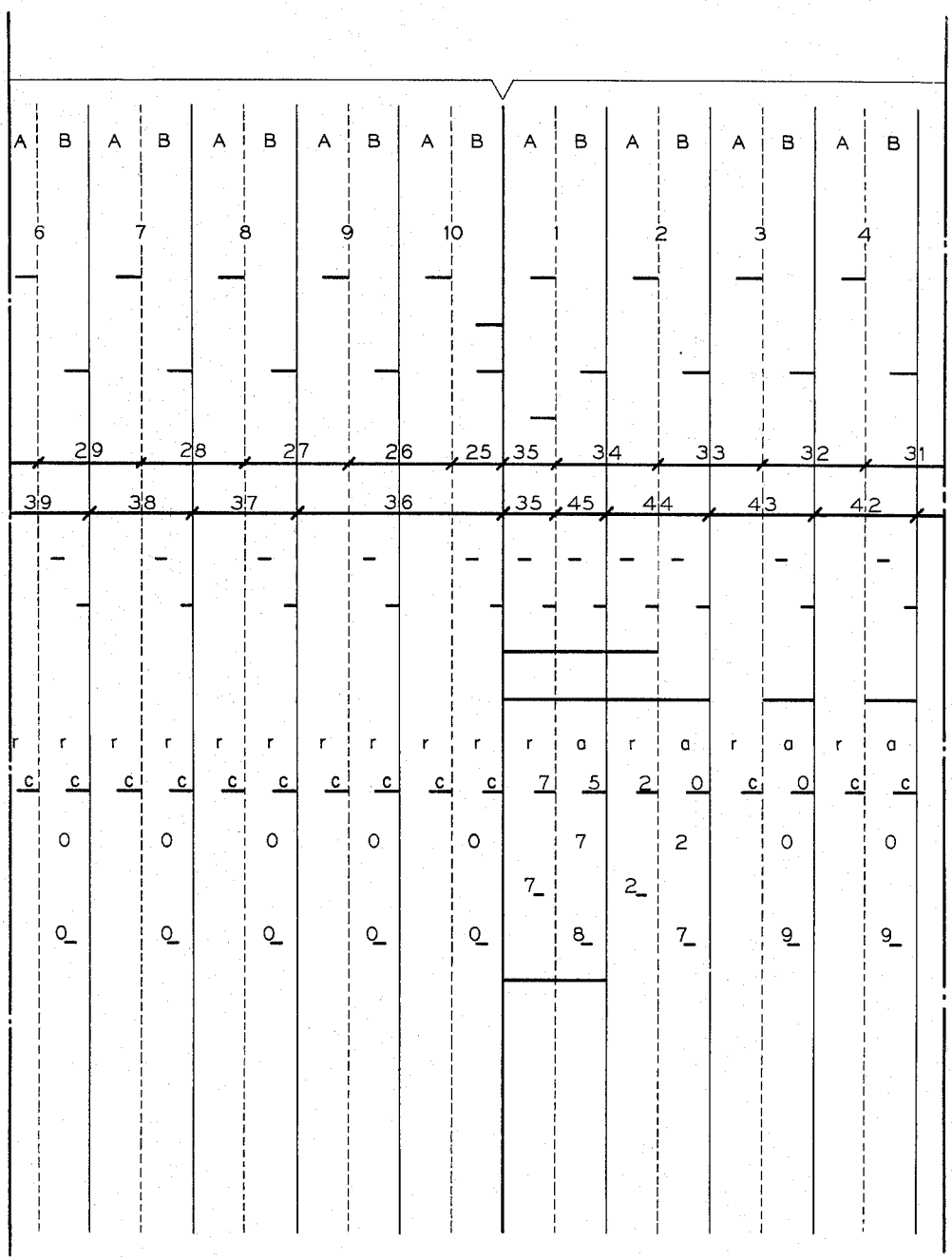
Figure 8C:
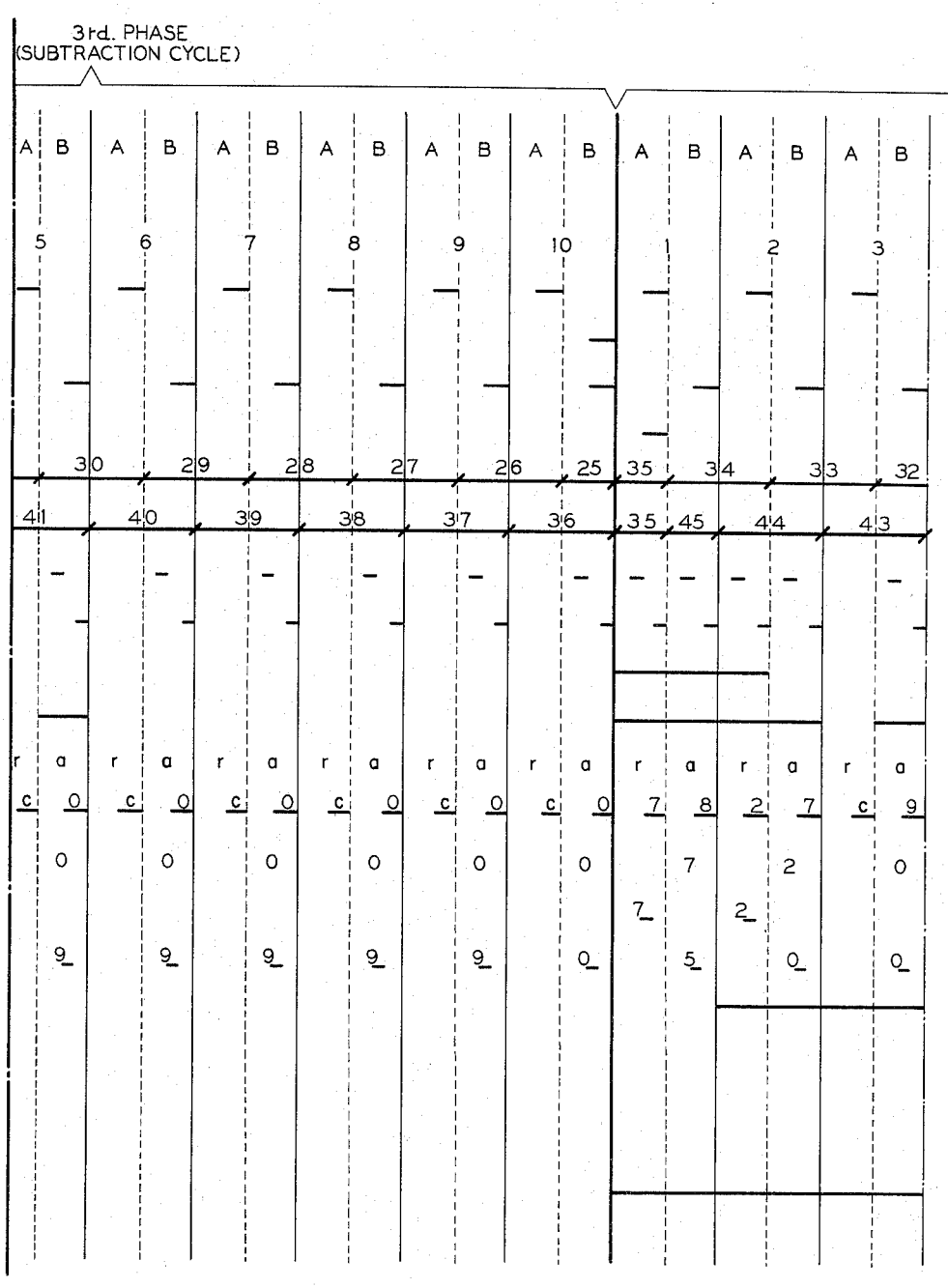
Figure 8E:
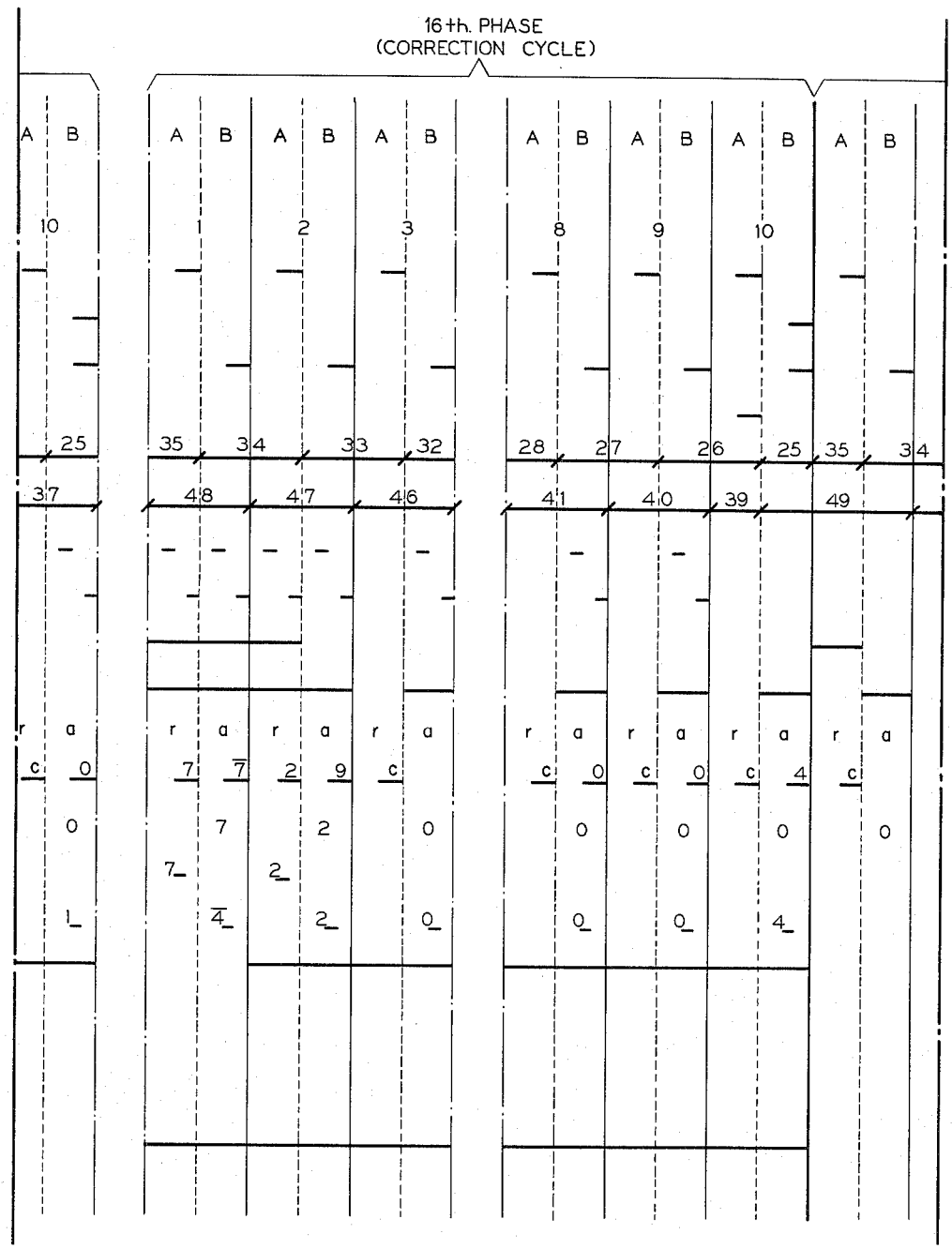
Figure 8F:
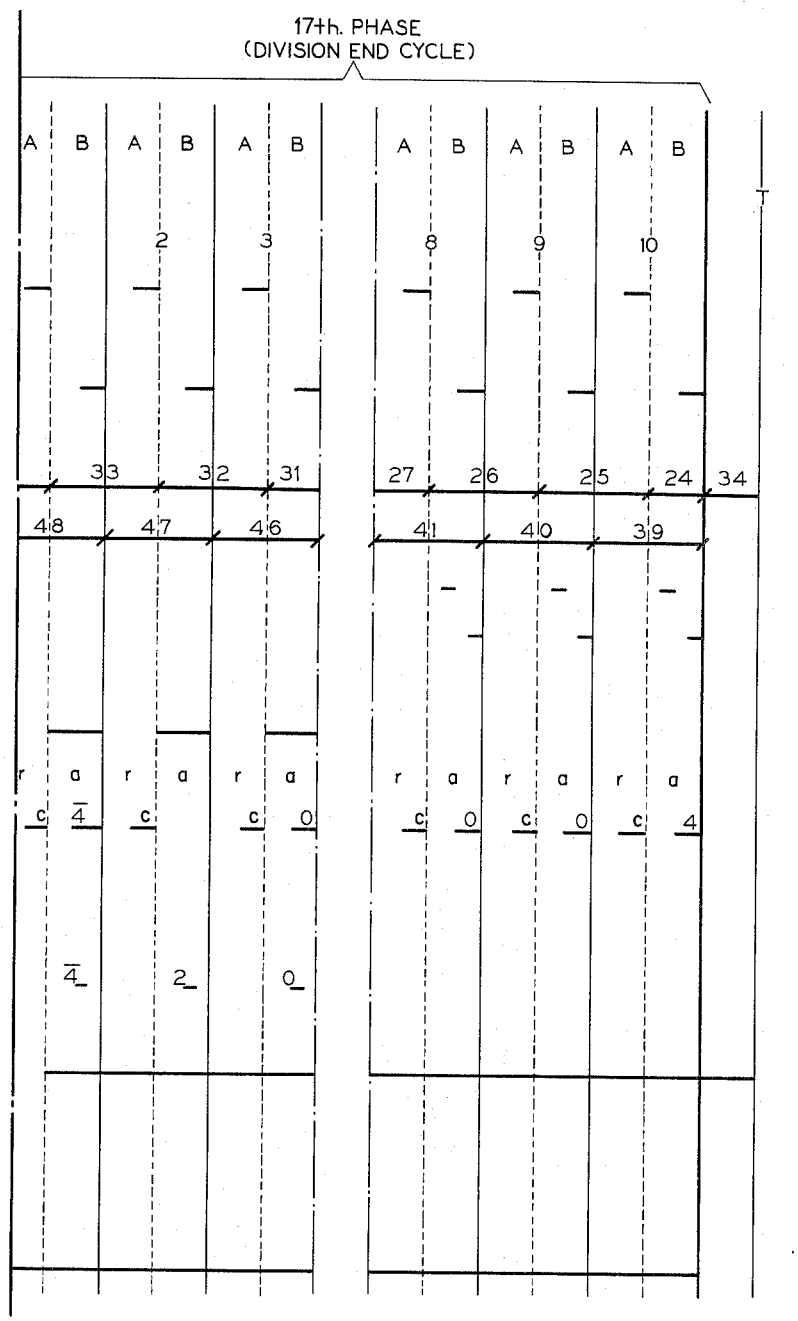

FIG. 9a shows an inverter using a PNP transistor. In FIGS. 3a to 3l, such an inverter is shown in the simplified diagram of FIG. 9b, the letter "I" may be followed by an index. The input is always indicated on the bottom right and the output on the top left.

Figure 10A:
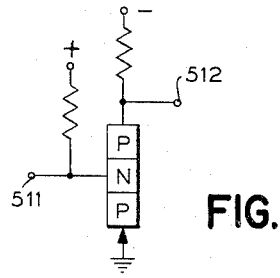

FIG. 10a represents the represents the diagram of an amplifier with emitter-follower using an NPN transistor. In FIGS. 3a to 3l and 13a and 14a, such an amplifier is represented in the simplified diagram of FIG. 10b; letter "E" may be followed by an index. The input is indicated on the left and the output on the right.

Figure 11A:
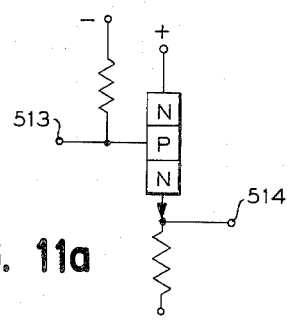
Figure 10B:
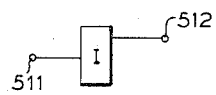
Figure 11B:

FIG. 11a represents a non-inverter amplifier with two stages. In FIGS. 3a to 3l, such an amplifier is represented in the simplified diagram of FIG. 11b; letter "A" may be followed by an index. The input is indicated on the bottom left and the output on the top right.

TRIGGERS

Figure 12A:
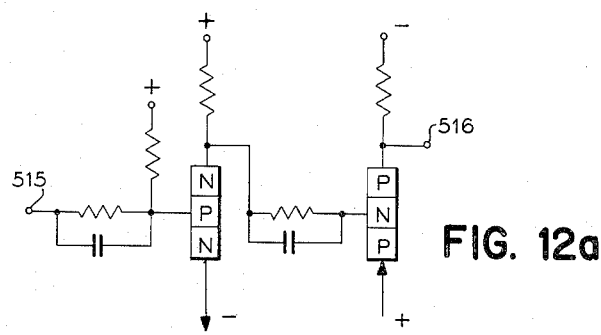
Figure 12B:
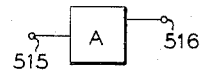

FIG. 12a represents the diagram of a trigger using two PNP transistors. In FIGS. 3a to 3l, such a trigger is indicated in the simplified diagram of FIG. 12b; letter "T" may be followed by an index. The trigger includes two outputs 524 and 525 respectively shown on the top left and the top right. When the voltage is more positive on the left output than on the right output, it is stated, out of convention, that the trigger is OFF; and, when the conditions are reversed, it is stated that it is ON. The inputs are represented at the bottom. A positive pulse applied to terminal 521 switches the trigger OFF and does not modify its state if it is already OFF. A positive pulse applied to input 522 switches the trigger ON and does not modify its state if it is already ON. A positive pulse applied to input 523 changes the state of the trigger; i. e., resets it if it was ON, and vice versa. It should be noted that, if input 523 is not used, it is not shown in FIGS. 3a to 3l.

LOGICAL CIRCUITS

Figure 13A:
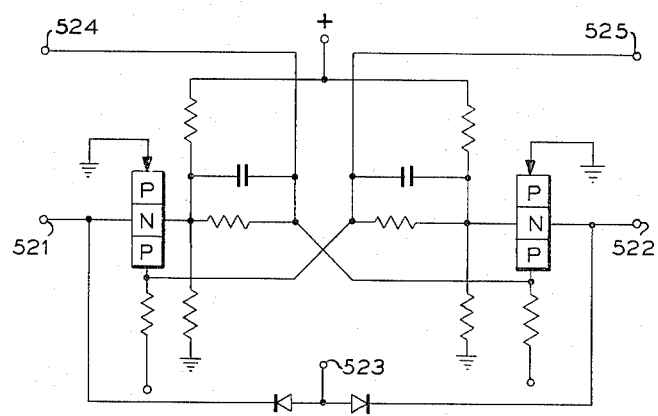
Figure 13B:
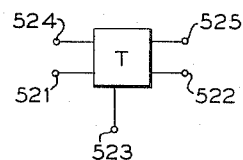

FIG. 13a represents a coincidence or AND circuit and FIG. 13b represents the simplified diagram used in FIGS. 3a to 3l. The emitter-follower amplifier may, in certain cases, be eliminated.

Figure 14A:
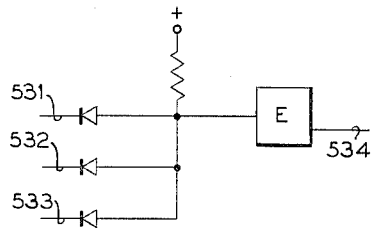
Figure 14B:
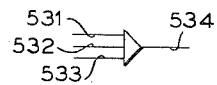

FIG. 14a represents a mixing or OR circuit and FIG. 14b represents the simplified diagram used in FIGS. 3a to 3l. The emitter-follower amplifier may, in certain cases, be eliminated. Such a circuit may also be used as coincidence circuit for negative pulses; in this case, it is represented in the same manner as in FIG. 14b and its use is explained in the description.

Figure 15A:
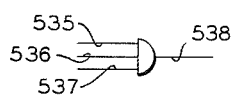
Figure 15B:
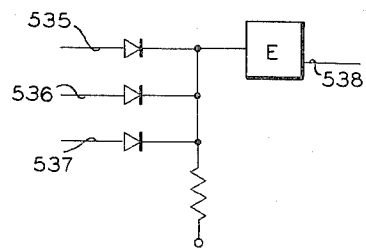

FIG. 15a represents a favored diode gate and FIG. 15b represents the simplified diagram used in FIGS. 3a to 3l. The operation of such a circuit is explained in patent application Serial No. 704,781, filed December 23, 1957, now Patent No. 2,923,924, for Information Recording Control and Check, M. Papo. The circuit includes two inputs, a "slow" input represented by a diamond in the diagram and a "fast" input 542. In order to obtain a positive signal on the output, a positive signal is first to be applied on the slow input, then a positive or negative signal on the fast input. The output signal coincides with the leading or front end of the signal applied to the fast input if this signal is positive and with the trailing or rear end of this signal if it is negative. The front or rear end must be prior to the end of the signal applied to the slow input, or coincide with this end.

In certain cases, the slow input may be wired to ground, FIGS. 15c and 15d; under these conditions, the conditioned diode gate becomes an ordinary differentiator circuit.

*Regulated pulse generator and electronic switches*

Figure 16A:
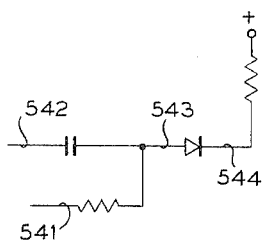

In FIG. 16a, the circuits used for sending pulses onto a wire crossing magnetic cores have been grouped. These circuits include:

A pulse generator G is made up of a 2-stage amplifier which receives a control pulse on its input. In general, the control pulse comes from a coincidence circuit including one input 551, common to a whole category of wires, which receives a continuous pulse when the storage is used, and an input 552.

A regulator R maintains the amplitude of the pulse emitted by the generator constant. The operation of such a regulator is described in copending patent application Serial No. 646,892, filed March 18, 1957, for Pulse Generator, by A. F. Mestre.

An electronic switch S which operates in the following manner:

When there is no pulse, point 554 is at a positive potential higher than that of point 555; due to the presence of diode 556 and no current, whether transistor 557 is conducting or not, may go through the wire.

When there is a pulse, point 554 is at a positive potential lower than that of point 555. A current will go through wire 554–553 if transistor 557 is conducting. Transistor 557 conducts if a sufficient positive voltage is sent on input 558.

Hence, the passage of a current in the wire requires the existence of simultaneous pulses on the input of the generator and on input 558 of the electronic switch.

Figure 16B:
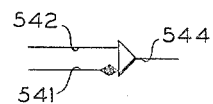

FIG. 16b represents the apparatus of FIG. 16a in simplified form, as represented in FIGS. 3a to 3l. The generator is represented by a rectangle that contains letter "G" eventually followed by an index and the switch by a rectangle which contains letter "S" eventually followed by an index. Regulator R, in order to simplify the diagram is not represented. The inputs and outputs are arranged as in FIG. 16a.

Figure 16C:
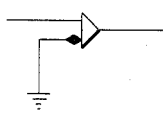
Figure 16D:
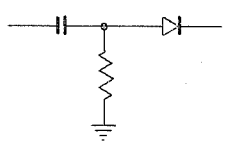

Through the combination of the generators and the switches, it is possible, by sending a pulse to the input of one of the generators, and another to the input of one of the switches, to select a circuit within a group. For instance, FIG. 16c represents an assembly allowing to select one of circuits $C_{11}$ . . . $C_{33}$ through generators $G_1$, $G_2$, $G_3$ and switches $S_1$, $S_2$, $S_3$.

Of course, it is possible, without departing from the scope of the invention, to replace the circuits which have been described with other circuits; particularly, it is possible:

To replace transistors PNP with transistors NPN and vice versa, through changing the polarity of the power supplies and using negative control pulses.

To increase the allowed current through replacing single transistors with an assembly of transistors used in parallel.

PROGRAM BLOCKS

*Blocks containing apparatus supplying the timing pulses*

BASIC PULSE GENERATOR 380, FIG. 3j

The generator 380 produces the following pulses, the sequence of which is represented in FIG. 6:

(1) *Pulses A and B.*—These pulses are positive and alternate evenly; they divide the unitary time into two equal durations. The designation of "unitary time" means the time interval made up of a pulse A followed by a pulse B. Each unitary time is made up of two equal parts, time A and time B.

(2) *N pulses.*—These pulses are negative and their rear or trailing end coincides with the end of time A and time B. In the mode of realization which is considered, the duration of pulse N is equal to two-fifths of the duration of time A or time B.

(3) *NA and NB pulses.*—These pulses are negative pulses which coincide with pulses N, but pulses NA exist only during time A and pulses NB only during time B.

(4) *R pulses.*—These pulses are negative pulses which precede pulses N, the trailing or rear end of R pulses coincides with the front end of pulses N. The duration of R pulses equals that of pulses N.

(5) *X pulses.*—These X pulses (or read pulses) and Y pulses (or write pulses) are positive pulses. In this example, the duration of these pulses is equal to one-fifth of the duration of time A or time B. X pulses are produced during the second fifth part of each time A and time B and Y pulses during the last fifth part of each time A and time B.

(6) *Y pulses.*—The generator for producing these pulses may be of any suitable type and will not be described.

BASIC PULSE FILTER 390, FIG. 3h

The apparatus represented in block 390 supplies pulses designated A' and B' and which respectively coincide with pulses A and B when they exist.

Pulse B' results from the coincidence of pulses B, $\overline{431}$ and $\overline{432}$; hence, it exists during all the unitary times, except on the two first unitary times of each program stage. Time 431 is test time, or the time during which a change of state occurs, and time 432 is set time, or the time which immediately follows the previous one and during which the chain positioning takes place.

Pulse A' is supplied by the coincidence of a pulse A with a pulse obtained on the right output of trigger $T_A'$ when it is ON. This trigger, normally ON, is switched off:

When trigger "test" switches ON. This occurs when the pulse 4360 proceeding from diode gate 436 of block 430, FIG. 3h, is sent to the left input of trigger $T_A'$. Switching ON is caused by a pulse NB occurring at the end of time B.

When pulse NA occurs; hence, in the middle of a unitary time, in one of the following cases:

existence of a pulse 2700
existence of a pulse 481
coincidence of a pulse 8 with a pulse (M+D)
existence of a pulse M. 433.

The trigger is switched back ON by a pulse NB in one of the following cases:

existence of a pulse 432
coincidence of a pulse $\overline{481}$ with a pulse D. 10
coincidence of a pulse M. 10 with a pulse $(B_0)$ $(Q_0)$.

The result is that trigger A' is OFF:

From the beginning of time 431 until the middle of time 432. Hence, pulse A' is eliminated during time 431, stage change time, and during time 432, chain positioning time.

From the moment when chain A reaches the left limit of field A, or, at the latest, from the middle of the eighth unitary time of each cycle until the middle of the tenth unitary time of each cycle. In the case of a division operation, this switching back ON at the tenth unitary time is eliminated at the last cycle. For a multiplication, it is performed only when the digit of the multiplier, presently scanned, is not zero. It is, anyway, necessary to reach a non-zero condition in order to switch from the tenth unitary time to the first time of the following cycle. Hence, pulse A is eliminated:

as soon as the extreme left digit of the multiplicand has been passed in all cases, at the ninth and tenth unitary times of each cycle.

In multiplication only, from the middle of time 433, the time located between time 432 and the beginning of the first cycle, until the middle of the tenth unitary time of the first cycle. Hence, pulse A' is eliminated during the first multiplication cycle.

*Program defining blocks*

STAGE TRIGGER BLOCK 400, FIG. 3g

The apparatus represented by this block has the function of general control of the program and includes, for each program stage, five hubs, a trigger and four emitter-follower amplifiers. Moreover, there is a program beginning hub and a program end hub which are not shown. Only the hubs, triggers and amplifiers corresponding to a stage are shown. These five hubs are distributed as follows:

an input hub 401,
an output hub 402,
an operation control hub 403,
two position hubs A and B.

The input hub of each stage is wired, through a removable connection to the preceding stage. The input hub of the first stage used is wired to the program beginning hub, not shown, and the output hub of the last stage used is wired to the program end hub, not shown. The operation control hub of each stage is wired to an operation selection hub. For instance, for the control of a multiplication, it would be wired to hub M of the operation selection block 420, FIG. 3i. Position hubs A and B respectively function to define storage fields A and B in which are recorded the numbers on which an operation is to be performed.

The flow of the pulses proceeding from these hubs will be explained in the description of the field defining block.

At the beginning of the program, all the stage triggers are OFF. When a program beginning pulse is sent to a program beginning hub, it is transmitted through a removable connection to input hub 401 of the first stage used, which conditions diode gate 406, so that the following N pulse switches the trigger of the stage ON. The positive voltage obtained on the right output of this trigger is transmitted by the emitter-follower amplifiers:

To output hub 402 and through it, to the input hub of the following stage, wired to hub 402. This conditions the switching ON of the trigger of this stage. This switching will be controlled by the following program advance pulse 4300.

To operation control hub 403 and through it to the operation selection hub.

To position hub A during time A only because of coincidence circuit 407, and through it to a hub of the field defining block.

To position hub B during time B only because of coincidence circuit 408, and through it to another hub of the field defining block.

This voltage remains applied to the hubs concerned during the entire duration of the stage. When the operations provided for this stage are over, a new program advance pulse resets the stage trigger, and this eliminates the positive voltage applied to these hubs. This same pulse, transmitted by diode gate 409, switches the trigger of the following stage ON. The process continues until the end of the last stage. At the end of this last stage, the program advance pulse is transmitted by a diode gate conditioned by the output of the trigger of this last stage to a program end hub which is not shown. Machine operations will then continue according to predetermined program.

FIELD DEFINING BLOCK 410, FIG. 3g

This apparatus represented by this block includes:

a series of hubs "pick up" PU,
a series of storage block selection hubs SB, each picked up by an emitter-follower amplifier,
a series of field defining hubs F, each picked up by an emitter-follower amplifier.

For each hub PU, there is a corresponding hub SB and a hub F. In FIG. 3g, only three hubs of each series have been shown.

When a hub PU receives a positive voltage from hub A or B of a program stage:

The corresponding hub SB receives a positive voltage. This hub SB is wired to a hub of storage block selection component 310. Hence, it is possible to choose the storage block from which information will be extracted or entered.

A hub F receives a positive voltage, but this hub is either the one which corresponds to the picked up hub PU or the hub located immediately to the right. In the case of a multiplication, it is the hub corresponding to hub PU picked up during unitary time 432, or the time during which the chains get into position, and the neighbouring hub after time 432. This allows the block 270 to produce a signal 2700 when a chain reaches the limit defined by this neighbouring hub. In the case of a division, the same rule prevails for time A, but the adverse rule for time B. Chain B gets into position on time 432 on the left of the dividend and the signal 2700 is produced, when this chain passes the right position.

In this example, any hub PU is wired to the input of the emitter-follower which picks up corresponding hub F through a coincidence circuit having another input wired to a wire 411. The output of the coincidence circuit is wired to the input of the neighbouring emitter-follower through a coincidence circuit having another input wired to a wire 412. Wire 411 receives a pulse, either in the case of coincidence of a pulse 432 with a pulse A or $\overline{D}$, or in the case of coincidence of pulses $\overline{432}$, D and B. Wire 412 receives a pulse, either in the case of coincidence of a pulse $\overline{432}$ with a pulse A or D, or in the case of coincidence of pulses 432, D and B.

OPERATION SELECTION BLOCK 420, FIG. 3i

The apparatus represented by this block includes two hubs M and D, two inverters $I_M$ and $I_D$, each having inputs wired to one of these hubs and a mixing circuit having inputs also wired to these hubs. If a program stage includes the performances of a multiplication, hub 403 of block 400, FIG. 3g, is wired through a removable connection to hub M. If the program stage includes the performance of a division, hub 403 is wired to hub D. For purposes of description, the following designations are made:

Pulse M is obtained through hub M.
Pulse $\overline{M}$ is obtained on the output of inverter $I_M$.
Pulse D is obtained on hub D.
Pulse $\overline{D}$ is obtained on the output of inverter $I_D$.
Pulse M+D is obtained on the output of the mixing circuit.

*Program performance blocks*

STAGE BEGINNING CHAIN 430, FIG. 3h

According to the usual terminology, the term "stage" designates the entire progression of program steps necessary to the performance of a particular operation, such as multiplication or division.

The stage beginning chain 430 supplies pulses controlling certain initial operations. It includes three triggers.

Trigger $T_{431}$, the "test" trigger, causes the change of stage.

Trigger $T_{432}$, the "set" trigger, controls the locating of the scanning chains already wired to the desired positions. Moreover, in the case of the division, it controls the initial starting of the rank counter 440, which will be described later.

Trigger $T_{433}$, the "unit rank" trigger, controls the sign trigger and, moreover, in the case of multiplication, the initial starting of the rank counter 440.

The test trigger $T_{431}$, normally OFF, is switched ON by a pulse NB transmitted by diode gate 436, conditioned by a stage end signal. This stage end signal, transmitted by the mixing circuit, occurs:

From the coincidence of a pulse M, characterizing the multiplication operation, with a pulse 2700, indicating that chain B is on the extreme left position of the assigned scanning field, and a pulse $(B_0)$. $(Q_0)$ indicating that the digit written in this position is zero.

From the coincidence of a pulse D.461, indicating, in the case of division, the existence of a zero in all the positions scanned from the start of the operation, with a pulse 9, indicating that all the positions of the divisor have been scanned. This mode of controlling the test trigger has been provided to allow the switching to the next stage in the case where the divisor is zero. Moreover, warning circuits are provided to indicate this condition.

From the coincidence of a pulse 481 with a pulse 10 and a pulse B, characterizing the last cycle of a division, the last unitary time of this cycle and the second alternance of this unitary time, respectively.

The test trigger $T_{431}$ is reset by pulse NB following the one that switched said trigger ON. This pulse NB is passed by the diode gate 437, conditioned by the right output of the trigger.

This same pulse NB switches set trigger $T_{432}$ ON, because diode gate 438 is conditioned by the right output of test trigger $T_{431}$. The following NB pulse resets $T_{432}$ and switches $T_{433}$ ON, while the following NB pulse resets $T_{433}$; and, thereafter, triggers just mentioned stay OFF until a new stage end pulse switches $T_{431}$ ON.

The pulses received on the right output and the left output of test trigger $T_{431}$ will be respectively named 431 and $\overline{431}$. The pulses received on the outputs of $T_{432}$ will be designated 432 and $\overline{432}$, and those received on the outputs of $T_{433}$ are 433 and $\overline{433}$.

A mixing circuit 435 used as a negative pulse coincidence circuit receives on its inputs a negative signal NA existing at the end of all times A and a negative signal resulting from the inversion of pulse 431 by inverter $I_{431}$.

The negative signal received on the output of this circuit is differentiated by diode gate 434 used as a differentiating circuit, see FIGS. 15c and 15d. The rear or trailing part of the signal is changed into a quick positive pulse which exists at the end of time A of time 431. This signal is the program advance pulse 4300. The program advance pulse is sent to stage trigger block 400 to control a stage change, as previously stated. The pulse is also sent to carry block 190, sign calculation block 230, control block 360 for switch value true complementary, rank counter 440, and corrective cycle storage block 460 to reset all the triggers of these blocks.

RANK COUNTER 440, FIG. 3l

The rank counter 440 counts the unitary times within each one of the cycles making up a multiplication or division operation, each cycle lasting ten unitary times. The rank counter 440 is made up of a chain with ten triggers $T_1$ to $T_{10}$. The pulses received on the right outputs of these triggers will be designated with 1, 2 ... 10 and the pulses received on the left outputs will be designated with $\overline{1}, \overline{2} ... \overline{10}$. Pulses 1, $\overline{1}$, 8, 9, 10, $\overline{10}$ are used, as stated further on, for several controls. Each one of triggers $T_1$ to $T_{10}$ is switched ON by a pulse NB, the transmission of which is conditioned by the right output of the preceding trigger. Each trigger is reset by the following NB pulse. Trigger $T_1$ is switched ON by a pulse NB, the transmission of which is conditioned by a mixing circuit capable of passing:

A pulse M.433 for the first starting of the rank counter in the case of a multiplication.

A pulse resulting from the coincidence of a pulse M.10 with a pulse $\overline{(B_0).(Q_0)}$, for the switching from a cycle to the following in the case of a multiplication.

A pulse D.432 for the starting of the rank counter in the case of a division.

A pulse D.10 for switching from one cycle to the following cycle in the case of a division.

Trigger T2 is switched ON by a pulse NB, the transmission of which is conditioned by the coincidence of a pulse 1 with a pulse 482. Because of this, the switching from rank 1 to rank 2 is delayed one unitary time in the last cycle of a division. This gives this cycle an eleven unitary time duration and allows scanning chain B to reach on the last time the unit position of the quotient for the purpose of writing the sign of this quotient.

*Special situation storages*

(FIRST CYCLE STORAGE 450, FIG. 3i)

This storage is made up of a trigger $T_{451}$ normally OFF and switched ON by a pulse NA transmitted by diode gate 452. The diode gate 452 is conditioned by the coincidence of a pulse M+D together with a pulse 432. Hence, the trigger $T_{451}$ is switched ON at the end of time A of unitary "set" time 432 for each stage. $T_{451}$ is reset at the end of the tenth unitary time of the first cycle by a pulse NB transmitted by diode gate 453 conditioned by a pulse 10.

The trigger $T_{451}$ is also reset by a program advance pulse 4300 furnished by stage beginning chain 430, FIG. 3h.

The pulses received on the right output of trigger $T_{451}$ are pulses 451 and the pulses received on the left output are pulses $\overline{451}$.

(ZERO TEST STORAGE 460, FIG. 3i)

This storage includes a trigger $T_{461}$ normally OFF. $T_{461}$ is switched ON by a pulse NB transmitted by a diode gate conditioned by a pulse D.432. Hence, the trigger $T_{461}$ is ON at the beginning of the first cycle of a division. This allows, in case there is no reset during the first cycle, to detect when the divisor is zero.

$T_{461}$ is also ON when the diode gate is conditioned by the coincidence of a pulse M.10 with a pulse $(B_0).(Q_0)$. This occurs when the digit contained in the position of field B scanned during the tenth unitary time of a multiplication cycle is zero.

$T_{461}$ is reset by a pulse NB transmitted by a diode gate conditioned by the coincidence of a pulse 461 with a pulse $\overline{(B_0).(Q_0)}$ The occurs during a division, if a non-zero digit is encountered during the first cycle in field A, because, during the first cycle, the digits read in field B do not enter into the adder.

The trigger $T_{461}$ is also reset during a multiplication if a position containing a non-zero digit is reached in field B, because, as long as there is a pulse 10, the reading of field A is suppressed; and this pulse 10 remains until the arrival of a pulse $\overline{(B_0).(Q_0)}$.

(CORRECTIVE CYCLE STORAGE 470, FIG. 3j)

A "corrective cycle" is a cycle during which the divisor is added instead of being subtracted. This cycle is performed with the lack of a carry at the tenth unitary time of the cycle. This shows that the divisor was higher than the number from which it was subtracted.

The corrective cycle storage functions to start this corrective cycle by acting on control device value true-complementary-value 360, FIG. 3j.

Corrective cycle storage 470 also functions to supply a pulse for the entire cycle and to supply a pulse during the unitary time which follows this cycle. The function of this latter pulse will be described later herein.

The corrective cycle storage 470 includes two triggers $T_{471}$ and $T_{472}$. Trigger $T_{471}$, normally OFF, is switched ON by a pulse NB transmitted by diode gate 473. The diode gate 473 is conditioned by the coincidence of pulses D.10, characterizing, in case of a division, the last unitary time of a cycle, pulse $\overline{181}$ proceeding from the adder and indicating the lack of a carry control, and pulse $\overline{451}$, indicating that it is not the first cycle of the operation. $T_{471}$ is reset by a pulse NB transmitted by diode gate 474. Diode gate 474 is conditioned by the coincidence of pulses 10 and 181. Hence, reset occurs at the end of the last unitary time of the corrective cycle if there is a carry on the output of the adder.

$T_{471}$ is also reset by a program advance pulse 4300.

Trigger $T_{472}$, normally OFF, is switched ON when trigger $T_{471}$ is being reset. The "slow" input, the input through a resistor, of the diode gate 475 is wired to the left output of $T_{472}$; while the "fast" input, input through a capacitance, is wired to the left output of $T_{471}$, the potential of which increases suddenly when $T_{471}$ switches OFF. Trigger $T_{472}$ is reset by a pulse NB transmitted by diode gate 475 conditioned by the right output of $T_{472}$. Hence, this pulse NB is the first one which follows the switching ON of $T_{472}$, which coincides with the end of a pulse NB. Trigger $T_{472}$ then stays ON only during one unitary time.

The pulse received on the right output of trigger $T_{471}$ is pulse 471. This pulse lasts during the entire duration of the corrective cycle.

The pulse received on the left output of $T_{471}$ is pulse $\overline{471}$.

The pulse received on the right output of $T_{472}$ is pulse 472. Pulse 472 lasts only during the unitary time which follows the end of a corrective cycle.

Pulse $\overline{472}$ is received on the left output of $T_{472}$.

Pulse $\overline{472}$ is used in the chain advance control block. Pulse $\overline{472}$ functions to eliminate the pulse controlling the regression of tens chain B, this regression occurring during the last unitary time of the corrective cycle.

Moreover, as it will appear further, pulses 472 and $\overline{472}$ are used in combination with pulses 481 and $\overline{481}$ in order to produce pulses 482 and $\overline{482}$.

(DIVISION END STORAGE 480, FIG. 3j)

This storage comprises a trigger $T_{481}$. This trigger, normally OFF, is switched ON by a pulse NB transmitted by diode gate 483 when the same is conditioned by the coincidence of a pulse D, characterizing a division, with a pulse 2700, indicating that scanning chain B has reached the position located immediately to the right of the one which contains the unit digit of the dividend. $T_{481}$ is reset by a pulse NB transmitted by diode gate 484 when the same is conditioned by the coincidence of a signal on the right output of the trigger $T_{481}$ with a pulse 10, last unitary time of the cycle.

Pulse 481 is the pulse received on the right output of the trigger $T_{481}$ and pulse $\overline{481}$ is the pulse received on its left output.

Pulse 481 is sent to the input of coincidence circuit 485, which receives on its other input a pulse 472. The output of this circuit 485 supplies pulse 482, which lasts only during the first unitary time of the last cycle of a division.

Pulse $\overline{481}$ is sent to the input of mixing circuit 486, which receives on its other input a pulse $\overline{472}$. The output of this circuit 486 supplies a pulse $\overline{482}$ which is present at all times, except during the first cycle of the unitary time of the last cycle of a division.

PULSE COMBINATION BLOCK 490, FIG. 3k

This block is used to produce pulses resulting from the coincidence of other pulses and that may be used in several components of the device. It is made up of coincidence circuits. The output pulses are designated, according to the usual notation of logical algebra, by the joint writing of the input pulse symbols separated with dots. The following pulses are thus obtained:

(1) Pulses that may exist in multiplication and in division:

Pulse (M+D). $10.\overline{471}$ exists during the last unitary time of each cycle, provided that zero test trigger $T_{471}$ is OFF.

(2) Pulses that may exist only in multiplication:

M.10
M.1
M.B
M.433
M.$\overline{433}$ (3) Pulses that exist only in division:

D.451.1
D.1
D.461
D.10
D.451
D.432

DATA INSERTION AND TRANSFER CONTROL BLOCKS

*Transfer from or to core storage 100*

SCANNING CHAINS

There are four scanning chains.

Unit chain block 250 includes field A unit chain and field B unit chain.

Tens chain block 260 includes field A tens chain and field B tens chain.

A detailed showing of the "unit" chain block 250 for chains A and B is contained in FIG. 3a, while the "tens" chain block 260 for chains A and B, which is similar to the unit chains, is represented by a rectangle.

UNIT CHAIN BLOCK 250, FIG. 3a

This block comprises ten triggers $T_{Au1}$ to $T_{Au10}$ for the "units A" chain and ten triggers $T_{Bu1}$ to $T_{Bu10}$ for the "units B" chain. The switching of these triggers is controlled by quick negative pulses proceeding from the chain control block 280, FIG. 3g. Pulse 289 switches all the triggers OFF. This pulse is directly sent to the triggers. The other pulses transmitted to the triggers are passed by diode gates, the operation of which is going to be explained. These other pulses function either to "position" the chains; i.e., to switch one of their triggers ON, or to make them "progress"; i.e., to reset the trigger which was ON and to switch ON the trigger having an immediately lower rank, or to make them "regress"; i.e., to reset the trigger which was ON and to switch ON the immediately higher rank trigger.

An explanation will follow for the positioning, the progression and the regression of chain A; the operation of chain B is similar.

*Positioning of chains.*—The positioning is performed through a pulse 281. This pulse is transmitted by a diode gate when the same is conditioned. This requires the coincidence of a pulse 432, proceeding from "stage beginning" chain 430, FIG. 3h, with a pulse proceeding from one of the hubs of chain positioning block 270, FIG. 3a. The rank of the hub has a unit digit equal to the rank of trigger which is to be switched ON. For instance, if there is a pulse on hub 12 of the chain positioning block 270, this pulse is transmitted through mixing circuit Ou2, to an input of concidence circuit 251 having another input which receives a pulse 432. If this pulse 432 exists, the pulse received on the output of coincidence circuit 251 is transmitted, through mixing circuit 252, to diode gate 253, so that the first pulse 281 will be able to switch trigger $T_{Au2}$ ON.

*Progression.*—If one of the triggers is ON, the first pulse 281 following its switching ON resets it and switches ON the immediately lower rank trigger. If, for instance, trigger $T_{Au2}$ is ON, a positive voltage is transmitted during time A, through coincidence circuit 254 and mixing circuit 255 to the slow inputs of diode gates 256 and 257 so that the first pulse 281, it is recalled that these pulses may happen only at the end of a time A, resets trigger $T_{Au2}$ and switches trigger $T_{Au1}$ ON. When trigger $T_{Au1}$ is ON, the first pulse 281 following its switching ON resets it, switching trigger $T_{Au10}$ ON.

*Regression.*—If one of the triggers is ON, the first pulse 282 following its switching ON resets it and switches ON the immediately higher rank trigger. If, for instance, trigger $T_{Au2}$ is ON, a positive voltage is transmitted on the slow inputs of diode gates 258 and 259 and the first pulse 282 switches trigger $T_{Au2}$ OFF and trigger $T_{Au3}$ ON.

When trigger $T_{Au10}$ is ON, the first pulse 282 following its switching ON resets it while switching trigger $T_{Au1}$ ON.

Hence, the unit chains A and B are closed chains for progression and regression.

*Output pulses.*—The positive pulses received on the right outputs of the triggers of "units" chain A are sent to coincidence circuits which receive also pulses A. The pulses received on the right output of the triggers of "units" B chain are sent to coincidence circuits which receive also pulses B. The pulses received on the output of the two coincidence circuits of a corresponding rank are sent to a mixing circuit. The output of said mixing circuit makes up an output circuit for the "unit" chain block. There is a positive voltage on this circuit:

During time A if the corresponding trigger of "units" chain A is ON.

During B if the corresponding trigger of chain B is ON.

Thus, for instance, mixing circuit 255 passes an impulse from coincidence circuit 254 during time A, if trigger $T_{Au2}$ is ON.

Mixing circuit 255 passes an impulse from coincidence circuit 170 during time B, if trigger $T_{Bu2}$ is ON.

The pulse passed by mixing circuit 255 is $u2$ and is sent to the "scanning pulse generator" 300, FIG. 3b.

It may be noted that pulse $u2$ exists as well on time 432 if there is a voltage on one of hubs 01, 11, 21, etc., of the chain positioning and stopping block. However, under these conditions, the pulse $u2$ has no effect on the scanning pulse generator 300 because basic pulses X' and Y', necessary to the operation of this generator, do not exist at time 432.

TENS CHAIN BLOCK 260, FIG. 3a

This block operates similar to that of the unit chain block 250. However, in the tens chain block 260, chain A and B each includes only eight triggers and the chains are open chains.

The tens chains are reset by the same pulse 289 as the unit chain. They are "positioned," "progress," or "regressed" with particular pulses 283, 284, 287 and 288. For instance, the positioning of "tens A" chain on the second trigger takes place on time 432 (time "set") if there is a positive voltage on one of hubs 11 to 20 in the chain positioning and stopping block 270.

The output pulses of the tens chain block are respectively designated with $d_0, d_1 \ldots d_7$.

CHAIN POSITIONING BLOCK 270, FIG. 3a

The chain positioning block is used to position the chains A and B on the first position to be scanned or the position making up one of the extremities of the field to be scanned.

The chain positioning block also functions to produce, when the chains reach the position located immediately to the right of the other extremity, a stop signal allowing, if several conditions are met, to obtain various results such as basic pulse elimination, chain reset control, or passing to the following program stage.

The chain positioning block 270 includes:
(1) Eighty position hubs numbered from 01 to 80.
(2) Ten mixing circuits $0_{u1}$ to $0_{u10}$, each corresponding to a unit digit.
(3) Eight mixing circuits $0_{d0}$ to $0_{d7}$, each corresponding to a tens digit.
(4) Stop signal circuits which are to be described hereafter.

As it was stated in the description of program general control block 400, FIG. 3g, removable connections link several positioning and stopping chain block position hubs to various "pick up" hubs of the field defining block.

At each program stage, one of the "pick up" hubs receives a pulse during time A; and another "pick up" hub receives a pulse during time B. As it has already been explained, the pulses proceeding from a "pick up" hub are transmitted, on one hand, to a storage block control hub and through it to a storage chain hub in the scanning pulse generator.

On the other hand, the on-time "set" pulses (time 432) are sent to field defining hub F facing the pick up hub (multiplication case for both chains, or division case for chain A) or to the defining hub located immediately to the right of the previous one (division case for chain B).

During the rest of the operation, the pulses from the pick up hub are sent to the field defining hub located immediately to the right of the one that faces the pick up hub (multiplication case for both chains, or division case for chain A) or to the field defining hub facing the pick up (division case for chain B).

The linkings of time 432 are for the positioning of the chains, the linkings further on in the operation are for stopping the chains.

The field defining hub facing the pick up hub is wired through a removable connection to the position hub of chain positioning block 270 corresponding to the right extremity of the field. The field defining hub located immediately to the right of the previous one is wired, through a removable connection, to the position hub corresponding to the position located immediately to the left of the left extremity of the field. This same connection may be used to define the right extremity of a field used in another stage.

Hence, in case of a multiplication, chains A and B, respectively, get into position on the right positions of fields A and B.

In case of a division, chain A gets on the right position of field A and chain B on the left position of field B.

In case of a multiplication, the stop signal will occur each time one of the chains will reach the left position of its field.

In case of a division, the stop signal will occur when chain A will reach the left position of field A or when chain B will go past the right of the right position of field B.

The stop signal 2700 is normally supplied by 3-input coincidence circuit 275 which has inputs for receiving a "unit" stop signal, a "tens" stop signal, and a signal $\overline{432}$.

The "unit" stop signal is supplied by mixing circuit 271 having each one of its ten inputs wired to the output of a coincidence circuit having two inputs. One of these inputs corresponds to a group of position hubs, the rank of which has the same unit digit; and it is positive when one of the hubs is positive. The other input is wired to the output circuit of the unit chain block, the rank of which is higher one unit. For instance, coincidence circuit 272 supplies a pulse on its output when the unit chain is in position 3, if one of hubs 02, 12 . . . 72 is positive.

The "tens" stop signal is supplied by mixing circuit 273 having each one of its eight inputs wired to the output of a coincidence circuit having two inputs. One of these inputs corresponds to a group of position hubs, the rank of which has the same tens digit, and not to the hubs of a same series of ten. For instance, hub 10, which belongs to series of ten 0 and has the same effect as hubs 01 to 09 for the positioning of the tens chain, is on the contrary grouped with hubs 11 to 19 for supplying a stop signal; and it is positive when one of these hubs is positive. The other input is wired to the output circuit of the tens chain having the same number. For instance, circuit 274 supplies a pulse on its output when the tens chain is in position 0, if one of hubs 01 to 09 is positive.

The outputs of mixing circuits 271 and 273 are wired to the input of the coincidence circuit 275 which receives signal $\overline{432}$ on a third input.

When it is not time 432, the unit chain and tens chain assembly is on a position located immediately to the right of a position corresponding to a positive hub. A so-called "stop" signal 2700 is supplied by the output of coincidence circuit 275. This is the case if, for instance, there is a positive signal on hub 02, the unit chain being in position 3 and the tens chain in position 0; as well, if there is a positive signal on hub 09, the unit chain being in position 10 and the tens chain in position 0; or, further, if there is a positive signal on hub 10, the unit chain being in position 1 and the tens chain in position 1.

Moreover, in order that the signal be produced in all cases when a chain reaches position 1, the output of coincidence circuit 275 is sent to a mixing circuit 276 which receives also a signal proceeding from the coincidence of pulses $d0$ and $u1$.

CHAIN CONTROL BLOCK 280, FIG. 3g

This block supplies the pulses controlling the progression or the regression of the chains or their reset. The block circuits may be assembled in five groups dealing respectively with the progression of chain A, the regression of chain A, the progression of chain B, the regression of chain B and the reset.

*Progression of chain A.*—The progression of the "units" chain A is controlled by pulses 281 and the progression of the "tens" chain A is controlled by the chain A pulses 283.

Pulses 281 are quick negative pulses resulting from the coincidence of a pulse NA with a negative pulse obtained on the output of inverter $I_{281}$. The inverter $I_{281}$ has a negative pulse at its output upon the presence of a pulse $\overline{M}$, showing that it is not a multiplication case, or upon the coincidence of a pulse $\overline{461}$, test of no zero, with pulse $M$. $\overline{433}$.

In case of a division, the units A chain progresses once for each unitary time at the end of time A.

In case of a multiplication, it progresses once for each unitary time at the end of time A, except on unitary time 433 (time immediately following time 432) or when the digit recorded in the position at the extreme right of the multiplier is zero.

Pulses 283 are quick negative pulses resulting from the coincidence of a negative pulse 285 with a negative pulse obtained in one of the two following cases:

During time 432 ("set" time); i.e., when positive pulse $\overline{432}$ is not existing. In this case, pulse 283 is used to position the tens A chain, as explained above.

When the units chain A is in position 1; i.e., when the positive pulse $\overline{Au1}$ obtained on the left output of trigger $T_{Au1}$ in the unit chain block 250, FIG. 3a, does not exist in this case, the unit chain switches from position 1 to position 10, while the tens chain progresses one unit, switching, for instance, from position 3 to position 2.

It will be noted that the mixing of negative pulses, existing during the absence of positive pulses, is obtained due to a "coincidence circuit", as shown in FIGS. 13a and 13b.

*Regression of chains A.*—The regression of the units chain A is controlled by pulses 282 and the regression of the tens chain A is controlled by pulses 284.

Since pulses 282 are not used in the multiplication and division operations, their mode of production will not be mentioned. Pulses 284 are quick negative pulses resulting from the coincidence of a pulse NB with a pulse obtained on the output of inverter $I_{284}$ when there is a pulse $(M+D)$. 10. $\overline{461}$; i.e., (in multiplication) at the tenth unitary time of each cycle. If the digit of the position at the extreme right of the multiplier is not zero, or (in division) if the chains have not constantly encountered, during the first cycle, zero digits in the divisor.

Hence, chain A may regress only at the end of time B, while it may progress only at the end of time A.

*Progression of chains B.*—The progression of the units chain B is controlled by pulses 285 and the progression of the tens chain B is controlled by pulses 287.

Pulses 285 are quick negative pulses resulting from the coincidence of pulse NB with a negative pulse received on the right output of trigger $T_{285}$, when this trigger is OFF. As a matter of fact, trigger $T_{285}$, normally OFF, is switched ON by a pulse NA either in case of coincidence of a pulse D.451 with a pulse 9 or in case of coincidence of a pulse 471 (corrective cycle) with a pulse 10.

$T_{285}$ is reset by a pulse NA either in case of coincidence of a pulse 451 (first cycle pulse) with a pulse 10 or by a pulse D.1.

Hence, the trigger $T_{285}$ is always OFF in multiplication. In division, it is always OFF, except:
During time B of the ninth unitary time of the first cycle and time A of the following unitary time.
During time B of the tenth unitary time of a corrective cycle and time A of the following unitary time.

Hence, the advance pulses of the "units" chain B exist:
In multiplication, at the end of time B of all the unitary times.
In division, at the end of time B of all the unitary times, except the ninth unitary time of the first cycle and the tenth unitary time of the corrective cycles.

Pulses 287, advance pulses of the tens B chain, are quick negative pulses resulting from the coincidence of a negative pulse 285 with a negative pulse obtained in one of the two following cases:

During time 432 ("set" time); i.e., when positive pulse $\overline{432}$ is not existing; in this case, pulse 287 is used to position the tens B chain.

When the unit chain B is in position 1; i.e., when the positive pulse $\overline{Bu1}$ obtained on the left output of trigger $T_{Bu1}$ in the unit chain block 250, FIG. 3a, is not existing. In this case, the tens chain B progresses one rank and the units B chain switches from position 1 to position 10.

*Regression of chains B.*—The regression of the units chain B is controlled by pulses 286 and the regression of the tens chain B is controlled by pulses 288. Since pulses 286 are not used in the multiplication and division operations, their mode of production will not be mentioned.

Pulses 288 are quick negative pulses resulting from the coincidence of a pulse N with a negative pulse received on the output of inverter $I_{288}$ during time A in one of the following cases:
existence of a pulse M.1.
coincidence of a pulse 471, corrective cycle, with a pulse 10.
coincidence of a pulse $\overline{472}$, the pulse existing at all times except during the unitary time which follows the end of a corrective cycle, and of a pulse D. 1.$\overline{451}$, existing at the first unitary time of all the cycles of a division, except the first one.

Hence, the tens chain B will regress one rank:
In multiplication, at the end of time A of the first unitary time of each cycle.
In division, at the end of time A of the first unitary time of each cycle, except the first cycle and the cycle immediately following a corrective cycle and at the end of time A of the tenth unitary time of a corrective cycle.

It should be noted that chain B may regress only at the end of time A, while it may progress only at the end of time B.

*Reset.*—The reset (i.e, the switching OFF of all the triggers of all the chains) is controlled by a pulse 289 resulting from the coincidence of a pulse R (quick negative pulse produced at times A and B by the basic pulse generator and ending a little after the middle of the times A and B) with a negative pulse produced by inverted I$_{289}$ in case of coincidence of a pulse A with a pulse 431.

Hence, the chains are reset during time A of time 431, time "test"; i.e., a little after the production of pulse 4300 which causes a stage change.

SCANNING PULSE GENERATOR BLOCK 300, FIG. 3b

The scanning pulse generator produces, in response to pulses coming from the chains, high amplitude current pulses, well determined and constant. These pulses are transmitted to the unit wires and the tens wires of core storage 100 for the reading and writing operations. The direction of the currents for the reading must be opposite to the direction for the writing. The pulses may be produced by generators G of the type shown in FIGS. 16a and 16b.

In FIG. 3b, only the two generators corresponding to the fifth unit wire and to the tens wire d3; i.e., to represent position 35, is shown. In each pair, the left generator produces a pulse within the duration of a read pulse X' and the right generator produces a pulse within the duration of a "write" pulse Y', if there is a pulse on the corresponding output of the scanning chain. The regulators are not shown. As there is only one unit pulse and one tens pulse to be sent at the same time, only two regulators need be used for the whole system.

It is to be noted that, while the unit scanning pulses are sent to a unit wire common to all the storage blocks, the tens scanning pulses are sent to only one block, because the tens wires are connected to the positive voltage outlet, not directly, but through electronic switches conditioned by pulses proceeding from block defining hubs.

STORAGE BLOCK SELECTION UNIT 310, FIG. 3b

This block includes for each storage block one hub and two electronic switches. One switch is for the read wires and the other for the write wires. For purposes of illustration, provision has been made for selecting any one of four storage blocks. The corresponding hubs are designated with a, b, c and d and the switches with $S_a$, $S_b$, $S_c$ and $S_d$ for the read switches and $S_a'$, $S_b'$, $S_c'$ and $S_d'$ for the write switches.

The switches may be of the type shown in FIG. 16a. Each switch is located in a circuit common to all the tens wires of a same storage block. The read switch and the write switch corresponding to a same storage block are controlled by a same hub.

READ AND WRITE GATE 290, FIG. 3h

This block has for a purpose to supply pulses X' and Y' which respectively control the read and write operations. They are produced by the coincidence of pulses X or Y supplied by the basic generator with a pulse supplied by the coincidence circuit 291, if the following conditions are met together:

existence of a pulse A' or a pulse B'.
existence of a pulse $\overline{482}$.
existence of a pulse 471 or a pulse $\overline{10}$.

The result is that the read and write operations are eliminated for times A and B:

When pulses A' and B' are eliminated; i.e., on times 431 and 432.

During the first unitary time of the last cycle of a division.

During the tenth unitary time of all the corrective cycles.

They are eliminated for time A while remaining for time B when the basic pulse eliminator eliminates pulses A' without eliminating pulses B'; i.e.:

On the ninth unitary time of each cycle and on the tenth unitary time of the cycles which are not corrective cycles. It has been stated that, on the tenth unitary time of a corrective cycle, they were eliminated for both pulses.

When chain A has gone over the left limit of field A (case of a multiplicand or a divisor having less than eight digits).

During the first cycle of a multiplication.

*Other transfers and insertions*

CONTROL OF READ AMPLIFIERS 320, FIG. 3h

The apparatus in this block supplies a pulse which allows the operation of the read amplifier:

During time A each time pulse A' exists, or each time there is a read gate.

During time B each time there is a pulse B', except during the first cycle of an operation; however, in multiplication, it exists on the tenth unitary time of the first cycle.

It is to be noted that the read amplifier control pulse must exist in the case of a multiplication at time 433, time immediately following time "set" 432, which is not part of the first cycle, even though trigger T$_{451}$ has been switched ON at the end of time 432, thus eliminating pulse $\overline{451}$. In order to obtain a pulse 321, it is necessary to send a pulse M. 433 to mixing circuit 322.

The read amplifier control does not supply a pulse during the first cycle; hence, even though the read gate is ON, during time B, the information read in field B is erased and is not transmitted to register AB120 and, consequently, may not be regenerated. This operation erases the area in which the nine right digits of the multiplier or the nine left digits of the quotient are to be written.

DEVELOPMENT AND CONTROL OF THE INSERTION OF BIT (C) IN REGISTER AB120 BY BIT (C) GENERATOR 330, FIG. 3i

When a reading is performed in the core storage 100 and the read amplifier control pulse exists, all the bits contained in the read position, including bit (C), if it exists, are transmitted to register AB120.

But if the read gate or the read amplifier does not supply a pulse during time A or B, no data is transmitted. Control circuits, not shown because they do not concern the present invention, supply, except during time 431 and 432, an error signal when there is not in register AB120 an odd number of triggers ON at the end of time A or B. Hence, it is necessary, in order to avoid this error signal, to insert a bit (C), if appropriate, which will switch the corresponding trigger ON.

This result is achieved by wiring the diode gate which controls the input of this trigger to the output of a mixing circuit which transmits a signal in the following cases:

(1) *Normal case.*—Existence of a signal C on the output of the read amplifier.

(2) *Case of elimination of the read gate during time A.*—Coincidence of a pulse A with a pulse $\overline{A}'$.

Existence of a pulse 482, characterizing the first unitary time of the last cycle of a division.

(3) *Case of elimination of the read gate during time B.*—Coincidence of a pulse B with a pulse 471 and a pulse 10, the coincidence existing during the tenth unitary time of a corrective cycle.

(4) *Case of elimination of the read amplifier control during time B.*—Coincidence of a pulse B' with a pulse D.451, first cycle of a division.

Coincidence of a pulse 451 with a pulse M.$\overline{433}$ and a pulse $\overline{10}$, first cycle of a multiplication, except the tenth unitary time. It is to be noted that it is not necessary to send a pulse B or B' to the coincidence circuit because, during the first cycle of a multiplication, there is no reading in field A.

DIGIT INSERTION BLOCK 340, FIG. 3i

The digit insertion block functions to enter into register 140 at a time determined by the program a preselected digit. It is especially used:

In multiplication, in order to introduce a 9 at the end of time A of the tenth unitary time of the cycle other than the first cycle; if the doubler is not used. This 9 adds to the digit of the multiplier, and this decreases this digit one unit; and, if the doubler is used, the 9, going through the doubler, becomes an 8 which, added to the digit of the multiplier, decreases this digit two units. It is to be noted that, during the tenth unitary time, the carries of the doubler and the adder are eliminated as it will be seen in the description of the carry circuit.

In division, to introduce a 9 at the end of time A of the tenth unitary time of each corrective addition cycle in order to eliminate the carry proceeding from the ninth unitary time. In the subtraction cycles, this 9 is also entered, but it is changed into digit 0 by switch 170; on the first cycle and on the division end cycle, this 9 is not entered.

In the multiplication with half-adjust, in order to enter, during the first cycle, a 5 in the position corresponding to the first digit eliminated.

It may be used for other purposes; for instance, to perform a multiplication or a division with a fixed digit which needs not to be entered in core storage 100. However, only the circuits corresponding to the uses just mentioned are shown.

Even though it is possible to write directly the digits directly into register A 140, it has been preferred to transfer them via the input of the first translator 130, and this allows to define the digits according to the modified binary code which requires less circuits than the "quibinary."

The bits (1), (2), (4) and (8) of the modified binary code are supplied by the outputs of mixing circuits $0_{(1)}$, $0_{(2)}$, $0_{(4)}$ and $0_{(8)}$.

One of the inputs of circuit $0_{(1)}$ and one of the inputs of circuit $0_{(8)}$ come from the output of coincidence circuit 331 used for the insertion of the 9 at the tenth unitary time of a multiplication or division cycle. The inputs of this circuit receive, respectively, pulses $(M+D).10.\overline{461}$, $\overline{451}$ and 481.

Another input of circuit $0_{(1)}$ and an input of circuit $0_{(4)}$ come from the output of coincidence circuit 332 having an input wired to hub HA, which is ON during the whole duration of a multiplication operation with half-adjust. The coincidence circuit 332 also has an input from the circuits conveying pulses 451. Hence, digit 5 exists on the output of the mixing circuits during the whole duration of the first cycle of a multiplication with half-adjust.

It would be possible, without departing from the scope of the invention, to eliminate the complementary inputs of circuit $0_{(1)}$ and eliminate the other OR circuits by directly wiring circuits 333 and 334 and 335 and 336.

Mixing circuit 337 furnishes a pulse 3300 for releasing the input of the translator 130 which transmits the digits proceeding from block 330. Inverter $I_{3300}$ supplies complementary pulse $\overline{3300}$ for releasing the input of translator 130, which transmits the digits or characters proceeding from storage AB120. Mixing circuit 337 may receive a pulse:

Either from coincidence circuit 331, in order to allow the insertion of a 9 during the tenth unitary time of a multiplication or a division.

Or from mixing circuit 338 in order to allow the insertion of a digit during the unitary time defined by one of the hubs, only two of these hubs are shown. If, for instance, hub $t_1$ is picked up, mixing circuit 338 will receive a pulse during the first unitary time of each cycle, due to coincidence circuit 339 which receives pulse 1 from the rank counter.

Or, eventually, from other inputs.

DOUBLER CONTROL BLOCK 350, FIG. 3j

The doubler 150 operates as long as the last digit of the multiplier is higher than 1. Hence, it is necessary, when chain B switches to the position containing the last digit of the multiplier, to control the use or the non-use of the doubler for the following cycle.

The discrimination between a digit higher than 1 and a digit lower than or equal to 1 is performed through the reading of output ($Q_0$) of the adder. As a matter of fact, on the tenth unitary time, field B only is read; hence, the quantity existing on the output of the adder is equal to the quantity read in field B; i.e., the multiplier digit. If this digit is equal to 1 or 0, there is a positive pulse ($Q_0$) on the output of the adder; if this digit is higher than 1, there is a positive pulse ($Q_0$) on the output of the inverter $I_{Q0}$.

The use of the doubler is controlled by a pulse 351 supplied by trigger $T_{351}$ when said trigger is ON, and its non-use is controlled by a pulse $\overline{351}$ supplied by trigger $T_{351}$ when it is OFF.

Trigger $T_{351}$ is switched ON by a pulse NB in case of coincidence between pulse MB with pulse 10 and $\overline{(Q_0)}$ and it is reset by a pulse NB in case of coincidence of pulses MB, 10 and ($Q_0$).

TRUE-COMPLEMENTARY-VALUE SWITCH CONTROL BLOCK 360, FIG. 3j

The apparatus in block 360 supplies a pulse 361 to control the transfer to the adder of the complementary value of that value recorded in register A140 and a pulse $\overline{361}$ to control the transfer of the value itself. Pulse 361 is received on the right output of trigger $T_{361}$ when said trigger is ON and pulse $\overline{361}$ is received on the left output of the trigger when it is OFF.

Trigger $T_{361}$, normally OFF, is switched ON by a pulse NA, in case of coincidence of pulses D. 1, $\overline{451}$, $\overline{471}$ and $\overline{481}$; i.e., in the middle of the first unitary time of the division cycles other than the first cycle, the last cycle or a corrective cycle. It is reset by a pulse NA in case of coincidence of a pulse D. 1 with a pulse 471; i.e., in the middle of the first unitary time of a corrective cycle.

Hence, there is a pulse 361 during the subtraction cycles and a pulse $\overline{361}$ during the other cycles, except during time A of the first unitary time; and this does not matter since the transfers of the values recorded in register A occur during time B.

REGENERATION-ADDITION SWITCH CONTROL BLOCK 370, FIG. 3l

This block sends to the regeneration-addition switch 210, FIG. 3f, either a signal 371 allowing the switch 210 to transmit the signals coming from register AB120 or a signal 372 which enables the switch 210 to transmit the signals proceeding from the adder 180 through the second translator 200.

It is recalled that it is necessary to write in core storage 100, without modification, the signals recorded in register AB120:

at the end of all times A, if the reading has taken place.
    on time 433 of the multiplication "unit rank" time during both times A and B. During time A, the unit position of the multiplicand is read; and, during time B, the unit position of the multiplier is read, in order to send their signs to the sign trigger, and the value of the digits written in these positions must be kept unaltered in core storage.
    during the first cycle of a division during time A to rewrite the digits of the divisor as long as chain A goes over positions containing digits; also, to write bit (C) inserted in register AB120 by the insertion block for bit (C); and, during time B, to write the bit (C) inserted in register AB120 during time B of the first cycle of a division. As already stated, the read amplifier not being controlled during time B of the first cycle of an operation, register AB120 contains only bit (C) during this time.

It is necessary to write in core storage 100 the signals proceeding from the adder 180 at the end of all times B, except in the above-mentioned instances, and during times 431 "test time" and 432 "set time." During the first cycle of a multiplication, the adder will supply digit 0, translated with a (C) bit, because the read gate is eliminated during times A and the read amplifier is not controlled during time B.

According to the conditions mentioned above, the mixing circuits 373, 374 and 375 supply pulse 371 which controls the regeneration of the data written in register AB120, and circuits 376, 377 and 378 supply pulse 372 which controls the writing of the data proceeding from the adder.

DATA STORAGE

Core storage 100, FIG. 3b

The core storage 100 is of the magnetic core storage type. It may be made up of one or several storage blocks wherein each comprising 80 7-core "positions." Each core has two stable states, which will be named, out of convention, state "1" and state "0." The combination of the states of the seven cores of a position defines a digit and its sign. The seven cores are respectively designated with (1), (2), (4), (8), (A), (B) and (C). Cores (1), (2), (4) and (8) are utilized to define a decimal digit in the modified binary code. Signals (A) and (B) define the sign; if the sign is negative, core (A) is in "0" state and core (B) is in "1" state. The cores (A) and (B) have an opposite state if the sign is positive or if it is not specified. Core (C) is for checking operations; its state must be such that the number of cores; i.e., seven, defining a digit in the "1" state be odd.

The 80 positions of a storage unit are assembled in groups of ten, each group of ten is numbered from 0 to 7 and the groups are numbered from 1 to 10. Each core is crossed by two tens wires (one for reading and one for writing) common to all the cores of a same group of ten of the same storage block. Each core is also crossed by two unit wires common to all the cores having the same unit number in all the storage block, a detection wire common to all the cores having the same designation; i.e., seven, and an inhibition wire, also common to all the cores having the same designation. In FIG. 3b, only the seven cores of the 35th position of the storage block "b" are shown. The detection and inhibition wires are indicated horizontally, the detection wire being above the inhibition wire. The position defining wires are represented vertically. The tens wire 101 and 102 are on the right. The wires represented, hence, correspond to block "b" and to group 3. The unit wires 103 and 104 are on the left. Hence, the wires represented correspond to group 5.

The reading of the information contained in a "storage position" is performed by sending a current on tens wire "reading" together with another pulse on unit wire "reading" corresponding to this position. These pulses have no effect on the cores which were in "0" state, but switch to "0" state the cores which were in "1" state; and this has for a result to cause, in the detection or sense wires which cross said cores, induced currents which make up the reading of the information.

The recording of an information in a storage position having all its cores in "0" state (writing operation) is performed by sending simultaneously current pulses:

To tens wire "writing" and to unit wire "writing" defining the position.

To the inhibition wires crossing the cores which must not switch to ON state; thus, for instance, to the writing of digit 7 characterized by the switching ON of cores (1), (2) and (4), inhibition pulses will be sent through cores (8), (A), (B) and (C).

The inhibition pulses proceed from inhibition pulse generator 220, FIG. 3f, which will be described further on. The position defining pulses (sent to the tens and unit wires) proceed from scanning pulse generators 300, FIG. 3b, already described.

Read amplifier 110, FIG. 3b

This component is made up of seven elementary amplifiers which may be of the type shown in FIG. 11a. Each amplifier receives on its input a pulse received on one of the detection wires of core storage 100 and transmitted by a diode gate conditioned by the output of the control of read amplifier 320, FIG. 3h.

The outputs of amplifiers $A_{(1)}$, $A_{(2)}$, $A_{(4)}$, $A_{(8)}$, $A_{(A)}$, $A_{(B)}$ are wired to the inputs of register AB120. The output of the amplifier $A_{(C)}$ is wired to one of the inputs of a mixing circuit located in insertion block 330, FIG. 3i.

Register AB120, FIG. 3b

Register AB120 is a storage which temporarily stores the information coming from the read amplifier. This storage is made up of seven triggers keeping, respectively, information (1), (2), (4), (8), (A), (B) and (C). The first six triggers are switched ON by the outputs of corresponding elementary read amplifiers $A_{(1)}$ to $A_{(B)}$. The seventh is switched ON by the output of a mixing circuit located in insertion block 330, FIG. 3h. All these triggers are reset by the trailing or rear end of a pulse "N" proceeding from the basic pulse generator and transmitted by a diode gate acting as a differentiating circuit.

Translator 130, FIG. 3c

The first translator is to translate the modified binary code into a qui-binary code.

The qui-binary code has been adopted and includes elements to represent seven different designations, among which any two are in state "1."

One of the elements in state "1" is termed a "quinary" element taken among the five elements (Q0), (Q2), (Q4), (Q6) and (Q8).

The other element in state "1" is termed a "binary" element taken among the two elements (B0) and (B1).

The following table gives the correspondence between the modified binary representation used in the present device, with digit 0 represented by elements 8 and 2,, and the qui-binary representation. In this table, a cross is written in the columns corresponding to the elements which define this value.

| Represented Value | Semi-binary System | | | | | | Qui-binary System | | | | |
|---|---|---|---|---|---|---|---|---|---|---|---|
| | (1) | (2) | (4) | (8) | (B0) | (B1) | (Q0) | (Q2) | (Q4) | (Q6) | (Q8) |
| 0 |   | X |   | X | X |   | X |   |   |   |   |
| 1 | X |   |   |   |   | X | X |   |   |   |   |
| 2 |   | X |   |   | X |   |   | X |   |   |   |
| 3 | X | X |   |   |   | X |   | X |   |   |   |
| 4 |   |   | X |   | X |   |   |   | X |   |   |
| 5 | X |   | X |   |   | X |   |   | X |   |   |
| 6 |   | X | X |   | X |   |   |   |   | X |   |
| 7 | X | X | X |   |   | X |   |   |   | X |   |
| 8 |   |   |   | X | X |   |   |   |   |   | X |
| 9 | X |   |   | X |   | X |   |   |   |   | X |

The digits transferred in modified binary code to the input of the translator come either from register AB120, FIG. 3b, or from digit insertion block 330, FIG. 3i.

The digits coming from register AB120 are transmitted when there is a pulse $\overline{3300}$, due to coincidence circuits $131_{(1)}$, $131_{(2)}$, $131_{(4)}$, $131_{(8)}$. Pulses $\overline{3300}$, which proceed from block 340, FIG. 3i, are transmitted when there is a pulse 3300. The elements defining the digit to be transmitted are sent to mixing circuits $133_{(1)}$, $133_{(2)}$, $133_{(4)}$ and $133_{(8)}$. Pulses (1), (2), (4) and (8) obtained on the output of these circuits are sent to inverters $I_{(1)}, I_{(2)}, I_{(4)}$ and $I_{(8)}$ which produce complementary pulses $(\overline{1})$, $(\overline{2})$, $(\overline{4})$ and $(\overline{8})$. Coincidence circuits 134, 135, $136_{(Q2)}$ to $136_{(Q8)}$ and mixing circuit $136_{(Q0)}$ perform the switching from the modified binary system to the qui-binary system.

Register A140, FIG. 3c

Register A140 is a storage for temporarily storing during time B the information extracted from field A and which has been recorded in register AB120 during time A. This allows, during time B, the readout of an information from field B and its recording in register AB120.

Contrary to register AB120, register A140 records quantities defined in the qui-binary code.

Register A140 is made up of seven triggers, each having the duty to record one of the seven bits of the qui-binary code. Each trigger is switched ON by the trailing or rear end of a pulse NA transmitted by a diode gate conditioned by the output of "first" translator 130 corresponding to the qui-binary element that the trigger must keep, and it is reset by the following pulse NB.

Doubler 150 and carry storage of doubler 160, FIG. 3d

Doubler 150 doubles the digits proceeding from register A140 in order to speed up the multiplication operations.

It is made up of ten coincidence circuits, each having three inputs. One of the three inputs is wired to the output of the control block of doubler 350, FIG. 3j, and it receives a positive signal when the doubler is to be used. The other two inputs are wired to both outputs of register A140 corresponding to the qui-binary code elements which correspond to the digit which must be doubled.

The output of a coincidence circuit defines the quinary element of the doubled digit. It is not necessary to raise circuits to determine the binary element because the doubling always leads to an odd digit; hence, the binary element will always be (B0).

If the digit to be double is equal to or higher than 5, it is necessary to keep a carry of a unit that is to be added later to the next higher rank digit. This is accomplished by doubler carry storage 160. However, this carry does not occur if the operation is on the tenth unitary time of a cycle. The doubler is used only to change a 9 into an 8 in order to decrease the multiplier two units.

Carry storage 160 is made up of a trigger $T_{160}$ which is switched ON by the rear end of a pulse NB transmitted by a diode gate conditioned by the coincidence of a pulse $\overline{10}$ with a pulse proceeding from mixing circuit 161. The inputs of the mixing circuit 161 are wired, one to output (Q6) of register A140, the other to output (Q8), and another one to the output of a coincidence circuit having its inputs wired to outputs (Q4 and (B1) of register A. Hence, the trigger $T_{160}$ is switched ON, except on the tenth unitary time of each cycle, when register A140 contains one of the digits 6, 7, 8, 9, 5. It is reset by a pulse NB transmitted by a diode gate conditioned by mixing circuit 162, either on the tenth unitary time of a cycle, or when register A140 contains one of the digits 0, 1, 2, 3, 4 according to a disposition similar to the one which causes the switching of the trigger $T_{160}$ ON.

The pulses obtained on the right and left outputs of the doubler are transmitted by coincidence circuits conditioned by the output of the doubler control block 350.

"Value true-complementary-value" switch 170, FIG. 3d

The switch 170 has one input wired to the output of doubler 150 and another input wired to the output of register A140. If the doubler is used, the switch transmits the digit proceeding from the doubler and, eventually, the carry proceeding from the preceding rank digit. If the doubler is not used, it transmits the digit proceeding from register A140, if "switch" true-complementary control block 360, FIG. 3j, transmits a signal on its output $\overline{361}$.

Also, if the doubler is not used, the switch 170 transmits the 9 complement of this digit, if block 360 transmits a signal on its output 361.

Switch 170 includes thirteen coincidence circuits. One of the inputs of these circuits is wired to output $\overline{351}$ of the doubler control block 350, FIG. 3j, which is positive only when the doubler is not used. Another input is wired to one of the outputs of register A140. A third input is wired, either to output $\overline{361}$, or to output 361 of the control block 360. However, the coincidence circuit wired to output (Q4) of register A140 does not have this third input, because the complement of a digit having a bit (Q4) will also be represented by a bit (Q4).

The outputs of the above-mentioned coincidence circuits are wired to the inputs of the mixing circuits; there is a mixing circuit for each one of the qui-binary code elements. The mixing circuits corresponding to the quinary elements have also inputs wired to the corresponding outputs of doubler 150 and the mixing circuits corresponding to the binary elements have an input wired to an output of the carry register of the doubler. In case the doubler is used, the number resulting from the doubling is always odd; hence, an element (B1) may be obtained only if there is a carry proceeding from the preceding digit. The result of the doubling and the carry need not be combined in an adding circuit since the doubling determines only the quinary element and the carry determines only the binary element; this independence of both operations is one of the advantages of the use of the qui-binary system.

Adder 180, FIG. 3e

The adder adds the digits proceeding from register A140, through the value-true-complementary-value switch 170 to those coming from register AB120, through the first translator 130. All of the digits are represented in qui-binary code. Moreover, the adder receives the carry addition signals 191 proceeding from the carry storage of adder 190, FIG. 3k. If no carry is to be performed, the adder receives a pulse $\overline{191}$ proceeding from the same component.

The adder is made up by an assembly of coincidence circuits and mixing circuits arranged as shown in FIG. 3e. The output is made up of seven lines, each transmitting one of the elements of the qui-binary code.

Moreover, if a carry to be added to the higher rank digit is to be recorded, the adder sends a pulse onto a line (181) wired to the carry storage 190. If no carry is to be performed, a pulse is sent onto a line $\overline{(181)}$.

The output of the adder is wired to the input of second translator 200, FIG. 3f. Moreover, the line transmitting element (Q0) is wired to the control of doubler 350, FIG. 3j, the operation of which has been explained above.

Adder carry storage 190, FIG. 3k

This block supplies a pulse (191) in order to control the addition of a carry or a pulse $\overline{(191)}$ to control a lack of carry.

A carry is to be controlled:

When the sum of the digits added during the preceding unitary time is higher than 9, except, however, on the time which follows the tenth unitary time of a multiplication, or the time during which a 9 or an 8 is sent to decrease the multiplier one or two units. This time may be either the first unitary time of the following cycle or an interval between cycles, during which the rank counter is still on position 10. Hence, the carry must be eliminated, not only if there is a pulse M. 1, but also if there is a pulse M. 10. However, even when the operation is really on the tenth unitary time of a cycle, it is not possible to have a carry, since no digit is read out of field A during the ninth unitary time.

On the first unitary time of a subtraction cycle in order to add the 10 complement of the digit recorded in register A140 instead of its 9 complement.

Pulse (191) is obtained through trigger $T_{(191)}$. This trigger, normally OFF, is switched ON by pulse NB when the adder supplies a pulse (181); i.e., as previously stated, when the addition supplies a digit higher than 9. It is reset by a pulse NB when the adder supplies a pulse $(\overline{181})$; i.e., when the adder supplies a digit equal to or lower than 9. Hence, this trigger is ON during the unitary times immediately following a time during which the adder supplies a digit higher than 9 and it is OFF during the other unitary times. The right output of the trigger is wired to the coincidence circuit which receives also pulses $\overline{M+1}$ and $\overline{M+10}$, equivalent to $\overline{M.1}$ and $\overline{M.10}$.

Pulse 191 is obtained from pulse $D.1.\overline{451}.\overline{471}.\overline{481}$ which switches trigger T ON in the value-true-complementary-value switch.

Second translator 200, FIG. 3f

The translator 200 converts the qui-binary representation into a modified binary representation.

The translator 200 is essentially made up of a coincidence circuit and three mixing circuits. Moreover, the coincidence circuit and a mixing circuit are used to produce bit (C) for all the combinations corresponding to a digit represented in the modified binary code with an even number of bits. The output circuit corresponding to this element (C) is not sent directly to the addition-regeneration switch as elements (1), (2), (4), (8), but it is sent to sign insertion block 240, FIG. 3*l*, where, as it will be stated, pulse (C) may be inverted.

Besides outputs (1), (2), (4), (8), (C), the translator includes an output pulse ($B_0$) ($Q_0$), when the output of the adder defines digit 0, and an output pulse $\overline{(B_0).(Q_0)}$, which exists in the opposite case. These pulses are sent to the basic pulse filter 390, FIG. 3*h*, the stage beginning chain 430, FIG. 3*h*, "zero test" 460, FIG. 3*i*, and order position counter 440, FIG. 3*h*.

The outputs of the translator 200 are wired to the input of the addition-regeneration switch 210.

Regeneration-addition switch 210, FIG. 3f

The regeneration-addition switch 210 has the duty to produce the inhibition pulses used for writing data in core storage 100. The data may be coming either from register AB 120 or from the adder 180, FIG. 3*c*.

The switching is performed through coincidence circuits, one of the inputs of which is wired to one of the outputs of the adder or register AB 120 and the other to one of the outputs of the Reg-Ad switch control block 370, FIG. 3*l*. The information read out from field A and proceeding from register AB 120 is generally written at the end of time A, and the information proceeding from the adder is written at the end of time B. However, there are exceptions at certain stages of the operations.

The coincidence circuits are followed by mixing circuits, each corresponding to the bits of the modified binary code. The mixing circuits are followed by inverters so that the inhibition pulses be sent to the circuits corresponding to the binary elements not used in the coding of the character to be written.

Since bit (A) may not proceed from the adder, the inverter corresponding to this element is directly picked up by the output of register AB 120.

Bits (B) and (C) may not proceed from the adder, but they may proceed from sign circuits. The writing of the information proceeding from the sign circuits occurs together with those which come from the adder. The corresponding coincidence circuits are released by the same pulse as the one which releases the circuits corresponding to elements (1), (2), (4,), (8) of the adder.

The outputs of the inverters are wired to the input of the inhibition pulse generator.

Inhibition pulse generator 220, FIG. 3f

This generator 220 produces current pulses on the inhibition wires corresponding to the binary elements that are not to be written in the core storage; i.e., to the elements for which there is a positive voltage on the output of the corresponding inverter in the regeneration-addition switch 210.

These pulses must have a high well-determined amplitude, and this amplitude must be absolutely kept constant during the whole pulse.

The pulses are supplied by generators of the type represented in FIG. 17*a*. These generators are made up of an amplifier associated with a high level delayed amplified current feedback circuit. As several generators may operate simultaneously, a feedback circuit must be associated to each one of them.

The inhibition pulses are sent directly to the inhibition wires in core storage 100, FIG. 3*b*.

Sign calculation block 230, FIG. 3l

This block comprises essentially a trigger $T_{(231)}$, the right output of which supplies, when the trigger is ON, a siganl representing a minus sign. The trigged $T_{(231)}$, normally OFF, is switched ON if one of the factors of the multiplication or the division is negative; and it is reset if the other factor is also negative. Finally, it is reset, in all cases, at the end of the multiplication cycle corresponding to the unit rank of the multiplier or at the end of a program stage.

In multiplication, the trigger is switched ON by a pulse R, during time A of time 433 "unit rank" time, if there is on the output of register AB 120 a pulse (B) and a pulse (A); i.e., if a minus sign has been read in the right position of field A which contains the unit digit of the multiplicand. The state of the trigged is changed by another pulse R transmitted by diode gate 232 during time B of time 433, if a minus sign has been read in the right position of field B (which contains the unit digit of the multiplier). It is reset by a pulse NA transmitted by diode gate 233 as soon as a pulse 461 appears; i.e., when all the additions concerning the unit digit of the multiplier have been performed. Hence, it is before the end of this cycle that the sign is to be inserted in the unit position of the product; the process of insertion will be explained in the description of the sign insertion block.

In division, the trigger is switched ON by a pulse R during time A of time 433 if there is, on the output of register AB120, a pulse (B) and a pulse $\overline{(A)}$; i.e., if a minus sign has been read in the right position of field A, which contains the unit digit of the divisor. The state of the trigger is changed by a pulse R transmitted by the diode gate 233 when there are simultaneously pulses B, D, 1, and 481; i.e., during time B of the first unitary time of the last cycle, if there is a pulse (B) and a pulse $\overline{(A)}$ in register AB120. On the first unitary time of the last division cycle, chain B is the position containing the unit digit of the divisor.

Hence, it is during the last cycle that the sign will have to be inserted in the unit position of the quotient.

Sign insertion block 240, FIG. 3l

When a minus sign is to be written in a storage position, the sign insertion block:
 produces a pulse (B).
 produces or eliminates a pulse (C) since the existence of element (B) modifies the parity of the number of bits.

In multiplication, pulse (B) results from the coincidence of pulses (231), MB and 1. Hence, pulse (B) is produced during time B of the first unitary time of all the cycles during which pulse (231) exists. This pulse exists if the combination of the signs of the multiplicand and of the multiplier give a minus sign, during the first cycle and during all the cycles concerning the unit digit of the multiplier. On the first unitary time of all these cycles, element (B) is consequently written on the extreme right position among the ten positions scanned by chain B. This position contains the unit digit of the product. It is necessary to rewrite element (B) on all the cycles, because the reading of a storage position causes the erasing of all the elements; and, if the reading occurs in field B, only elements (1), (2), (4) and (8) are transmitted to the adder while elements (A) and (B) are lost if they are not rewritten through special circuits. After the last cycle concerning the unit digit of the multiplier, chain B does not switch any longer to the unit position of the product and, consequently, element (B) remains written.

In division, pulse (B) results:

Either from the coincidence of a pulse B with a pulse D. 1 and a pulse $\overline{(A)} \cdot (B)$ proceeding from register AB120. Hence, if a minus sign is written in the unit position of the dividend on the first unitary time of all the cycles for which chain B begins its scanning on the position containing this unit digit, element (B) is rewritten in this position, i.e., it is successively written in the unit positions of the temporary rests and finally in the unit position of the final rest. It is rewritten a last time in this position during the second unitary time 1 of the last cycle. It is recalled that, during the first unitary time 1, the read and write gates are eliminated by pulse 482.

Or from the coincidence of pulses (231), B, 10 and 481 if the sign calculation block has determined a minus sign, element (B) is written during time B of the tenth unitary time of the last cycle in the storage position presently scanned by chain B. It is recalled that this position is the unit position of the quotient.

Pulse (B) produced by the sign insertion block on the output of mixing circuit 241 is sent to the regeneration-addition switch. Moreover, it is sent to coincidence circuit 242 and to mixing circuit 247, which receive also pulses (C) proceeding from the adder. The output of mixing circuit 243 is wired to an input of coincidence circuit 244 and the output of the coincidence circuit 242 is wired to the input of inverter $I_{242}$, the output of which is wired to the other input of the coincidence circuit 244.

It is easy to see that this coincidence circuit supplies a pulse on its output either in case (B) exists without (C) or in case (C) exists without (B), and that it does not supply any pulse in all the other cases.

The pulse obtained on the output of the coincidence circuit is sent to the regeneration-addition switch and causes the insertion of bit (C) in the presently scanned storage position. Consequently, it appears that the creation of a pulse (B) eliminates pulse (C) if said pulse existed on the output of the adder and produces it if it did not exist.

While the invention has been particularly shown and described with reference to a preferred embodiment thereof, it will be understood by those skilled in the art that various changes in form and details may be made therein without departing from the spirit and scope of the invention.

What is claimed is:

1. In a data processing machine, a data storage device having data stored therein in addressable data positions within an arbitrarily selected field; a multiple stage control ring having a number of stages corresponding to a predetermined number of data positions to be addressed in said field, each of said stages having first and second states, said stages being interconnected whereby said stages switch from said first to said second state and back to said first state successively as a series of electrical impulses are simultaneously applied to each stage, said control ring having one stage for characterizing a terminal condition; a multiple stage address ring connected to said data storage device for addressing each data storage position within said field, said stages each having first and second states, and being interconnected whereby said stages switch from said first to said second and back to said first state successively as a series of pulses are simultaneously applied to each stage; means for switching said address ring back a predetermined number of stages upon said control ring advancing from said one postion characterizing a terminal condition to a succeeding position whereby said address ring is reset to a position to again address the same positions in storage successively as the same is again advanced by a series of electrical impulses; and means for holding said control ring at said one stage for a predetermined interval while said address ring advances, whereby when said control ring advances from said one stage to the succeeding stage upon termination of said predetermined interval, said address ring is switched back a predetermined number of stages by said means for switching said address ring to effect a shift of the data positions addressed by said address ring as the same is again advanced successively by a series of electrical impulses.

2. A data processing machine according to claim 1 further comprising means for holding said address ring at a predetermined stage for a predetermined interval prior to said control ring reaching said one stage while said control ring advances so that, after said control ring reaches said one state and said switching means switches said address ring back a predetermined number of stages, a shift of the first data position addressed by said address ring as the same is again advanced successively by a series of electrical impulses is effected.

3. In a data processing machine, a data storage device having data stored therein in addressable data positions of arbitrarily selected first and second storage fields; a control ring having multiple stages corresponding to at least a predetermined number of data positions to be addressed in said fields, said stages each having first and second states, said stages being interconnected whereby said stages switch from said first to said second and back to said first state successively as a series of electrical impulses are simultaneously applied to each stage according to a predetermined order; a first multiple stage address ring connected to said data storage device for addressing each data position within said first field, said stages each having first and second states, said stages being interconnected whereby said stages switch from said first to said second and back to said first state successively as a series of electrical impulses are simultaneously applied to each stage; a second multiple stage address ring connected to said data storage device for addressing each data position within said second field, said stages each having first and second states, said stages being inter-connected whereby said stages switch from said first to said second and back to said first state successively as a series of impulses are simultaneously applied to each stage; and means for holding said first address ring at a predetermined stage for a predetermined time interval while said second address ring continues to advance whereby the initial relationship between the positions of storage addressable by said first and second address rings is changed, said control ring being connected to provide an indication of the initial relationship.

4. A data processing machine according to claim 3 further comprising means for holding said second address ring at a predetermined stage for a predetermined time interval while said first address ring continues to advance whereby a previous relationship between the positions of storage addressable by said first and second address rings is changed.

5. A data processing machine according to claim 4 wherein said means for holding said second address at a predetermined stage for a predetermined time interval is under control of said control ring.

6. A data processing machine according to claim 5 further comprising data test means for testing data contained in one of said positions in said second field addressed by said second address ring, said data test means being connected to control said means for holding said first address ring at a predetermined stage for a predetermined time interval.

7. A data processing machine according to claim 6 further comprising a single digit adder having inputs connected to receive data from said first and second storage fields and an output adapted to manifest the sum of data received on said inputs, the output of said adder being connected to control said control ring whereby, when a predetermined manifestation appears on the output of said adder at the time said control ring is at said one stage characterizing the terminal condition, said control ring is held at said one stage until a manifestation different from said predetermined manifestation appears on the output of said adder.

8. A data processing machine according to claim 7 further comprising doubling means operably controlled for doubling the data coming from one of the positions in said first field and to be received by one of the inputs of said adder.

9. A data processing machine according to claim 8 further comprising complementing means operably controlled for complementing data coming from one of the positions in said first field prior to the data being received by one of the inputs of said adder.

10. A data processing machine according to claim 9 wherein said complementing means is operably connected to said doubling means.

11. A data processing machine according to claim 10 further comprising data insertion means adapted to furnish data to one of the inputs of said adder while data is received on another input from a position in said second field.

12. A data processing machine according to claim 11 further comprising means for storing an element of the data received by said one input of the adder from said second field while data is simultaneously being received by another input of the adder from said first storage field, said element of data normally being unmanifested by the output of said adder upon said adder combining data from said first field with data from said second field.

13. A data processing machine, a data storage device having data stored therein in addressable data positions within an arbitrarily selected field; a multiple stage control ring having a number of stages corresponding to at least a predetermined number of data positions to be addressed in said field, said stages each having first and second states, said stages being inter-connected whereby said stages switch from said first to said second and back to said first state successively as a series of electrical impulses are simultaneously applied to each stage, said control ring having one stage for characterizing a terminal condition; an address ring having first and second multiple stage members wherein said first multiple stage member is operable to address a group of storage positions and said second multiple stage member is operable to address any one of the storage positions within said group of storage positions; and means for switching said address ring back a predetermined number of positions by holding said second multiple stage member at a predetermined position and switching said first multiple stage member.

14. In a data processing machine, data storage means having data stored in addressable positions of arbitrarily selected first and second storage fields; a first multiple stage address ring for addressing any storage position within said first field said stages each having first and second states, said stages being inter-connected whereby said stages switch from said first to said second and back to said first state successively as a series of electrical impulses are simultaneously applied to each stage; a second multiple stage address ring for addressing any storage position within said second field said stages each having first and second states, said stages being interconnected whereby said stages switch from said first to said second and back to said first state successively as a series of electrical impulses are simultaneously applied to each stage in alternate relation to said first address ring; a first register for receiving data from said data storage means; a second register for receiving data from said first register; selectively operable data storage read-in control means connected between said first register and said data storage means for selectively controlling the re-entry of data read from said data storage means into said first register; a single digit adder having one input connected to receive data from said first register and another input connected to receive data from said second register and an output adapted to manifest the sum of data simultaneously applied to said one and another inputs, said output being connected to said data storage read-in control means; means selectively operable for simultaneously transferring data from said first and second registers to said one and another inputs of said adder; first ring operating means for operating said first address ring so as to address in succession storage positions within said first field; first data readout means for reading data out from the positions addressed by said first address ring to said first register; second ring operating means for operating said second address ring alternately with the operation of said first address ring so as to address in succession certain selected storage positions within said second field; second data readout mean for reading data out from the positions addressed by said second address ring to said first register; means selectively operable for transferring data from said first register to said second register, whereby data read into said first register from said first storage field is transferred to said second register to permit data read out from said second storage field to enter said first register; and means for operating said data storage read-in control means whereby data read out from said first storage field to said first register is first re-entered into the same data positions from which it was read, and data read out from certain of said addressed positions of said second field is first destroyed by failing to re-enter said data into said data storage means, and whereby data at the output of said adder manifesting the sum of data simultaneously applied to said one and another inputs of said adder is re-entered in selected storage positions of said second field of said data storage means.

15. A data processing machine according to claim 14 wherein said means selectively operable for transferring data from said first register to said second register is under control of said data storage read-in control means, whereby data transfers from said first to said second registers only when said data storage read-in control means prevents re-entry of data into said data storage means.

16. A data processing machine according to claim 15 further comprising data insertion means for selectively entering predetermined data into said second register to enable the entered data to be combined with data entered in said first register from said second field by said adder.

17. A data processing machine according to claim 16 further comprising means operably controlled by said adder for testing the data apearing at the output of said adder after the same has combined data entered in said adder after from said second field with data selectively first register into said second register by said data insertion entered means.

18. In a data processing machine, a data storage device having data stored therein in arbitrarily selected first and second storage fields, each storage field containing data in discrete data positions; combining means for combining data received from data sources; first means operably associated with said data storage device for effecting transfer of data from said first storage field to said combining means, said first means being operable to effect the transfer of data from said first field data position by data position; second means operable associated with said data storage device for effecting transfer of data from said second storage field to said data combining means whereby data from said first and second storage fields is combined, means for operating said second means alternately with said first means to effect the transfer of data from said second storage field data position by data position at alternate times; means for transferring the combined data from said data combining means to said second storage field; and control means for controlling the operation of said first and second means to selectively effect repetitive operation thereof.

19. A data processing machine according to claim 18 wherein said control means is operably controlled by said data combining means.

20. A data processing machine according to claim 19 further comprising setting means for selectively setting said first and second means whereby only selected portions of data are transferred from said first and second fields to said combining means.

21. A data processing machine according to claim 20 wherein said setting means is operably controlled by the results obtained by said combining means as the same combines data received from said first and second fields.

22. A data processing machine according to claim 21 further including means for testing data contained in said second storage field prior to the transfer of the same to said combining means.

23. A data processing machine, a program device having at least one step for controlling an operation thereof, said one program step having terminals for receiving start and stop impulses to render said step active and inactive, respectively, and other terminals for passing timed impulses supplied to said step; an impulse generator connected to supply timed impulses to said program step; operation selector means connected to said program device to be activated when said program step is rendered active by a start signal; data storage means having data to be processed recorded in storage positions adapted to be grouped into first and second fields; first scanning ring means having multiple stages capable of being rendered active and inactive connected to effect readout of data from said data storage means contained in any position thereof; second scanning ring means having multiple stages capable of being rendered active and inactive connected to effect readout of data from said data storage means contained in any position thereof; scanning ring setting means operatively associated with said first and second rings whereby predetermined positions of said first and second rings are set to define said first and second fields in storage, respectively; ring control means connected to said first and second rings so that the positions of said set positions are rendered active in succession in a timed sequence, said ring control means being connected to said impulse generator so as to receive pulses therefrom to effect alternate operation of said first and second rings; and ring starting means under control of said operation selector means and said scanning ring setting means for causing said ring control means to condition said first and second rings for operation, whereby, upon one impulse from said impulse regenerator, one position of said set positions of said first ring is rendered active and subsequently, upon another impulse from said generator, one position of said set positions of said second ring is rendered active so that data in one position of said first field of storage and data in one position in said second field of storage is read out therefrom alternately in a timed sequence.

24. A data processing machine as in claim 23 wherein said ring starting means includes one stage adapted to be activated by said impulse generator, said stage being connected to said scanning ring setting means to enable setting of said first and second rings.

25. A data processing machine as in claim 24 further comprising a multiposition order counter adapted to advance from a starting position, position by position, in a timed sequence to an end position and then switch back to said starting position; and means for connecting the starting of said order counter under control of said one stage of said ring starting means, whereby said counter is conditioned to advance from said starting position upon said one stage being rendered active.

26. A data processing machine as in claim 25 wherein said ring starting means includes another stage adapted to be rendered active upon said one stage being rendered inactive, said another stage being connected to said counter to condition the counter for advancing from said starting position upon being rendered active.

27. A data processing machine as in claim 26 wherein said ring control means is connected under control of selected positions of said order counter to control the starting position of said positions to be rendered active in succession in a timed sequence.

28. A data processing machine as in claim 27 further comprising a first register connected to receive data read from said data storage means, a second register connected to receive data from said first register, a single digit adder having inputs connected to receive data from said first and second registers and an output adapted to manifest the sum of data simultaneously applied to said inputs, means for entering said data manifestations appearing on said adder output into predetermined positions in said second field, and test means for testing the output of said adder, said test means being connected to control said ring control means.

29. A data processing machine as in claim 28 wherein the said output of said counter is connected to said adder counter whereby, upon predetermined manifestations existing at said output when said end position of said counter is active, said ring control means is caused to operate in a predetermined manner.

References Cited by the Examiner

UNITED STATES PATENTS

| | | | |
|---|---|---|---|
| 2,792,991 | 5/57 | Cambio | 235—157 |
| 2,872,110 | 2/59 | Snyder et al. | 235—157 |
| 2,916,210 | 12/59 | Selmer | 235—157 |
| 2,927,732 | 3/60 | Rinder et al. | 340—172.53 |
| 2,939,120 | 5/60 | Estrems et al. | 235—157 |
| 3,001,708 | 9/61 | Glaser et al. | 340—172.5 |
| 3,107,342 | 10/63 | Estrems et al. | 340—172.5 |
| 3,132,324 | 5/64 | Estrems et al. | 340—172.5 |
| 3,138,782 | 6/64 | Estrems et al. | 340—172.5 |

OTHER REFERENCES

Pages 177–208, 314–354, 1956; Richards, Arithmetic Operations in Digital Computers, Van Nostrand.

ROBERT C. BAILEY, Primary Examiner.

IRVING L. SRAGOW, WALTER W. BURNS, JR., MALCOLM A. MORRISON, Examiners.